United States Patent
Adan

(10) Patent No.: US 11,468,309 B1
(45) Date of Patent: Oct. 11, 2022

(54) WAVE INTERACTION PROCESSOR

(71) Applicant: Miguel Alberto Adan, Ann Arbor, MI (US)

(72) Inventor: Miguel Alberto Adan, Ann Arbor, MI (US)

(*) Notice: Subject to any disclaimer, the term of this patent is extended or adjusted under 35 U.S.C. 154(b) by 685 days.

(21) Appl. No.: 16/296,002

(22) Filed: Mar. 7, 2019

(51) Int. Cl.
| | |
|---|---|
| *H04B 10/00* | (2013.01) |
| *G06N 3/067* | (2006.01) |
| *G06K 9/62* | (2022.01) |
| *H04B 10/299* | (2013.01) |

(52) U.S. Cl.
CPC ......... *G06N 3/0675* (2013.01); *G06K 9/6247* (2013.01); *H04B 10/299* (2013.01)

(58) Field of Classification Search
CPC combination set(s) only.
See application file for complete search history.

(56) References Cited

U.S. PATENT DOCUMENTS

| | | | |
|---|---|---|---|
| 4,802,103 A | 1/1989 | Faggin | |
| 4,888,816 A * | 12/1989 | Sica, Jr. | H04B 10/2587 398/119 |
| 4,930,099 A | 5/1990 | Castelaz | |
| 4,953,954 A * | 9/1990 | Ewbank | G02F 1/3538 359/15 |
| 5,025,488 A * | 6/1991 | Yeh | H04B 10/64 359/10 |
| 5,031,234 A * | 7/1991 | Primas | H04B 10/2587 398/154 |
| 5,317,442 A * | 5/1994 | Sharp | H04B 10/118 342/45 |
| 5,706,404 A | 1/1998 | Colak | |
| 5,798,853 A * | 8/1998 | Watanabe | H04B 10/2531 359/300 |
| 6,292,602 B1 * | 9/2001 | Suzuki | H04B 10/0775 385/24 |
| 6,324,318 B1 * | 11/2001 | Suzuki | H04J 14/0221 385/1 |
| 7,190,856 B1 * | 3/2007 | Lazikov | G02B 6/12007 385/132 |
| 7,350,522 B2 | 4/2008 | Dawson | |
| 7,392,230 B2 | 6/2008 | Nugent | |
| 7,512,571 B2 | 3/2009 | Rudolf | |
| 9,313,020 B2 * | 4/2016 | Ma | H04L 7/042 |
| 10,009,148 B1 * | 6/2018 | Chen | H04W 24/02 |
| 10,833,912 B2 * | 11/2020 | Au | H04L 5/0057 |
| 2003/0016421 A1 * | 1/2003 | Small | H04B 10/1125 398/126 |
| 2005/0259991 A1 * | 11/2005 | Dudelzak | G01S 3/782 398/118 |
| 2005/0286907 A1 * | 12/2005 | Masuda | H04B 10/25755 398/186 |
| 2010/0329686 A1 * | 12/2010 | Frankel | H04B 10/25253 398/83 |

(Continued)

*Primary Examiner* — Agustin Bello

(57) ABSTRACT

Methods, machines and systems for processing information are disclosed in which waves containing information select locations for processing (46). Associations between information containing waves may be made and recalled. In some embodiments information containing waves or sequences may be output as visual, auditory, tactile, motion, data or other forms. Software embodiments of the described mechanism are also included.

25 Claims, 42 Drawing Sheets

(56) References Cited

U.S. PATENT DOCUMENTS

| | | | |
|---|---|---|---|
| 2012/0189308 A1* | 7/2012 | Watanabe | G02F 1/395 398/79 |
| 2013/0279561 A1* | 10/2013 | Jin | H04L 25/4902 375/239 |
| 2013/0289877 A1* | 10/2013 | Phan Huy | G01S 1/68 701/400 |
| 2014/0328592 A1* | 11/2014 | Zhou | H04B 10/615 398/65 |
| 2015/0142373 A1* | 5/2015 | Nataf | G01V 3/12 702/150 |
| 2015/0171950 A1* | 6/2015 | Phan Huy | H04B 7/0697 370/329 |
| 2015/0180697 A1* | 6/2015 | Phan Huy | H04L 27/2666 375/267 |
| 2015/0236848 A1* | 8/2015 | Ma | H04L 25/0228 370/328 |
| 2015/0257167 A1* | 9/2015 | Chen | H04L 25/00 370/330 |
| 2016/0085135 A1* | 3/2016 | Park | G02B 27/0012 359/300 |
| 2016/0316283 A1* | 10/2016 | Kim | H04J 14/0257 |
| 2017/0012680 A1* | 1/2017 | Madey | G01S 13/88 |
| 2017/0078024 A1* | 3/2017 | Liu | H04L 5/02 |
| 2017/0156123 A1* | 6/2017 | Smith | H04W 56/0015 |
| 2018/0149476 A1* | 5/2018 | Huang | H04B 10/70 |
| 2018/0226723 A1* | 8/2018 | Sample | H01Q 19/062 |
| 2018/0269982 A1* | 9/2018 | Kim | H04B 10/2575 |
| 2019/0004194 A1* | 1/2019 | Dvir | G01V 1/005 |
| 2019/0020530 A1* | 1/2019 | Au | H04W 72/0413 |
| 2019/0140766 A1* | 5/2019 | Anlage | H04K 3/62 |
| 2019/0250295 A1* | 8/2019 | Goodman | G01V 1/50 |
| 2019/0369056 A1* | 12/2019 | Li | G01N 29/043 |
| 2020/0041676 A1* | 2/2020 | Xiongwen | G01V 1/32 |
| 2020/0406017 A1* | 12/2020 | Moilanen | A61M 37/0092 |
| 2021/0080742 A1* | 3/2021 | Ruan | G02B 26/105 |
| 2021/0111929 A1* | 4/2021 | Jin | H04L 25/0228 |
| 2021/0160829 A1* | 5/2021 | Park | H04L 1/1887 |
| 2021/0199998 A1* | 7/2021 | Wu | G02F 1/113 |
| 2021/0302251 A1* | 9/2021 | da Silva | G01R 19/0046 |
| 2022/0036913 A1* | 2/2022 | Candy | G08B 13/1672 |

* cited by examiner

CONTINUED FROM FIG. 32 A

331

46, 71, 100, 192
CONSTRUCTIVE INTERFERENCE/COOPERATIVE WAVES EXCEED THRESHOLD AND CAUSE RECORDING OF PRECEDING WAVES USING RESONANCE, RESONANCE SIMULATION, NEURAL NETWORK, WAVE CHARACTERISTIC CODE, INTEGRATED CIRCUIT, TUNED CIRCUIT, TUNABLE POLYMER, MOLECULAR CONFORMATION, PROTEIN, DIGITAL, ANALOG AND/OR SOFTWARE

332

72, 117
DORMANT PERIOD.
IF NO REPETITION OF WAVES OCCURS RECORDING RETENTION TIME FADES AT PREDETERMINED RATE

Fig. 32 B

WAVE INTERACTION PROCESSOR

BACKGROUND

Field: pertains to processors.

Devices have been made that assist in daily life, from simple machines to more complex machines that process data and information with operations and calculations. These operations and calculations can be based on hardware or software instructions or programs. Devices with these have now become common in order to increase productivity, safety, save the user time and effort, or for amusement.

SUMMARY

Methods, machines and systems for processing information are disclosed in which waves containing information select locations for processing (46). Associations between information containing waves may be made and recalled. In some embodiments information containing waves or sequences may be output as visual, auditory, tactile, motion, data or other forms. Software embodiments of the described mechanism are also included.

ADVANTAGES OF ONE OR MORE ASPECTS

The advantages of one or more aspects of the following embodiments are that they address each of these areas:

Problem solving, functioning with uncertain or incomplete information, rapid intuitive judgements, useful reasoning, deduction, searching, analysis, creative associations, autonomous processing, and rapid, feedback modulated, coordinated movements.

(a) Can autonomously learn or be taught associations of stimuli, including simultaneous or temporally related stimuli as they happen in real time.

(b) Can be connected to, or exposed to, extensive knowledge bases for learning, and application to text mining or image processing.

(c) Can scan large databases autonomously. Can create new associations based on similar properties, elements or characteristics between old stored data, newly input data or both.

(d) New unforeseen useful associations of any type of input data can be output to a user or computer, for example, by transmitting to the environment images, words, motions, as well as any other designed in manner, such as electronic data.

(e) Can focus on the most important internal or external stimuli at any particular moment, as experienced or taught.

(f) Can control machines or limbs, fully mechanical, prosthetic, natural, or simulated, in a rapid, coordinated manner based on learned movements, real-time multi-sensory input, internally determined requirements, and other learned associations.

(g) Sensory inputs or movement inputs of a connected mechanism can create associations and trigger output.

(h) Allows images, words, or other sensory input external or internal, to be associated with specific learned mechanical movement sequences.

(i) Capable of autonomous activity. Waves or wave interaction may trigger autonomous activity, which may be initiated by internal sensors, external sensors, or other input, and may be due to recalled associations that were experienced previously, learned, or taught.

(j) Allows a wide variety of information such as data, images, sounds, spoken or written words, movements or multi-sensorial experiences, to be input as waves, and to be associated with any other waves internal or external in origin, allowing multiple simultaneously or sequentially.

(k) Input can be any conventional or exotic form depending on connected sensor types, and their conversion to waves if needed.

(l) Output can be many forms, data, visual, auditory, tactile, temperature, chemical, mechanical and others, depending on what output mechanisms are connected.

(m) Can react in a learned fashion to spoken words. When self-learned or taught, associates printed or spoken words with learned sounds and sounds with written words. Associates printed or spoken words with previously associated learned inputs and outputs. Can output learned sounds and words.

(n) Is scalable, from very small and simple, to extremely large and advanced embodiments. The number of associations can be increased by increasing the size of the network, using multiple networks, more sensors, or increasing the number of computers and computer processing power.

(o) Internal and external wave input controls activity. Sensory input is terminated for reduced activity, thus allowing control of the level and type of activity of the network. Intrinsic, internal network waves may be blocked as well for total, complete shutdown.

(p) Allows for tuning of control and operational parameters, and allows for diagnosis. Activity can be visually monitored for proper function on a large scale or minute scale for oversight, tuning and modification of user adjustable parameters.

(q) Sensory input can create a pre-recorded response, as long as adequate learning was provided. Images, sounds, movements, sequences of them, or any other input can be associated with specific learned outputs, or internal recordings.

(r) Learning can be based on repetition of correct associations whether data, visual, auditory, mechanical or any other forms as long as they are waves or can be transduced to waves.

(s) The network can accept considerable imperfections and damage with little reduction in effectiveness.

(t) Any types of waves may be used in embodiments. May use multiple wave types in one embodiment as well.

Thus several advantages of one or more aspects are that the Wave Interaction Processor is capable of autonomous activity, learning, recalling, and acting on learned material. It is capable of creating new associations, which may include previous input, which can be experienced by a monitoring user, and it is capable of controlling and recreating learned, coordinated motions. It is capable of autonomous learning, and acting based on its internal environment, external environment and predicted future environment. Other advantages of one or more aspects are that the system can be adapted for many different uses, whether very simple or very complex. These and other advantages of one or more aspects will become apparent from consideration of the ensuing description and accompanying drawings.

GLOSSARY

Figure 1:
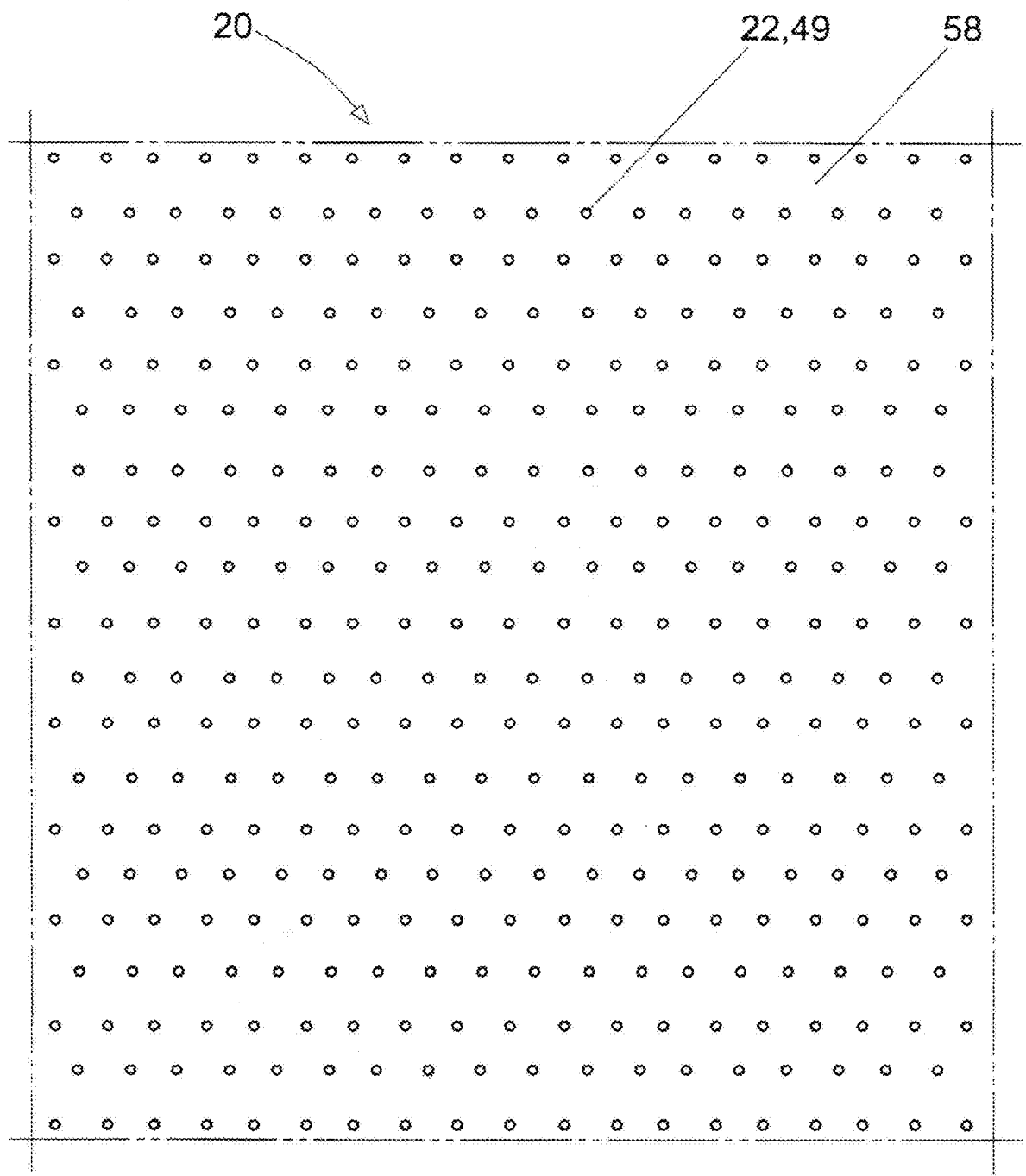
FIG. 1 Overhead view of a network embodiment.

Actuator: A device that moves or controls something. Some embodiments use waves to control actuators. Actuators can provide real time feedback on many parameters to the network as feedback waves. A motor processor may be included in the control of actuators in some embodiments.

Areas: Areas are places, these can be: real locations, software simulated virtual locations or both. Some examples may be places that can be pointed out, demarcated, focused on, or selected. Areas can be on real or simulated networks, media, or vacuum, two-dimensional space, three-dimensional space, and others.

Computer: This can be one or more of any type of computer, including fixed, mainframe, home, business, mobile, cell phone, watch, pad, wearable, or other computers.

Constructive Interference/Cooperating Waves: This means one or more of constructive interference, cooperating waves. Constructive interference is when waves add together or strengthen each other in any way. Cooperating waves are when waves act, are analyzed, or processed together whether they interact physically or not. Cooperating waves may be waves that arrive at an area and may be analyzed, may interact or not, and in some cases may cause an effect. For example, in some cases waves may interact physically and this determines or leads to their effect when processed in some embodiments. In another example embodiment, waves may be physically separated and their net result determined due to analysis. Some embodiments may use both wave interaction and non-interacting wave analysis. Cooperating waves may have an effect such as two or more waves causing recording, playing or radiating, causing a threshold to be exceeded, or other effect. Not all embodiments need two or more waves however to create an effect.

In one example embodiment two or more waves might travel on the same wire, physically interacting, and this may cause an effect. In some embodiments this result would be due to exceeding a threshold, analysis, or both. In another example embodiment the waves would travel in a separated fashion on two or more different wires, never interact physically, and the waves analyzed. The result would be determined from analyzing the waves together, this might be adding the waves for example, and having the net amplitudes affect the activity level of an area in some embodiments. These added amplitudes would then move the node, locus or area closer to firing threshold in this example. This might then cause recording, playing or other action from that node, locus or area should the threshold be exceeded in some embodiments.

The definition of cooperating waves can include waves arriving at or near the same point, with or without interacting with each other which may affect a component, node or locus. Cooperating waves may be totally separate in some embodiments, such as on separate networks and yet be analyzed together. One example embodiment would be where two networks each have their own waves, and these waves are analyzed at specific points in each network and added together to create an effect at those specific points in each separate network. In some example embodiments one network could be topographically mapped to the other. One network might be a copy or similar to the other, and add waves at corresponding points between the two networks without the waves directly interacting, yet still causing effects such as recording, playing or radiating, exceeding thresholds and others. In other cases, the waves may be on the same network, or, networks may be different in size shape or other characteristics.

Cooperating waves definition includes, for example, physical interaction between waves, as well as software simulated interaction and analysis between waves or both. Predicted interactions between waves are also included in the definition.

Some examples of cooperating waves are waves involved in constructive interference, destructive Interference, beats, cancellation, summation, stacking, additive and subtractive wave effects, wave modulation by other waves, and others. Cooperating waves are waves that may cause something to happen due to physical phenomena, analysis alone, or both. For emphasis, and ease of understanding cooperative waves may be referred to here as constructive interference/cooperative waves.

Distributed Network: This is where each node or locus in a network distributes work required by its mechanism to available computers or processors by one or more of: within a geographically delineated virtual overlay hexagon, by IP address, by other methods. This distributed work may be recording, recognizing, radiating, analyzing, processing, or other activity. Available computers for the network would include one or more of: fixed, mainframe, home, business, mobile, cell phone, watch, pad, wearable, or other computers.

Emit Waves: to radiate or play waves, real or simulated.

Focus: When waves affect a particular area, due to wave phenomena. Waves may focus on an area due to one or more of: time reversal, wave time reversal, stacking, adding of amplitudes, constructive interference, waves, reflections, triangulation and others. This area may be on a network with nodes, loci or both in some embodiments for example. This focusing on an area may have effects such as recording, playing, radiating, recreating, or others in some embodiments.

Following Wave: This is a wave that arrives after earlier waves in a selected time period. This following wave arrives after the earlier preceding waves, and usually refers to a wave that may or may not be similar to the preceding waves. In some embodiments, if it is similar to a preceding wave, the following wave is recognized and this recognition may trigger effects such as recording, playing or others. If this wave is different from any preceding wave then no recognition would occur in some embodiments. The following wave may be one or more of: a component of other waves, similar to a component of other waves, the same as other waves, similar to other waves. Following waves may also be different from other waves yet retain some similarities.

Global Reset Wave: This is a frequency adjustable wave that can be periodic, across a network, networks, or selected areas, and allows for the modulation of wave activity in a medium or on a network. This wave can lower the wave mid-level in nodes and loci it encounters. This may be due to direct lowering of the wave mid-level, or resetting to the default wave mid-level in some embodiments. This would mean that the previously over-threshold nodes, loci or areas would fire quickly again after the crest, while the weaker areas would not have time to fire before the next crest in some embodiments. Stronger stimuli would inhibit weaker stimuli by lateral inhibition as well. This global wave would create goal directed activity by limiting associations that are not as strong in some embodiments. The higher the frequency the more concentration on the stronger associations, and the lower the frequency the more time there is for weaker associations to be made in some embodiments.

This wave can be increased in frequency based on overall network activity level in some embodiments, and decreased in frequency in low overall activity situations to create more associations. Although adjustable, a default frequency could be 8-10 Hz for example in some embodiments. There may be different frequencies and types of global reset waves in different embodiments or parts of embodiments. This global reset wave frequency could be reduced on a regular basis to help create more remote associations.

Harmonics: This is when the frequency of one or more waves, of any type, are integer multiples of a fundamental frequency. Partial harmonics and inharmonic partials which do not necessarily have an integer multiple of the lowest harmonic may also be utilized or take place in some embodiments. Wave phenomena, harmonics, constructive interference/cooperative waves are utilized in some embodiments for speech recognition as described in the figs.

Lateral inhibition: This can be where an earlier firing, or stronger, more active node or locus inhibits surrounding nodes or loci. This inhibition may be in one or more dimensions for a radius of nodes as seen in the fig. In some embodiments this might be seven node radius, but this may be vary. Retinal receptive field processing, surround, center-on, center-off processing may also be used in embodiments.

Light Creating Devices: These may be LEDs, lasers, nanolasers, diodes, light bulbs, electron photo-emission and other light emitting methods or devices.

Line Detection: This is when wave phenomena help a network to detect and record lines in some embodiments. This can be due to linear effects created by interfering waves in a network or medium in some embodiments. For example in some embodiments, constructive Interference/cooperative waves can create a large number of sub-threshold lines of various orientations with elevated wave mid-levels. When images are overlaid onto these in the visual area any lines present in an image will be more likely to become over-threshold. These lines will be more likely to be recorded in the association area along with any current associations in some embodiments.

Locate: To find, affect, mark, focus on, select or choose, help to select, partially select. For example in some embodiments constructive interference/cooperative waves can find, locate and focus. Time reversal, and wave time reversal can find, locate, and focus on wave origins in embodiments.

Locations: Places, areas, spots in one or more dimensional space such as in media or networks for example. Locations can be in solids, liquids, gasses, vacuum, semi-solids, meta-materials, organic materials, software simulated virtual locations, and others.

Locus: An area that may have one or more nodes in it having sensitivity to multiple types of waves and wave characteristics. May analyze, record and play back whole waves or parts of waves in some embodiments. Loci is the plural as used here. As with nodes, may be represented with a hexagonal shape in some embodiments. Embodiments with nodes sometimes show them within the hexagonal shape of the Loci on enlargement of the image as seen in the figures.

Medium: Is defined as where a wave or waves can be present. The space, material or both where waves or simulated waves are present, travel, or exist. This may be a virtual simulated area or matter, physical matter, vacuum, simulated vacuum, and others. Some examples may be: anything wave transmitting, vacuum, gas, plasma, liquid, electrolytic solutions, semi-solid, solid, semi-conductor, cellular tissue, light, electrons, sound, homogenous, non-homogenous, computer, networked computers, software simulated wave transmitting areas and others.

Motion: This can be physical or virtual simulated displacement, and can include any type of movement: waves, wave components, movement of particles, movement of subatomic particles, movement of electrons, movement of photons, movement of atoms or molecules, macroscopic movement, movement of mechanical actuators, movement in organic systems, and other types of movements.

Motion Creating: To create wave motion, or mechanical motion, with servos, motors, solenoids, coils, actuators, and other motion creating devices. This may include creating a range of motions in machines. Motion may also be created in simulated, virtual environments.

Motor Feedback: This is where a moving device, sends a signal to the network communicating the characteristics of its current real time motion in some embodiments. This feedback can take any form from any sensor types relevant to the embodiment. This feedback for motion can be for example, rate, tension, strength of contraction, vibration, heat, light, surface texture, pressure, flexion, and many other types. These signals may be converted to waves if needed and then radiate on the network as waves.

Each controllable actuator characteristic, variable, or parameter has a specific feedback wave entry point on a network homunculus body map. In some embodiments this feedback entry point is also that characteristic's control point. The feedback wave here marks the point for wave time reversal focusing in some embodiments. The feedback wave enters the network at its specific location, and then enters the association area where it can be associated and recalled with any associations as described later. When the association is recalled the same feedback wave becomes the actuator control wave in some embodiments. Wave time reversal focusing takes the same wave back to its specific actuator feedback entry or control point on the network, thus recreating the original actuator movement, behavior or conditions in some embodiments.

In other words, these specific feedback entry areas are marked by the actuator's radiating feedback wave input into the network and these specific areas can be activated by the association areas with wave time reversal focusing. In these cases the feedback from the actuator is used to mark the location of the signal the network needs to send to the actuator to activate it in the way it has been moved. In this way an actuator can move, send feedback into the network at a specific location, thus telling the network that it can move the actuator in this same way again with this same wave.

The feedback wave can be matched with the wave time reversal control wave from the association area to match intended real world actuator conditions. This matches the characteristics of the real time feedback wave to the target wave characteristics from the association area control wave. Any differences in the wave characteristics, or wave phenomena, including phase, can be corrected by the motor processor for example. This makes sure the actuator's actual conditions and actual movement characteristics match the intended or expected movements and conditions. That is, the actual actuator movement in real time matches the wave characteristics from the recalled movement. This can be applied to many actuator parameters in some embodiments.

As a simple example, if the feedback wave from the actuator has a frequency of 10 but the wave time reversal command from the association area has a frequency of 17 this mismatch is corrected by the motor processor until the actuator's feedback frequency is 17. This may be for any parameters, for a simple example, a rate or 17 m/s, or 17 n.m., 17 psi, or 17 degrees for a joint, each of these parameters having its own position in two or three dimensional space in the network body homunculus. These numbers and parameters may be different in actual embodiments.

Feedback waves themselves can trigger associations in the association area for many other types of associations, for example associations triggering further movements or movement sequences in the same limb. Another feedback regulated example might be that images may be associated with the correct learned and recalled pressure for gripping an egg for example, should an association for gripping it be recalled.

Network: The area where waves are present or travel in an embodiment. Networks may have a grid-like, reticular, patterned appearance due to nodes and/or loci and interconnections as in the figs. in some embodiments. Other embodiments may not have a reticular appearance, non-reticular, but still have nodes and/or loci coupled to the network. Non-reticular networks may have sensors in a medium or remote sensors coupled to the medium in some embodiments. These sensors may be coupled to nodes and/or loci in some embodiments. Also, these sensors may be nodes and/or loci in some embodiments.

Networks may radiate waves, record waves, recognize waves, analyze wave phenomena, engage in wave time reversal and other activities in embodiments. This may be achieved with distributed processing units, distributed wave processors, or with one centralized wave processor with multiple functions incorporated into one unit in embodiments. Distributed microcontrollers may be used in some embodiments.

Some networks may have multiple sub-networks or layers in them. Some embodiments may intra-connect their own network areas or inter-connect with other networks or layers. Networks may be inter-connected sub-networks arranged in layers. A delegated network is an embodiment with one or more sub-networks or a paired network. A delegated network can have multiple networks that delegate activities to each other. Networks may be mechanical, electronic, biological, virtual computer simulated, paired, delegated, quantum entangled networks and others.

Neural Network: Devices which are loosely based on biological systems and used for many purposes.

Node: An area that can be sensitive to wave characteristics and phenomena, which can be frequency in some embodiments for example. May record or play parts of waves or whole waves in some embodiments. May be represented with a star shape in some embodiments. Node branches may inter-connect with other nodes for wave transmission. A space may be used between node branches to show node boundaries, but may not actually be present. Some embodiments may actually have a space between node branches and use a different means of transmission to jump the space such as a semiconductor or a variable concentration electrolytic solution for example.

Original sources: This refers to the location or area where the waves referred to first radiated, in the segment of time selected. Real, software simulated or both, places in space or virtual space where specific waves came from on the network, often for the first time. For example, new waves from external sensors may enter and radiate on a network grid at specific locations which would be called the original sources for those waves, in other words, where the waves originally came from, played, or radiated from in a selected period of time.

When referring to a specific temporal sequence of waves, the original sources are usually where the first waves of that sequence came from in some embodiments. These may be sensory waves coming in from environmental sensors, associations from the association areas, motor feedback waves, waves from recalled or recorded events on the network, or others.

Origins: Origin of waves are where those waves referred to came from. They may be real, software simulated or both, places in space or virtual space where specific waves occurred, for example in a system, part of a system, organic system, simulation, apparatus, network, reticular grid, and others.

Oscillator: Something that moves between different states. This can refer to anything that can create or be influenced by waves and others. Some oscillators may make pulses and be influenced by them as well. For example oscillators can utilize oscillation, vibration, resonance, pulses and others. Some examples would include tuned objects, polymers, tuned circuits, tuned crystals, piezoelectric materials, wave generators and more. Some oscillators can be simulated on a computer.

Output: This is that which leaves the network or medium. Waves, control signals, data streams and other emanations that may flow out may sometimes leave the network or medium in order to affect something, to affect an actuator for example, or to create an image on a monitor, or a sound in the environment, or to send data to electronics, to send data to packet based systems in some embodiments.

Over-Threshold: This refers to when wave phenomena cause a wave or a portion of a wave to exceed a specific point or quantified setting. This threshold can be exceeded by constructive interference/cooperative waves, summation, and other wave phenomena. The threshold can be exceeded by any type of over-threshold waves, pulses, spikes, simulated waves, and other wave types.

Playing or Radiating: The definition of the word playing and the word radiating is the same here, and may be used interchangeably. This is when any type of waves are created, or recreated, whether real, simulated, virtual or others. An example would be when a light turns on it radiates waves, another would be when a speaker plays it also radiates waves. Another would be when a guitar string is plucked it plays or radiates sound waves. Some examples of playing and radiating are: creating waves, making a wave or waves happen, oscillations, vibrations, software simulated oscillations, physical oscillations, mechanical playing, playing whole waves, playing of parts of waves, partial playing, inexact playing or copying of waves, approximated playing, digital playing, electronic playing, organic playing, playing or radiating recordings, and other types. For example: sometimes when waves arrive at a location they may focus, stack one on top of the other, exceed a threshold, and so cause playing or radiating.

Preceding Wave: This may be any wave that comes before another in a selected segment of time. Usually refers to an original wave from an original source in a chosen time sequence. This wave may come from sensor's inputs to the network or other parts of a network such as the motor areas or association areas seen in later fig. for example.

Processor: A device that processes. This may be processing of waves and wave phenomena. Waves may be processed for many reasons including to analyze waves, extract wave data, set thresholds, set wave mid-levels, play, record, recognize waves and others.

Pulses: These can be singular spikes in some embodiments. Multiple spikes or pulses can build up waves as seen in the fig. Singular spikes or pulses may be combined over an area and used to build up waves in some embodiments. Spike or pulse amplitude may rise and decline to build up waves in some embodiments.

Recognition: To recognize a wave or wave sequence. This is recognition of similarity between waves or wave components. Exact waves, similar waves, components of waves, similar components of waves, and others can be recognized. The recognition of a wave or wave characteristic may trigger playing or radiating of a wave containing that same trait or wave characteristic if a recording is present in some embodiments. Recognition may be due to one or more of: neural networks, machine learning, wave matching, wave characteristics matching, matching wave characteristics codes, matching assigned wave codes, digital processing, analog processing, computer assisted processing, resonance, resonance simulation, vibrating, frequency matching, tuned cavities, tuned light cavities, tuned lasers, tuned mechanical cells, tuned organic cells, tuned circuits, tuned polymers, tuned actin polymers, tuned membranes, tuned channels, tuned crystals, tuned crystal oscillators, tuned structures, tuned atomic or sub-atomic entities or elements, tuned molecular structures, tuned objects, computer or software simulated tunings, other resonating objects or other mechanisms in some embodiments.

Recording: Saving waves or temporal sequences with the ability to recall, recreate, or partially recreate them in the future. Any recording type may be used. Recordings may be played back to recall associations in multiple dimensions by time reversal or wave time reversal in some embodiments.

Some examples may be: real recording, software simulated recording, digital recording, analog recording, recording resonance, recording vibration, recordings of parts of waves, recordings of whole waves, inexact recordings, partial recordings, rough recordings, approximated recordings, sampled recordings, mechanical recordings, electronic recordings, organic recordings, simplified recordings, documenting characteristics, and other types.

Recreating: This can be where waves, motions, or other things are recreated, re-radiated, or re-played, and do not have to be recreated exactly or completely.

Reflection: This helps in creating waves at different locations. Embodiments may use reflections created by various means. Reflective areas, borders, objects placed in the medium or network may be of many types, partially reflective, amorphous, areas that are not homogenous, irregularities, differing densities, randomly oriented particles and shapes, prisms, and many other types of reflection inducing entities. The reflective items, such as blank nodes for example, in the fig. represent these many different types of reflections and their shape may vary from those in the fig. In some embodiments reflective entities may be placed randomly into networks or media. Also refractive situations or entities may guide waves in embodiments as well. Waves may also be funneled to some areas by reflecting off sides or borders in some embodiments.

Saving/Memory: This allows something to be recalled.

Selecting: This may be, for example, when virtual or real wave phenomena act on a location differentiating it from the surrounding areas. Selection by constructive interference/cooperative waves, or wave focusing may cause recording or playing in some embodiments. For example, wave time reversal and time reversal select locations in the network for playing or recording waves. Selecting includes predicted selecting or selections, expected selecting and selections, wave focusing, predicted wave focusing and others.

Sound Creating Devices: Anything that produces sound. These may be speakers, transducers, ratchets, actuators, machines, voice boxes, organic body parts, muscles and other sound producing items.

Threshold: A level which may be exceeded by wave phenomena, including constructive interference/cooperative waves. Thresholds may be exceeded by a wave alone or by waves interacting. The threshold may also include a range of levels as well in some embodiments. Some embodiments may determine the current additive amplitudes of waves and compare them to a threshold. Exceeding of thresholds by waves may cause recording, playing or radiating for example. In some embodiments wave summation may lead to exceeding the threshold. Other wave characteristics and interactions may also affect the local wave environment and cause a change relative to a threshold. In some embodiments the threshold is changed to modulate activity.

The threshold is set at a selected level relative to the average wave mid-level of the network or area in some embodiments. A wave mid-level may move relative to a threshold in some embodiments as explained later, making recording or playing more or less likely. Waves may oscillate on this wave mid-level in some embodiments. Strong waves of high amplitude or waves that have their amplitudes added may exceed the threshold by bridging and exceeding the distance between the wave mid-level and the threshold in some embodiments. These levels may be set at selected numbers based on expected, quantified wave amplitudes depending on the design of the network, its sensors, outputs and other variables.

Time reversed waves: This definition includes one or more waves that return via their original path or paths, or other method, back to their starting origin or origins and focus there. The time reversed waves travel back to their starting origins or sources as though time were reversed and the waves focus on their original sources. This focusing may cause the waves to play there in some embodiments. This can be actual time reversed waves, software simulated time reversed waves or both. Time reversal focusing is aided by any reflective situations present in the medium, be they objects, discontinuities, irregularities, changes in density, changes in material, edges, thermal changes, or other reflective or partially reflective situations.

Time Wave: A wave or waves used for timing. These waves can be recorded to provide a timing signal for temporal sequencing of waves. Some time waves may be a regular frequency but incorporate unique constantly changing or random overtones for triggering, or helping to trigger associations when recognized.

Transducer: A device which can transform or interchange different types of energy. These can change waves from one type of energy to another. They can change different types of data to wave energy and vice versa in some embodiments.

Trigger wave: Trigger waves may be following waves that cause an effect. Trigger waves may cause for example: recording of a wave or wave environment, playing of a wave or waves, and other effects. A trigger wave or waves, may be real, software simulated or both. A trigger wave may be a wave or waves that come at a later time than preceding waves or original waves. The trigger wave or waves may be a copy of the original wave or waves, a modified copy of the original wave or waves, a low resolution copy of the original wave or waves, a wave that is similar to the original wave or waves, a wave that is similar to a portion of the original wave or waves, a component of the original wave, a wave that is similar to a component of the original wave or waves, or other type of waves or wave sub-components.

Wave: This can be any type of wave. In some embodiments this may be a sine wave, or waves that are simulated or approximated in others. Any wave may also be represented in various ways. Some waves may be saw tooth waves, square waves, pulse waves, spikes and others in some embodiments. Some waves may be built up from states, pulses, spikes or other wave types as well. Switching between states or conditions may be considered waves in some embodiments. Switching between 1 s and 0s could represent or build waves also. Waves could be mathematically modeled in some embodiments. Waves could be made up of sequences of individual pulses or spikes as described in the figs.

Some wave examples may be: deviations from a state, a disturbance, a change, a discontinuity, oscillation, transfer of information, transfer of energy, transfer of mass, having frequency, having wavelength, having amplitude, having period, having cycle, a disturbance at one particle leading to a disturbance at another particle, change that could be represented by a sine curve, having motion perpendicular to direction of travel, having motion in the longitudinal direction of travel, having perpendicular motion with no longitudinal motion, having longitudinal motion with no perpendicular motion, real or virtual components which create real or virtual oscillation or disturbance, mathematically approximated changes, mathematically simulated changes, moving between two conditions or states, mathematically simulated oscillation, optically created oscillations, mechanically created oscillations, electronically created oscillations, electronic packets.

Some more example waves can be: a change and its after-effects, waves, analogues of waves, waves similar to other waves, a component of waves, waves similar to a component of other waves, simulations of waves, mathematical representations of waves, wave codes, transverse waves, longitudinal waves, stationary waves, standing waves, a moving change, pulsing, vibration, resonance, back and forth motion, undulation, cycling, numerical representations of waves, data on waves, information about waves, spikes, pulses, solitons, phonons, light waves, photon waves, physical waves, mechanical waves, sound waves, pressure waves, energy level changes creating waves, ion waves, electrical waves, electron waves, atomic energy level changes creating waves, electron energy level changes creating waves, photon energy level changes creating waves, waves of changing sub-atomic, atomic or molecular conformations, electron spin creating waves, up or down electron spin wave encoding, + or − electron spin wave encoding, quantum waves, quantum mechanical waves, quantum bits (qubits) creating or representing waves, quantum bits (qubits) encoding waves, waves made from sub-atomic islands of waves, waves made from packets of waves, waves created from conditions across one or more dimensional space, wave-like situations, real waves, calculated waves, waves predicted from data, particle waves, sub-atomic particle waves, electronic waves, magnetic waves, gravitational waves, combinations of different types of waves, electromagnetic waves with a medium, and without a medium such as in a vacuum, waves built-up by sub-components of waves such as particles, pulses or spikes, waves of particle motion, waves created from spinning objects, waves built up from electronic signals, waves built up from on and off states, waves built up from up and down states, waves built up from intermediate states, mathematically calculated wave states, past waves, combinations of different waves, travelling waves, solitary waves, waves built from differing packet based densities or content, and others.

Wave Characteristic Detecting Processor: A processor that detects and analyzes wave features like waveform characteristics, and wave phenomena as well in some embodiments. It may analyze wave shape, frequency, amplitude, attack, sustain, decay, overtones, phase, multiplexing, beats, constructive interference/cooperative waves, and also many other wave phenomena in some embodiments.

Wave Emitting Device: This creates real or software simulated waves. It can emit any type of wave. It can emit waves it processes in some embodiments. It can include any wave emitting, radiating or playing devices, for example, transducers, LEDs, lasers, speakers, wave generators, oscillators, or any motion creating device, and many others as well. Wave emitting devices can radiate or play waves in at least one dimension. Wave emitting devices can emit waves in media, along wires, optical fibers, and in many other ways. Wave radiating and playing are the same for embodiments.

Wave Mid-Level: A reference level for the wave environment in a wave, node, locus, medium, network, area or others. Waves oscillate on or at this level in some embodiments. This level may move toward or away from a selected default level. This level may be raised or lowered by the waves currently at a location in some embodiments. The threshold and wave mid-level move relative to each other in some embodiments changing the likelihood of an effect being triggered upon wave peaks exceeding the threshold.
Wave Processor: A device that analyzes or processes any type of waves and wave phenomena. This analysis or processing can include one or more of: any wave associated devices, such as nodes, loci, resonator/oscillator, wave detector/emitter, transducer, wave emitter, wave radiator, wave threshold analyzer, wave recorder, wave recognizer, wave player, sequence recorder, wave mid-level processor, motor processor, input conversion processor, graphics processor, intrinsic wave processor, wave phase analysis and modulation processor, and others depending on the embodiment.

Wave Processors may be distributed processing units, distributed wave processors, or one centralized wave processor with multiple functions in embodiments. Distributed integrated circuits or distributed microcontrollers may be used in some embodiments.

The wave processor may process waves for many reasons including to analyze waves, extract data from waves, insert data into waves, analyze the phase and wave characteristics of waves relative to other waves, set wave mid-levels, set thresholds, radiate, record, recognize waves and others. This wave processing can include analysis of wave features like waveform characteristics, and wave phenomena as well in some embodiments. It may analyze wave shape, frequency, amplitude, attack, sustain, decay, phase, overtones, multiplexing, beats and also many other wave phenomena in some embodiments. A wave processor may have many of these functions in some embodiments. There may be one or more wave processors in some embodiments.

Wave Recognizer: This processes and recognizes waves. Any method may be used to recognize waves. A wave recognizer may use the information, devices, means and methods in the text and in this glossary under the definition of recognition to recognize waves.

Wave Recorder: This processes and records any type of waves. Any type of recording may be used to record waves. This may record waves, partial waves, similar waves, wave sequences, and others in some embodiments. A wave recorder may use the information devices, means and methods in the text and in this glossary under the definition of recording to record waves. The recordings may be of any type, resolution or quality. The wave recorder may modify the waves it records. The wave recorder may store modified recordings.

Wave Sensing Device: This senses wave characteristics and wave phenomena, and analyzes or allows waves to be analyzed in some embodiments. A device that can sense waves for processing in some embodiments.

Wave Time Reversal: One or more waves that return via their original path or other method back to their origin and radiate there in their original order. The wave time reversed waves travel back to their starting origins or sources, and the waves focus on their original sources. In wave time reversal, the wave's temporal sequence at the starting point and the later area of focused radiation are the same, or similar, and not reversed.

For example, if a wave's temporal sequence were 1234 originally, then in time reversal it would travel back to its origin and be focused and radiated there reversed as 4321. On the other hand, in wave time reversal, if the wave's temporal sequence were 1234 originally, then it can remain 1234 throughout the entire wave time reversal process in some embodiments. However, wave time reversal also includes time reversed waves that are modified or converted in their temporal sequence. That is, wave time reversal can use time reversal initially, having the order 4321, and then return to the original order 1234 at any point in the steps leading up to the focal point radiating the original 1234 sequence in some embodiments. Wave time reversal can reverse the time reversed sequence to the original 1234 at any point including at the moment of focal radiation in some embodiments. In other words, in some wave time reversal embodiments the waves would use time reversal and then un-reverse the sequence at the final focal point to obtain the original sequence in some embodiments.

Wave time reversal focusing is aided by some reflective situations present in the medium, they can be objects, discontinuities, irregularities, changes in density, changes in material, edges, thermal changes, or other reflective or partially reflective situations, as long as they don't block wave transmission.

Wave time reversal includes real waves, software simulated waves or both types of waves and others. In some embodiments the mechanism of time reversal or wave time reversal may be distributed over one or more networks. Some embodiments may distribute the mechanisms over one or more layers of networks. In these cases the focused waves may be recreated at analogous or non-original sources.

REFERENCE NUMERALS

20. Network
21. Resonator/Oscillator, Wave Detector/Emitter, Wave Processor
22. Node, Wave Processor
23. Node Branch
24. Variable Resistor and/or Threshold Activated Switch, Wave Processor
25. Extension of Node
26. Extension of Node with Playback to Surface
28. Sequence Link Extension
29. Threshold
30. Extension/Connector for Recording and Playing
31. Wave Mid-Level
31 L. Lower Wave Mid-Level
31 H. Higher Wave Mid-Level
32. Sub-threshold Intrinsic Wave Spectral Input
33. Intrinsic Wave Processor, Wave Processor
34. Sub-threshold Intrinsic Wave Learning Output/Temporal Marker
35. Sensor
36. Network Sensory Input
37. Actuator
38. Motor Actuator Output
39. Motor Processor, Wave Processor
40. Motor Actuator Feedback Sensory Input
41. Source
42. Source 42
44. Source 44
45. Harmonious Integer Ratio Waves
46. Constructive Interference/Cooperative Waves
47. Destructive Interference/Cooperative Waves
48. Wave
49. Locus, Loci (plural), Wave Processor
51. Wave Mid-Level Processor Connector
53. Node (middle)
55. Node (upper)
57. Node (lower)
58. Medium
62. Lengthening Line of Primary Constructive Interference/Cooperative Waves 63. Secondary Nodes
64. Lengthening Line of Secondary Constructive Interference/Cooperative Waves
66. Input Conversion Processor, Wave Processor
68. Internally Generated Waves
74. Recognition of Waves
75. Wave
77. Pulses or Spikes
80. Wave Time Reversal, Time Reversal, Reflections, Triangulation, Refraction
82. Visual Sensory Area
83. Camera
84. Auditory Sensory Area Left
85. Microphone
86. Auditory Sensory Area Right
88. Central Association Area
89. Joint Position Feedback Input
90. Motor Area Anterior Body/Distal Limb
91. Source 91 (third source)
92. Motor Area Posterior Body/Proximal Limb
93. Sensory Area
94. Sensory Area Anterior Body/Distal limb
96. Sensory Area Posterior Body/Proximal Limb
97. Past Time/Older Association
99. Old/Previous Association with Time Stamp
104. Central Constructive Interference/Cooperative Waves
106. Blank Node or Blank Locus
108. Lateral Inhibition Extensions Network Layer
111. Preceding Wave
112. Following Wave
114. Visual Image Processor, Wave Processor
115. Sub-Threshold Wave
116. Over-Threshold Wave
117. Dormant Period
118. Sequence Recorder, Wave Processor
119. Wave Mid-level Processor, Wave Processor
120. Sequence Recorder Connector
121. Wave Recorder, Wave Processor
123. Blank Node Group or Blank Locus Group
133. Keyboard/Touchpad
134. Geographical Street Map
135. Street
136. Computer Locations which can be: Fixed, Home, Business, Mobile, Cellphone, Pad or other Computer connected to the network, Wave Processor
137. Virtual Network Overlay
140. Packet Based Wireless Connection
142. Wave from Source 42
142 H. Harmonious Integer Wave from Source 42
142 R. Recorded Waves originally from Source 42
144. Wave from Source 44
144 R. Recorded Waves Originally from Source 44
145. Reduced Wave Mid-Level
146. Recovery Period
150. 150 Hz
152. 152 Hz
154. 154 Hz
163. Waves from Source 63
170. Battery
172. Charger
174. Graphics Processor, Wave Processor
176. LED Monitor Display
177. Pulse, Spikes, Firing to Wave Creation Type A
178. Pulse, Spikes, Firing to Wave Creation Type B
179. Transducer, Photodetector/Light emitter, Wave Detector-Recorder/Player, Wave Processor
180. Example Edge of Locus
181. Wave Lower Reference Level
182. Global Reset Wave
191. Wave from Source 91
192. Recognition
194. Time Wave
195. Time Sub-Network
210 E. Preceding Wave from 42
212 E. Preceding Wave from 44
214 E. Interference

DETAILED DESCRIPTION OF DRAWINGS FIG. 1-36

General Information

Processing is based on waves and the information they contain. Waves of any type are radiated and picked up in locations called nodes or loci, placed in space. Some embodiments may set up nodes and loci in an area called a network in a grid-like pattern and others in non-grid-like. Some embodiments may radiate waves in a medium, which is any area where waves may be transmitted. Waves may be directly or remotely detected and radiated into a medium or network in some embodiments. Software or simulation based embodiments may utilize numerical modeling of wave propagation and wave interaction.

Waves may enter a network area from conventional external sensors, internal sensors or be generated within the network itself in some embodiments. When waves, including external or internal sensor waves, and network generated waves arrive and interact with the waves already in the network they are evaluated for their strength. These waves are then compared to a threshold at points in the network such as the nodes or loci in some embodiments. The waves may be detected, recorded, recognized and played back by conventional means from these points in some embodiments. The wave recognition for example may employ conventional neural networks, conventional computer analysis, or conventional resonance in some embodiments.

Waves, sequences of waves, or wave data may be sent out from points in the network to external effectors and cause events to occur that can be wave based, such as sounds, images, motions, data transmission, and collections or sequences of these and others. Waves that are sent out of the network may trigger non-wave based events in some embodiments.

The wave mechanisms of time reversal or also as described here, modified time reversal, called wave time reversal, are utilized in some embodiments. These wave mechanisms, in part, select specific locations in the network, and cause or create recording, playback, or wave output there.

The waves shown in the fig. are examples chosen for clarity, and they may vary in actual practice. The number of waves present and interacting may be few or very numerous depending on the complexity of the embodiment. The wave characteristics, origins, interactions, phenomena and situations may vary from the figures as well in some embodiments. Although some embodiments may be very simple involving only a few nodes or loci, others may not be. Some networks may involve far more nodes and loci, far more wave diversity, wave complexity and wave interactions than those illustrated.

Wave types and conducting path types may differ across a network. Waves would be able to travel through nodes and Loci in some embodiments. Waves would also travel from node to node and locus to locus through solid, liquid, gas, plasma, vacuum, or other wave conducting paths or wave radiating network media in some embodiments. The network may use a medium, including a vacuum with waves, and imaginary node or locus locations in it, with surrounding, remote, wave sensitive sensors, wave generators or radiators in some embodiments. Any network, media, waves and mechanisms may also be simulated in a computer for example in some embodiments.

Some figs. show embodiments with networks, nodes or loci that could be made from electrical conductors, semiconductors or other materials utilizing integrated circuit manufacturing techniques.

Some figs. show nodes or loci with spaces between nodes or loci in the network to distinguish them from one another. These spaces may not be present in some embodiments, and the nodes or loci may be continuous with one-another across a network. On the other hand, these spaces can represent or contain different wave conduction methods. For example nodes or loci based on semi-conductor may end in spaces between them that can utilize different methods of wave conduction in different embodiments. In some embodiments different media may fill the spaces, a vacuum, a liquid, a solid or a combination for example may fill the spaces, a conductive solid or electrolytic solution, semi-conductor, or many other methods could also be used alone or combined. The network, nodes, loci and spaces between them could transfer wave data rather than actual waves, or be fully software simulated in some embodiments.

In some embodiments the general system consists of a network with a wave conducting area and specific points in it. These specific points may be considered basic network components in some embodiments. These specific points or locations are the nodes or loci previously mentioned. They may be placed randomly, in a pattern or both. Under specific conditions these nodes or loci may be thought of as having some functions similar to pixels, or may be used to represent pixels as seen in a computer monitor in some embodiments. In one example situation, a single light input to the network may be one pixel, whereas an entire image such as the image of a letter consisting of multiple pixels, a word, a person, or a house, may have far more pixels or far more areas or locations that can represent pixels active. In this way nodes or loci may seem to have end results that are similar to pixels in some embodiments. Visual images, and moving images may be formed by pixels, and in a similar way may be formed by nodes or loci in some embodiments. Sounds and motion may also be formed by nodes or loci as described later.

In the fig. for clarity only one or a few basic network component nodes or loci will be shown, and these with simplified, usually generic waves.

Embodiments can have one or more wave processors. Wave processors can have one or more processor functions needed for the mechanisms of embodiments as well. There can be one centralized wave processor in an embodiment, distributed processors across an area in another embodiment, and other possible arrangements and numbers.

For purposes of clarity of illustration some of the figures may be magnifications of parts of networks and show far fewer basic network components than would be used in some embodiments. In these cases magnification will show far less nodes or loci.

Also for clarity in the figures, the basic network units, nodes or loci recording, radiating or playing are shown much closer together than they would be in many embodiments. This means that there would be more basic network units, nodes or Loci between the depicted active locations in some of these figures in some embodiments. There would be more areas of interference and interaction between the waves than illustrated in the following figures, in some embodiments, but many are not shown for clarity. Also not able to be shown in the fig. are moving waves, large numbers of areas of interference, and other wave phenomena that would also be present, although some are visually represented and discussed.

For compactness and clarity some events and locations that would take place in specialized, far apart areas across the network are shown close together on only one figure.

Wave reflections and reflecting, non-transmitting areas, which take part in the mechanism may be shown in a lesser number than used in some embodiments or not be shown for clarity of the figs. Some of these areas are called blank nodes or blank loci, or silent nodes or silent loci. These reflective areas may take any random or irregular shape and be different from the fig. depictions. Borders of networks and media may be smooth or irregular and reflective as well in some embodiments.

For the embodiments described any wave type may be used as seen in the glossary under the term wave. If entangled photons are used they may enable communication at a distance across or between networks.

Different embodiments may have differing numbers of various locations, for example nodes, loci, inputs to the network, interference areas, recording areas, recognizing areas, playing areas, recreated wave areas, and output areas.

Flowcharts in the figs. may use different geometrical shapes for the purpose of differentiating between objects or functions for clarity. These geometrical shapes do not necessarily have pre-conceived conventional functions or meanings assigned to the shapes. Additional reference numbers relevant to contents are added inside these geometrical shapes in the flowcharts.

Numbered items in the text are used as written in the drawing numeral reference list without their singular or plural in some cases so that they may be more easily found in a search.

The terms triggering or firing of the node or locus may be used when an action is caused, such as recording, playing, or activating an actuator for example in some embodiments.

Structure of One or More Embodiments

FIG. 1

FIG. 1 is an overhead, magnified view of a section of a non-reticular network. This fig. shows a small network, or magnified view of a section of a larger network (20). The word network will be used in a general fashion to include the wave transmitting area and other components in some embodiments. The type of network seen here in FIG. 1 is a non-reticular network embodiment. Subsequent figures will show other types of networks. In FIG. 1 we see small circles depicted in, on, or near a wave transmitting medium (58). These small circles may also be represented in software embodiments. The medium in FIG. 1 is represented by the spaces between the small circles but can be in them as well. The wave transmitting medium may be software simulated in some embodiments. The media can be anything where waves may exist or wave transmitting, which includes the media listed in the definition of medium in the glossary. These media would transmit the waves or simulated waves freely in one or more dimensions, and may contain wave reflecting elements in some embodiments.

The circles in the figure represent basic network units which are called nodes (22) or loci (49), which may differ in their characteristics as explained later. Node is singular, nodes is plural, and locus is singular while loci is plural. Nodes or loci interact with the wave transmitting medium. These nodes or loci engage in part of a mechanism described later, and can act as wave detecting locations, recording, recognizing, transmitting, and radiating or playing locations in some embodiments. Some embodiments may employ a few or even just one of these basic network units, that is, a node or a locus. At the other extreme a nearly unlimited number of locations, the previously mentioned basic network units, nodes or loci, could be used for the network at the upper range in some embodiments.

Any types of waves may exist or be transmitted in the medium of some embodiments, and may include waves or wave analogs. The nodes or loci would work with the wave type or types the network uses. For example, a locus or node employing a photodetector and light emitter would work with light waves, whereas a different type of transducer may work as a detector and emitter when working with mechanical or sound waves in some embodiments. Some embodiments may have the network nodes or loci function with more than one wave type, light, sound and data for example.

Integrated Circuit and Other Embodiments

Some network embodiments would be made like a printed circuit board or integrated circuit, with the board itself as the wave transmitting medium. These may be made into a non-reticular or reticular network with embedded transducers, or copper metal as the wave transmitting medium if utilizing electrical waves in a reticular network embodiment. In more complex networks there could be smaller integrated circuits or microcontrollers at each node or locus with a wave recording, recognizing and playing capability, along with input and output to, and from, the network. Remote computers connected to the nodes or loci, remote microcontrollers or microcontrollers dispersed throughout the network would be utilized in embodiments. These will be used in some of the fig.

In some embodiments the wave input to the network would be at the nodes or loci, input by connected sensors. This input may be from sensors such as transducers in the case of sound, or wave generators in remote actuators. In the case of actuators, elongation rate and other parameters may be wave encoded in some embodiments for example. This may be a pulse generator or a ratchet mechanism in some embodiments.

The inputs to the medium may consist of wave players, electronic wave generators, signal generators, arbitrary wave generators, function generator integrated circuits, digital pattern generators, frequency generators, software tone generators, stacked pulse wave emulators, mp3 players, equivalents and others.

Light waves may be input and radiated on the network in some embodiments which could utilize a light transmitting medium with photodetectors and light emitters at each node or locus. In some embodiments nano-lasers would radiate the light waves at the point of contact with the transmission medium. In some embodiments light waves may be transposed to other frequencies for input to the medium, and transformed for input to the network. For example light waves could be converted or transformed to sound waves, electrical waves or any type of wave or software coding for network interaction. Waves and or media may be changed from type to type within networks for different types and speeds of interaction in some embodiments. Microcontrollers or other integrated circuit controllers may be distributed throughout the network at, or connected to, each node or locus to perform functions such as wave recording, playing, and in embodiments utilizing neural networks, for wave recognition for example. Remotely connected computers may do this in some embodiments. Thus some embodiments would consist of a wave transmitting medium with distributed microcontrollers for recording, playing and neural network recognition of waves, some with remotely connected computers. In some reticular embodiments electrical waves would be transmitted along electrically conducting paths between nodes and loci containing microcontrollers. The network may work with a more distant computer or computers, and use the network nodes or loci as sensing points for recording, recognizing waves, and input points for playing waves.

Crystals, Resonance, and Other Topics

In some embodiments resonance at the nodes or loci such as with resonating objects like crystals, rods or other physically or electrically resonating objects may be used for recording, playing and recognizing waves transmitted through a wave transmitting medium or conducting path.

Figure 12:
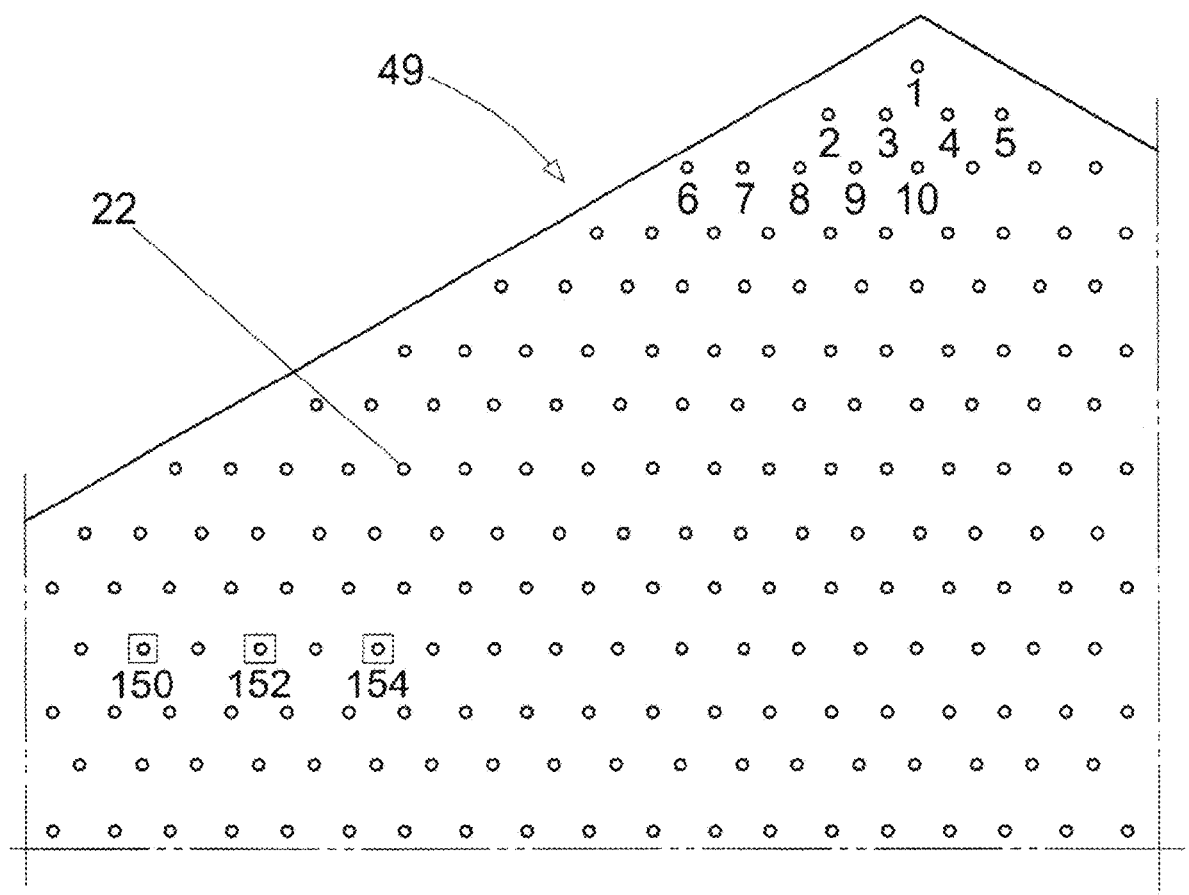
FIG. 12 Overhead view of network components in an embodiment.
Figure 13:
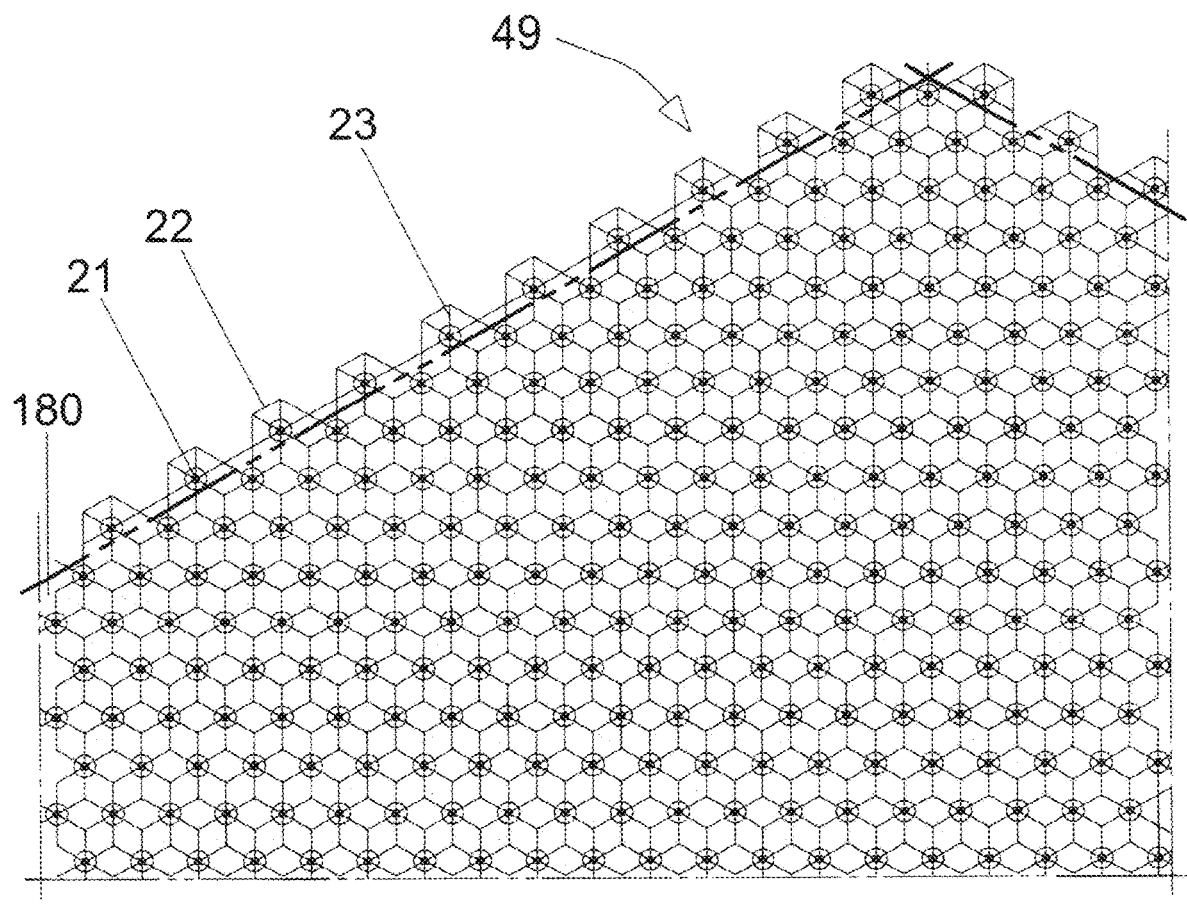
FIG. 13 Overhead view of network components in an embodiment.
Figure 14:
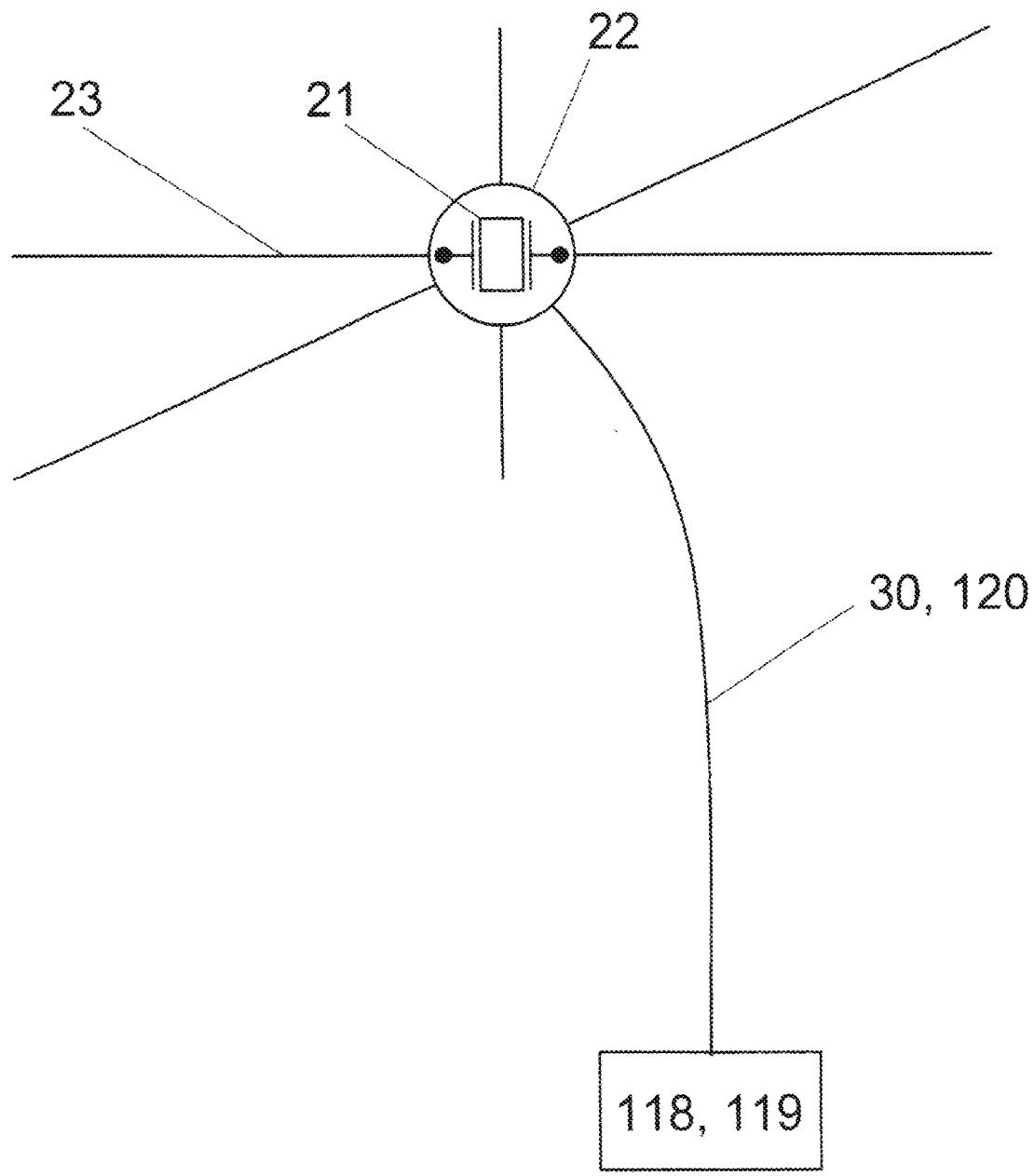
FIG. 14 Perspective view of part of FIG. 13.

These resonating objects would be resonator/oscillators such as tuned, shaped crystals specific for their designated frequencies as may be used on FIGS. 12,13 and 14. They may also be tuned circuits, tuned polymers, tuned metals, tuned silicon derivatives or other tuned materials in some embodiments for example.

Waves may be sensed from the environment by transducers, microphones, photodetectors or input electronically from packet based sources that have been converted to waves or software simulated waves.

There may be random areas within the medium incapable of, or partially capable of transmitting waves in some embodiments. Non-transmitting or partially-transmitting areas may be random, irregular shapes or sizes and would be reflective to waves in a manner similar to wave reflection in the natural environment in some embodiments, and would facilitate time reversal and wave time reversal mechanisms described later.

FIG. 2

Figure 2:
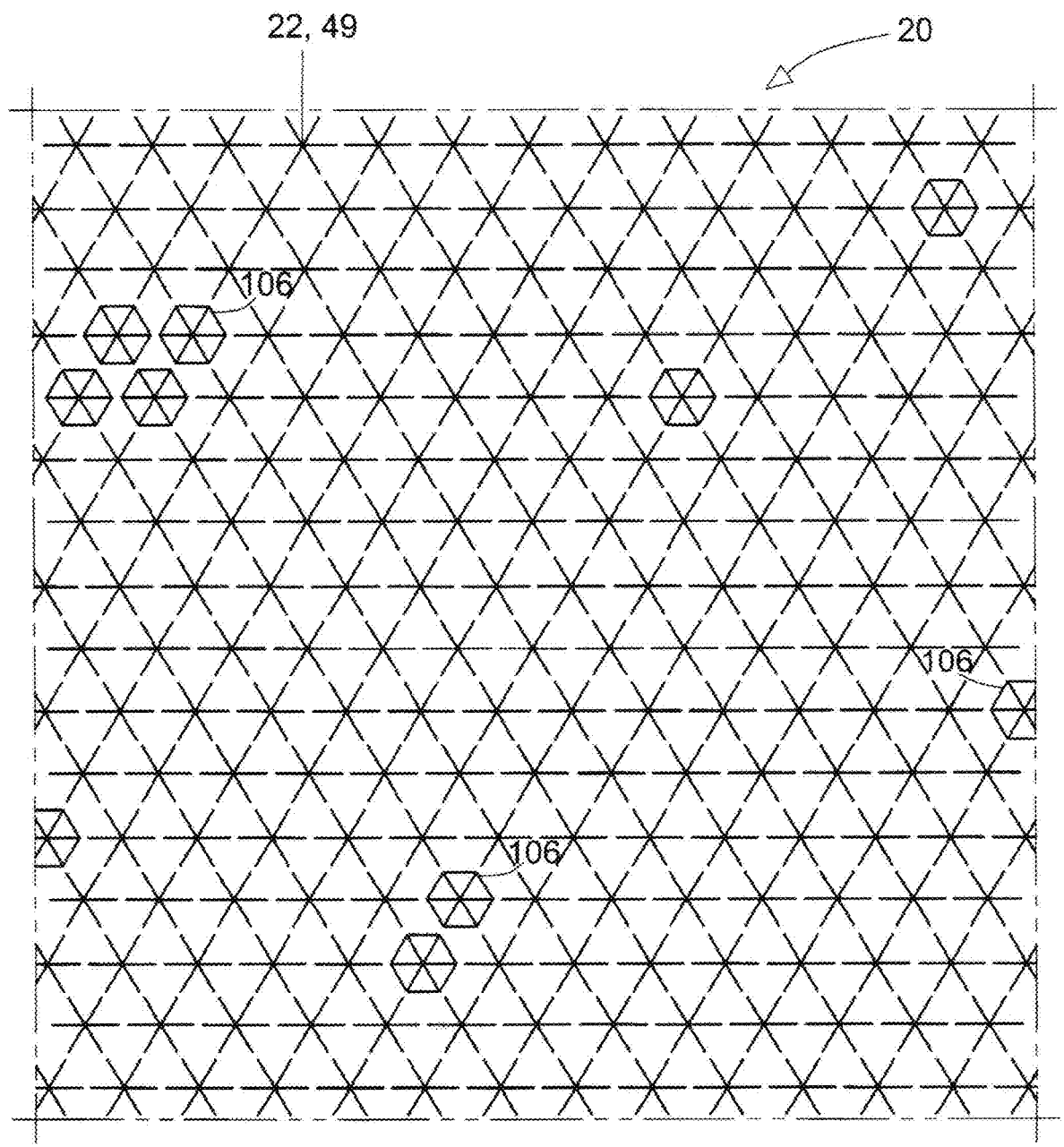
FIG. 2 Overhead view of a network embodiment.

FIG. 2 is an overhead, magnified view of a section of a reticular network, small network, or virtual software representation of a reticular network. This reticular network (20) shows multiple star-like network nodes (22) and blank nodes (106) that may be used in some embodiments. These blank nodes or blank loci may be reflective in some embodiments. These blank nodes or loci are shown as hexagons in some figures but may be random shapes, sizes and locations in some embodiments. The basic network units, the nodes or loci in this embodiment, are depicted by the star-like shapes. The waves are transmitted along the arms or branches of the star-like shapes in some reticular network embodiments. In some hybrid network embodiments the waves may be transmitted by the reticular network as well as the medium. The space between the star-like shape's branches would represent transmission through the medium in some embodiments but is used for clarity to demarcate nodes also.

The reticular network name is derived from the star-like node shapes that when placed side by side create a wave transmitting reticular pattern in some embodiments. These star-like shapes may take many different forms and thus different overall patterns in different embodiments. The reticular pattern may be made of a conducting metal in some embodiments, and may utilize electrical waves.

Global Control and Other Topics

The star-like nodes or loci may be continuous with one another in some embodiments, with no spaces, and would be directly connected nodes or loci in a continuous reticular network. In some embodiments with spaces between the nodes or loci the waves may transmit through a semiconducting medium in the spaces between the nodes or loci. In some embodiments these spaces would act as over-all network control points. This type of embodiment would have the capability to modify the network by changing the wave conducting characteristics of the medium globally, in the whole network, or in isolated areas. If the spaces between the nodes contained an electrolytic solution for example, chemical or ion concentrations could be changed by a pump to increase or decrease the strength of the wave transmission between nodes. Pumps changing ion or molecular type, density, concentration, conformation or temperature could also be used to speed or slow mechanical or other wave transmission in these spaces. Pumps or other mechanisms could also do this by changing the pressures of a gas, type of dissolved material, or state of matter for example. This would in these embodiments, change the activity level of the network. For example the network could be shut down by globally stopping transmission at these gaps. Semiconductors or equivalents at the gaps could also achieve this global control in some embodiments.

Integrated circuit manufacturing techniques such as photo lithography would be employed to create network components such as the reticular network pattern in some embodiments. The medium may be a silicon derivative in some embodiments. Networks, nodes or loci may be made of any wave conducting material for the chosen wave type or types of the embodiment. Networks, nodes, loci may be simulated in software using computer simulations of the mechanisms described later.

The star-like nodes in FIG. 2 transmit waves in them from one side of the node to the other side and on to the next star-like node in the network, and are capable of transmitting waves freely in all directions along their arms within the network in some embodiments. Some embodiments may have nodes or loci transmitting in one, two or three dimensions. For example some nodes may transmit in between one or more layers of a three dimensional array. In these embodiments these nodes or loci would function like those described in this text.

Figure 3:
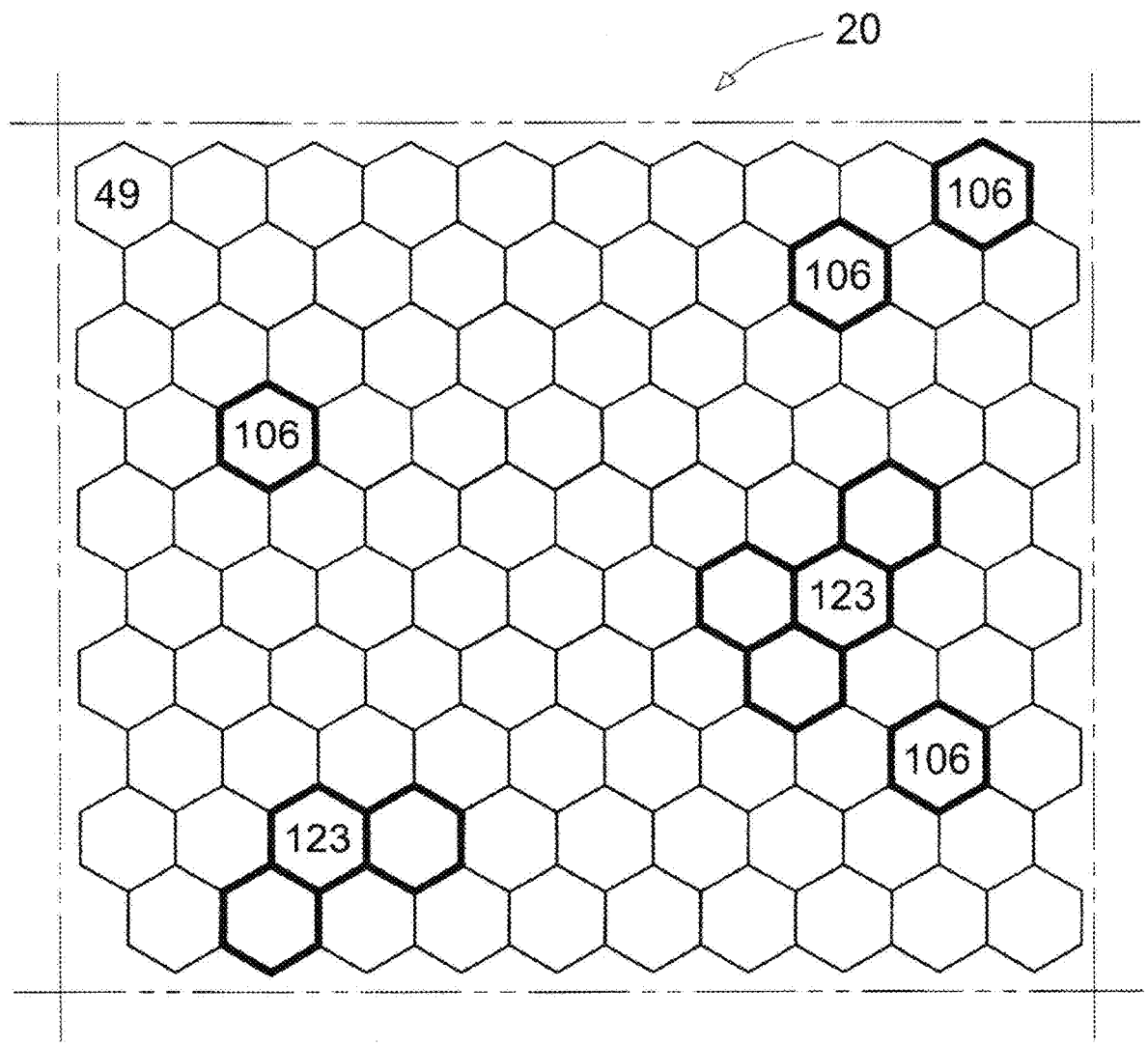
FIG. 3 Overhead view of a network embodiment.

In some embodiments the transmitting nodes (22) or loci (49) as mentioned, can record waves, recognize waves, play or radiate waves, while blank nodes or loci cannot. Blank nodes or loci (106) do however reflect waves in a manner similar to wave reflection in the natural environment in some embodiments. These reflections help in mechanisms that will be described in later figures. Blank nodes or loci (106) as mentioned may be any random shape or size in some embodiments. Blank nodes may be distributed randomly in singular manner or in random or semi-random groups as seen in FIGS. 2 and 3 in some embodiments. Random reflective or semi-reflective conditions and objects may be used in some embodiments.

FIG. 3

FIG. 3 is an overhead, magnified view of a section of a loci network made up of contiguous, side by side loci. Nodes and Loci operate somewhat differently although they both achieve the same end result in most embodiments, and this will be described later. This loci network shows an arrangement of hexagonal loci (49), and also includes multiple wave reflective blank locus (106), and also multiple wave reflective blank locus group (123). As mentioned, although depicted as regular hexagons, some blank locus and blank locus groups may have random, irregular, or semi-random reflecting sides and structures.

The wave reflecting blank areas may be randomly selected and placed in the network in some embodiments. Randomizing or modified-randomizing programs can place wave reflecting blank areas during programming in software network simulations, or place them in the network for photolithographic manufacture. These reflective blank nodes or Loci in this embodiment provide unique reflective areas and unique transmission paths which will be useful in mechanisms explained later. Reflective imperfections in a medium may also be used for this purpose. Network edges and borders may also be reflective in some embodiments.

FIG. 4

Figure 4:
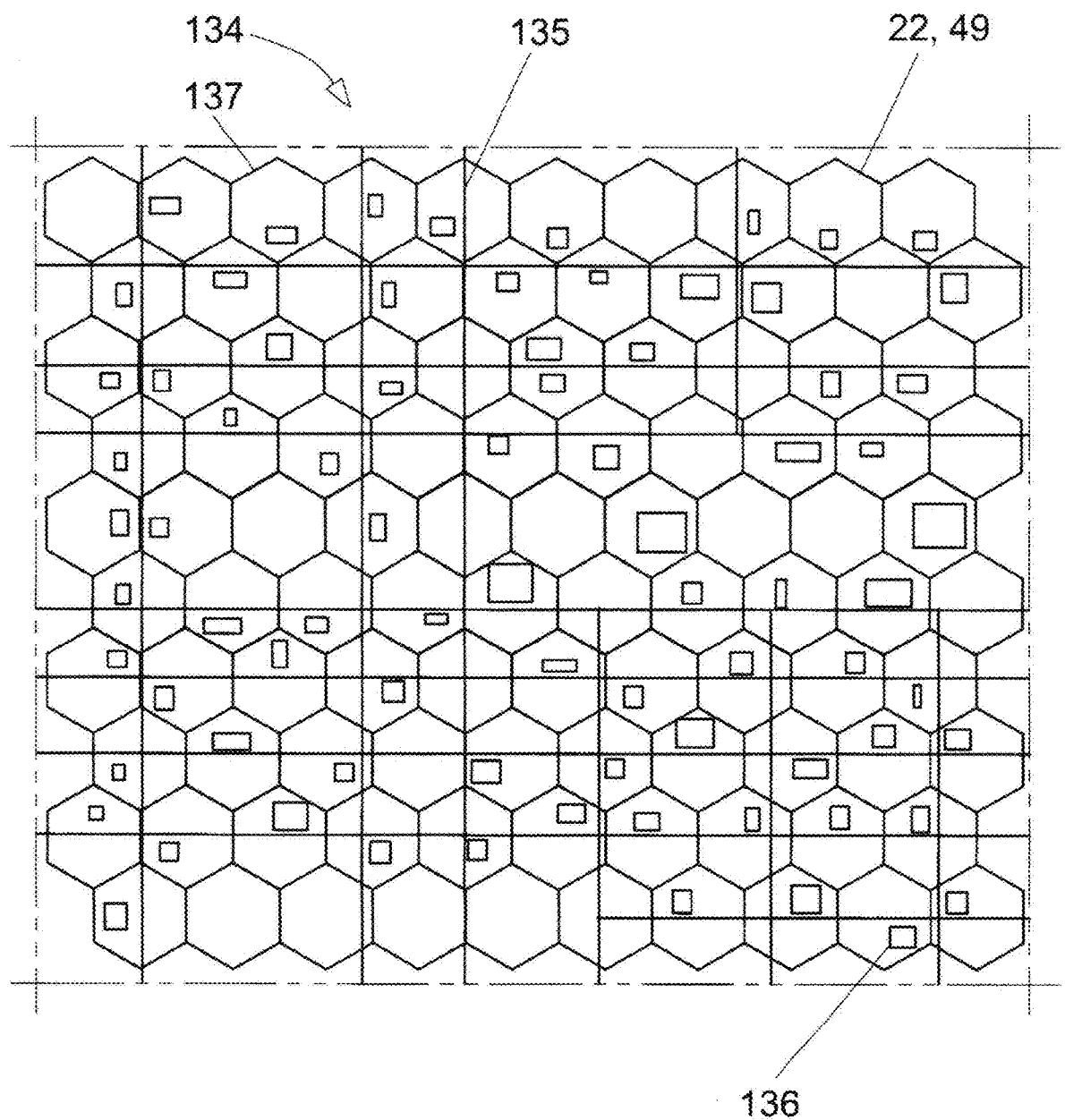
FIG. 4 Overhead view of a network embodiment.

FIG. 4 is an overhead view of a section of a distributed network street map with a node or locus network overlay. It is a magnified part of a geographical street map (134), including streets (135), rectangular computer locations (136) in a city, country, or larger area, available to the network for distributing of processing tasks. A virtual network overlay (137) of hexagonal nodes or loci mapped from loci in a corresponding network is placed over a geographical street map, and available computers are assigned to the locus in which they reside geographically, locus by locus or node by node. The Loci shapes are hexagonal but may vary in size or shape. Each node or locus in the network distributes the work required by its mechanism described later, to the available computers within its geographically delineated virtual overlay hexagon. The work required by the mechanism may also be distributed by IP address and other methods. Each node or locus distributes its work in this embodiment, be it recording, recognizing, radiating, or other activity to client computers. The overlay's hexagonal loci may be sized to include multiple computers on average for some computational redundancy for nodes or loci. Available computers for the network would include one or more of: fixed, mainframe, home, business, mobile, cell phone, watch, pad, wearable, or other computers. Some of these computers may be idle in some embodiments or specialized for the tasks. These computers, processors, or networks may be of any compatible type that chose to download a client program and participate in the described network services in some embodiments. Actual wave conduction paths may be on a remote network, computer simulated network, or in wireless, electrical or optical land lines at the geographical location used, or calculated, depending on the embodiment.

FIG. 5

Figure 5:
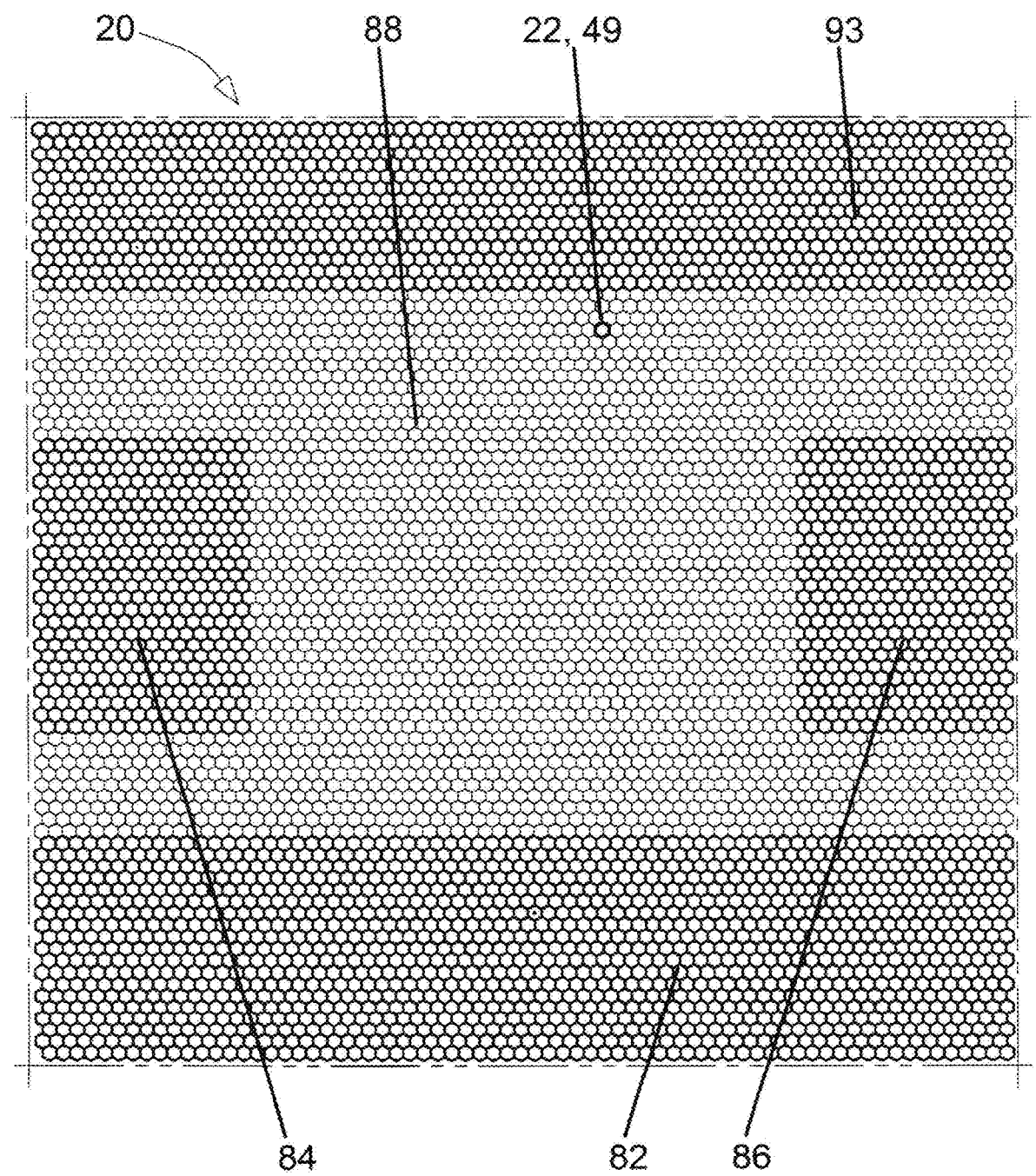
FIG. 5 Overhead view of a network embodiment.

FIG. 5 is an overhead view of a network with specialized centrally located association area, and darker surrounding sensory areas. In the middle of the figure is a lighter central association area (88). Surrounding this are the darker sensory areas. The sensory areas in this embodiment include a visual sensory area (82) at the bottom, auditory sensory area left (84), auditory sensory area right (86), as well as a sensory area (93) at the top for feedback from pressure, position, rate, vibration, motion and other sensors. Sensory input would be transduced to waves if needed by specialized sensor types. Some embodiments may use this top area for motor output as well as described later.

The network in this embodiment is made up of hexagonal loci (49), but may be nodes (22) or both in other embodiments. The sensory areas differ from the association areas in that they receive inputs from sensors but do not record waves in some embodiments. The central association area does record waves in some embodiments. Sensory inputs enter the network at the darker surrounding sensory areas as waves. The sensory areas surround the association areas so that the waves meet and interfere or interact in the central association areas. Each central association area node or locus has a selected threshold which larger wave amplitudes relative to the average wave amplitudes in the network, may exceed. Constructive interference/cooperative waves may cause this threshold to be exceeded and the waves at those nodes or loci to be recorded. More gradual summation of waves may also cause the threshold to be exceeded and the waves recorded. These recordings of waves may be played back from these central association area locations where they were recorded if new similar waves arrive at a later time.

FIG. 6

Figure 6:
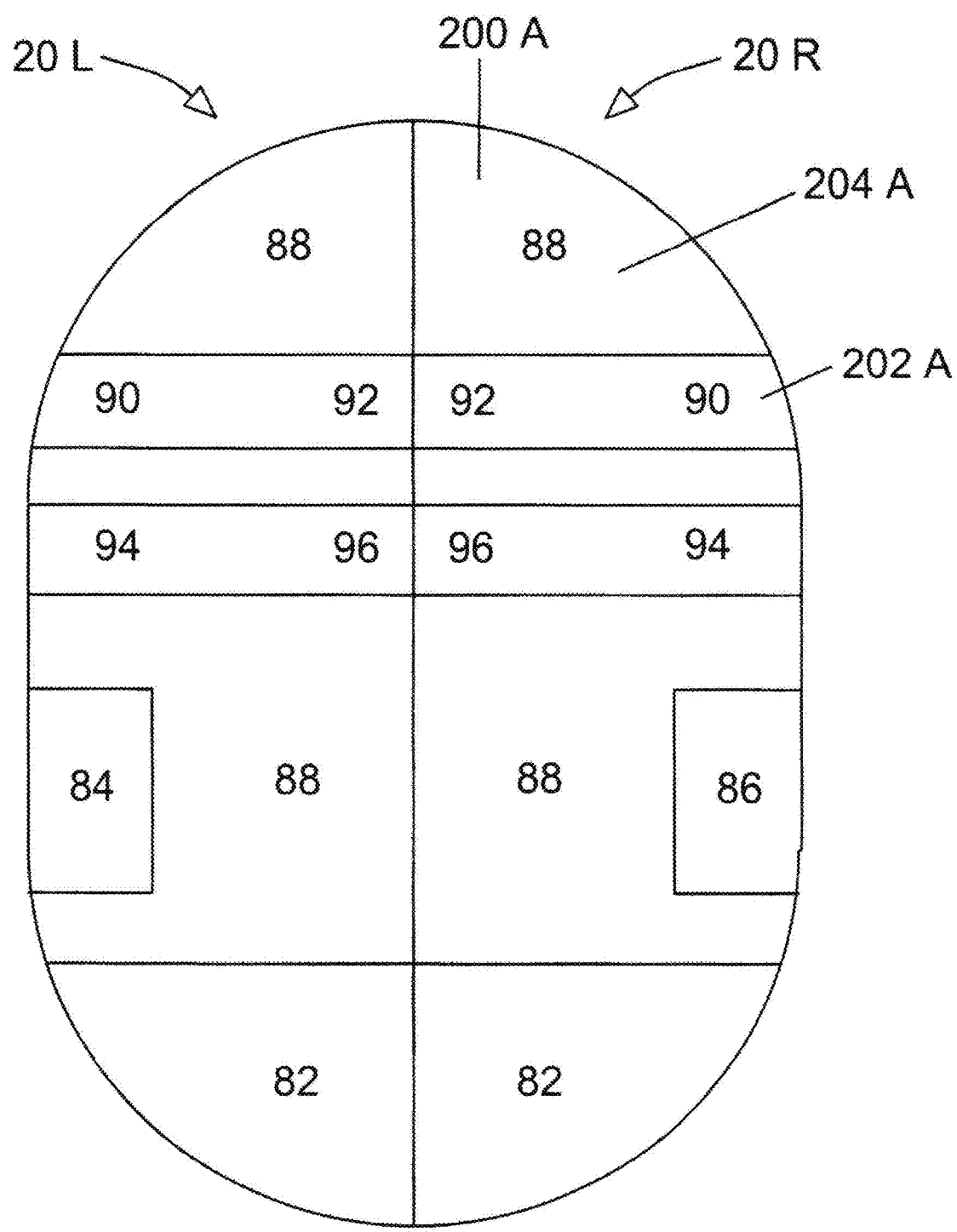
FIG. 6 Overhead view of a network embodiment.

FIG. 6 is a simplified, overhead view of a network showing specialized areas including left and right sides. It is bi-laterally symmetrical in this embodiment but need not be. This embodiment has a physical body with wave sensory input areas that connect to sensors inputting waves, and motor output areas that connect to motor actuators controlled by waves created on the network. The network in this embodiment would be set up with the inputs and outputs named in FIG. 8 described later, each connection in their corresponding areas. The layout of FIG. 6 may vary depending on what sensory and motor features an embodiment may have.

On this figure the visual sensory area (82) can be seen. The visual input is mapped onto the visual area from a camera or similar device, pixel to node or locus, from a camera image, so that an actual recognizable pixelated image could be seen on the visual area in some embodiments. The frequencies of the light from the camera may be shifted to match the network's working frequencies in some embodiments. The camera received light's wave characteristics, such as amplitude, and color frequency would be mapped onto each node or locus from each camera pixel, one to one, pixel to node or locus. In this way one could see an image on the visual area of the network, made up of nodes or loci rather than pixels, using a specialized monitor for example in some embodiments.

The sensory area for sound, the auditory sensory area (84) and (86) for left and right are also included in the figure. The auditory area would include multiple network locations with organization that utilizes a concentric frequency distribution spectrum in some embodiments.

Some of the motor area for the body can be seen in the figure as motor area anterior body/distal limb (90), motor area posterior body/proximal limb (92). These specialized output areas connect to, and control, wave characteristic dependent motor actuators. For example the actuators may be controlled by frequency, amplitude and number of stimulated nodes in some embodiments.

Some of the sensory areas for the body are sensory area anterior body/distal limb (94), and sensory area posterior body/proximal limb (96). These areas would be laid out as an embodiment specific body homunculus, or body map, mapped as described, in some embodiments. The homunculus body map would match the body layout being controlled with matching inputs and outputs to the body actuators and sensors mapped onto the network in their specific motor and sensory areas.

These two motor and sensory areas are both arranged from posterior body (92,96) to anterior body (90,94), and proximal limb (92,96) to distal limb (90,94) in some embodiments. The corresponding (matching body parts) motor and sensory areas are nearby for rapid wave feedback.

Two central areas (88) on the left and (88) on the right are for the interaction of waves between the above described areas. The forward central association area (88) at the top of the page would be a replica of the rear central association area (88) and mapped and connected to it with a 3:1 ratio of front to rear loci or nodes in some embodiments. Each mapped node or locus in the rear association areas would have one or more nodes or loci surrounding it in the front central association area in some embodiments. When a threshold is exceeded and a recording is created in the rear central association area it is sent to the corresponding replica forward association area as mapped. The forward area increases the surface area, and thus the number of nodes or loci, and provides for more areas of wave interaction, interference, or association than the rear alone. The forward central association area is next to the motor areas (90, 92) so that sensory-motor inputs may interfere more strongly, and be recorded here in the forward central association area. These sensory inputs from the motor actuators are called motor actuator feedback sensory input (40) and can be seen in FIG. 8. The forward central association area (88) would not be used in some simpler embodiments.

There is a line down the middle of FIG. 6 which would be found in some embodiments using double network systems. In these systems one association area side is connected to the other physically identical side on a node to node or locus to locus basis, so that when one side is operating the other is inhibited, set to a higher overall threshold, lower wave mid-level or both. That is, when one is busy playing back waves recalling associations the other is recording waves creating associations for the most part, as it is receiving input from external sensors in this example in these embodiments. This is achieved by one side inhibiting the other by raising the threshold or lowering the wave mid-level of the other side when activated. This may be on single nodes or larger areas in some embodiments. If input of sufficient amplitude arrives from the sensors both sides will become equally active again in some embodiments. This set up allows for visual images and other sensory input from the environment on one network, with related triggered associations to be recalled on the other for example.

However, simple embodiments would use only one network as in some of the previous figures.

FIG. 7

Figure 7:
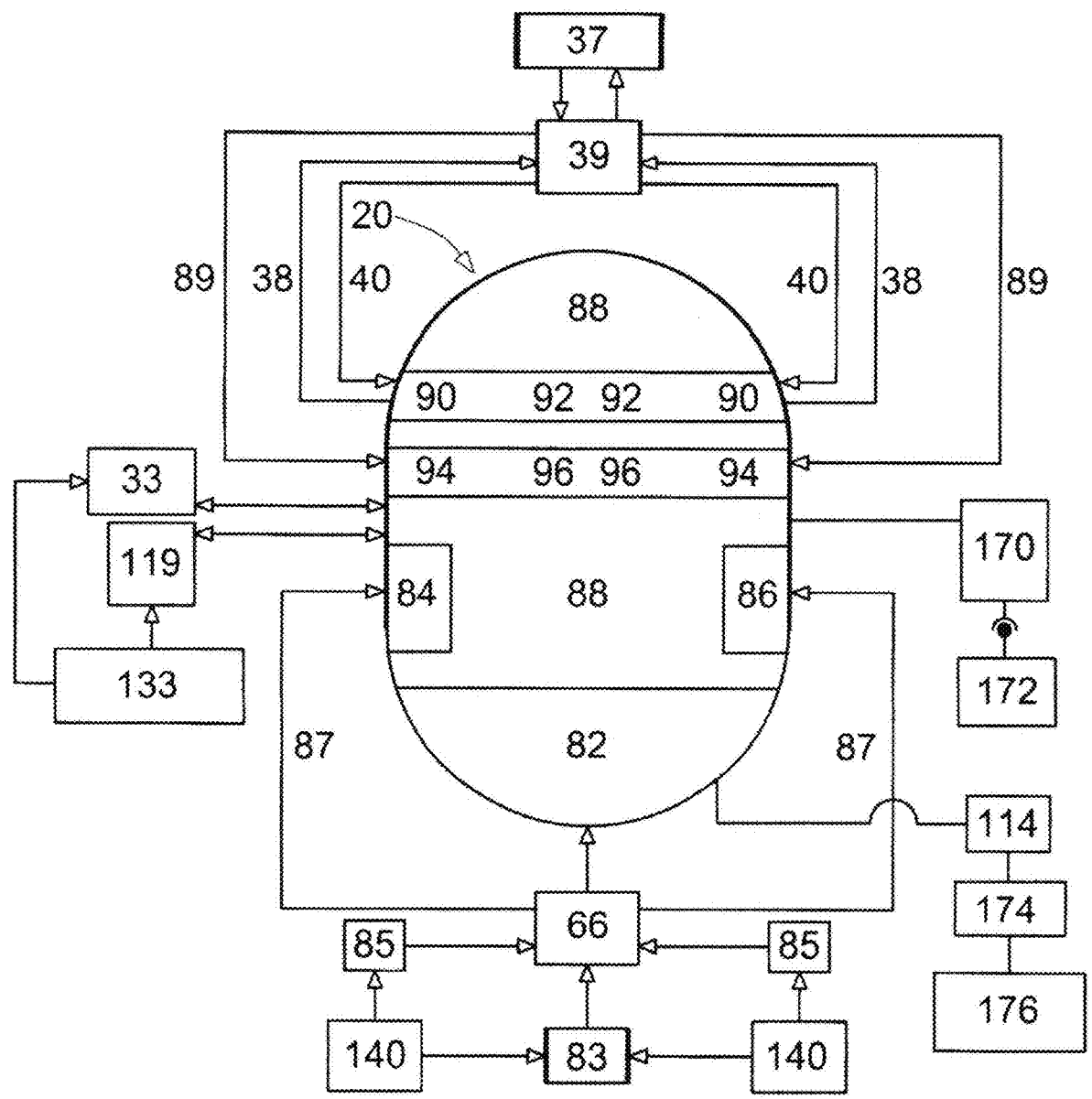
FIG. 7 Diagram of a network embodiment.

FIG. 7 is a block diagram of a mobile network embodiment. The diagram shows the interconnecting processors, interfaces, sensors, motor and control peripherals, and where they connect to the network (20) in this embodiment.

Some embodiments may be very simple and not utilize many of the items in this figure. They may not move, or have only one input and one output to, and from, the network. They may have only a few nodes or loci which would be used for undulatory swimming motions or alternating leg motion for example, and would need very few of the items in FIG. 7. On the other hand some embodiments would have far more inputs and outputs than those seen in this figure. Complex network embodiments may have many sensors or other types of input, and extremely large number of nodes and loci for processing their input.

In FIG. 7 we see a central oblong network of a mobile embodiment surrounded by inputs and outputs and their processors. At the bottom, we see visual input entering the network via a camera (83), and audio input entering by way of two microphones (85). There may be many more sensory inputs, such as more cameras, or feedback from more actuators for example. Many different types of inputs and sensors not shown in the fig. may be used in different embodiments, and some of these may require conversion to waves. This conversion to waves in some, and shifting the spectrum of the waves if needed for specific sensor types may be achieved by the input conversion processor (66). This and other processors or functions may be a sub-component of a wave processor in some embodiments. The camera and microphones enter here in some embodiments. Complex inputs may be simplified in some embodiments, narrowing them down to the strongest most important parts of the inputs. To achieve this, some more complex embodiments may use the input conversion processor to modify the sensory input, utilizing gain and contrast modulation, much as in radar displays, lateral inhibition, and retinal receptive field processing. This would simplify and isolate the stronger sensory inputs before they entered their specific sensory area. The sensory inputs are then sent from the input conversion processor, to their respective areas of the network in these embodiments, for one to one, pixel to node or locus, mapped distribution.

At the bottom left and right we see packet based wireless connection (140) that allows images, sounds and other input from a packet based worldwide information source to be mapped onto their respective visual and sound locations of the network for creating associations and automated learning by viewing specific databases and their associated, related databases. This may be a wireless connection that would allow for mobility in some embodiments. This information may also be input to the network through the camera, microphone and other sensors and inputs.

To the right of the packet based connection (140) we see an LED monitor display (176) which is connected to a graphics processor (174), visual image processor (114) and the visual area of the network. These units, if connected, allow the user to see a real time display of any area of the network he wishes to observe, any images that may be displayed on the visual area, and to zoom in to see any wave interactions in chosen areas for monitoring, diagnosis and tuning. Above this to the right middle of the block diagram we see a power supply for the network, a battery (170) and charger (172) for this mobile embodiment.

At the left middle we see an intrinsic wave processor (33) and a wave mid-level processor (119). These two are connected to the network and a wireless keyboard/touchpad (133) which allows for changing the activity level and other parameters of the network as described here.

At the top center we see a representative actuator (37) which may represent multiple motor actuators and their feedback in some embodiments. We see the actuator (37) connecting to motor processor (39) and on to the network (20). The motor actuator output can be seen leaving the network motor area (90, 92) and entering the motor processor (39). The motor actuator feedback sensory input (40) to the network is seen entering the motor area for use in creating associations in the central association area (88) in this embodiment. Joint position feedback input (89) which will be explained later, is seen entering the network matched to an embodiment specific body layout homunculus as mentioned in the text. This is for use in creating associations with degree of joint motion of individual joints, with specific associations from the central association area (88) as described here.

FIG. 8

Figure 8:
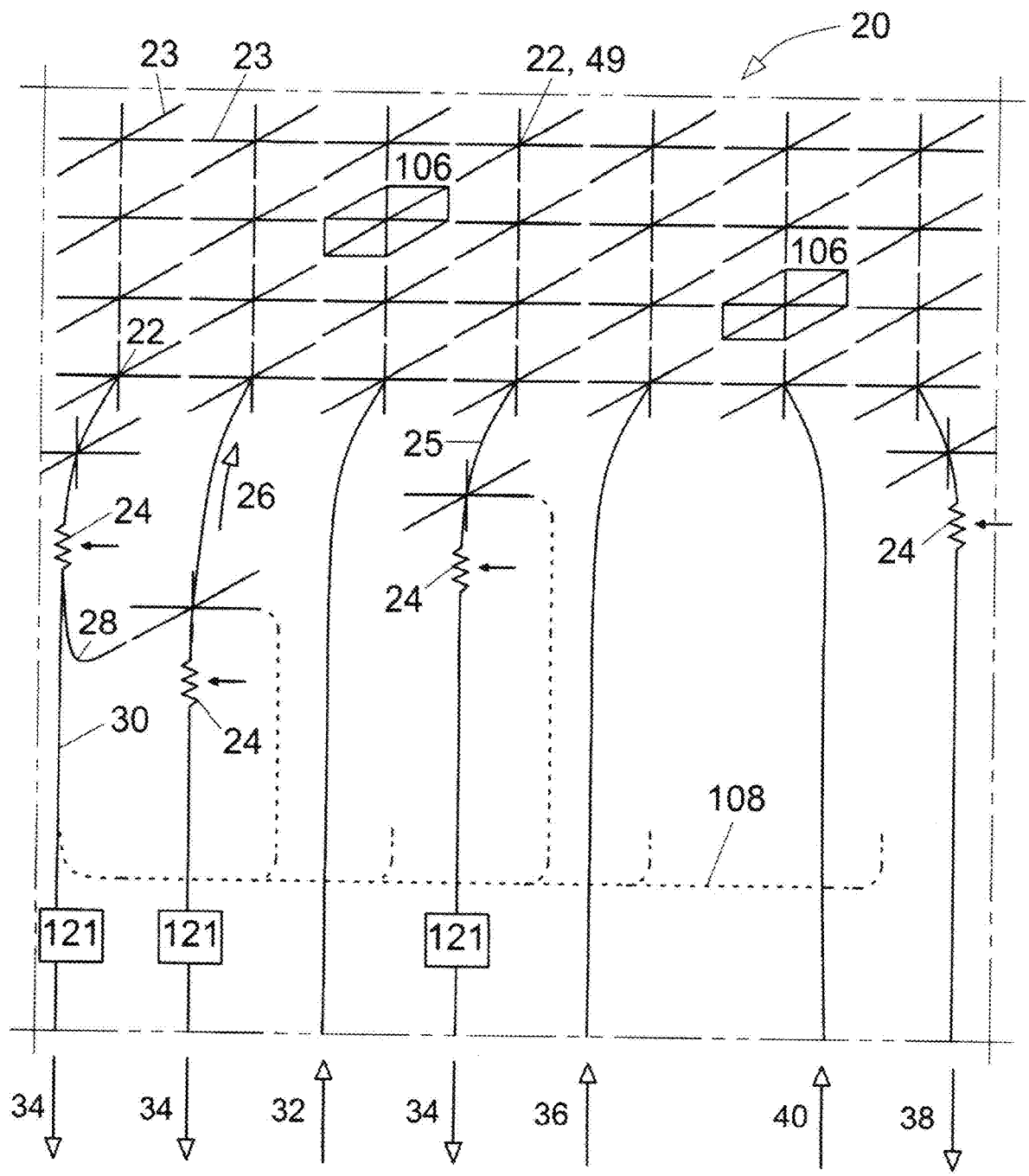
FIG. 8 Perspective view of a network embodiment.

FIG. 8 is a simplified, perspective, magnified view of an area of a reticular or software visualization network with nodes, input and output, and network layers, in an embodiment. For the purposes of illustration elements that would normally be in far apart locations are shown together here. In this figure nodes (22) are represented by the star-like symbol, but may be loci (49) in other embodiments. The nodes or loci may be physical, such as in a photo lithographically created integrated circuit, or may be simulated in a computer program or other device in some embodiments. Some software embodiments may represent a virtual network visually in a fashion similar to FIG. 8 for better user understanding and adjustment of its current operation in real time. The network may be simple and operate with one or more nodes or loci, or contain very large numbers of nodes or loci with no required upper limit to their number. There may be few nodes or loci in a simple embodiment, such as an alternating signal, and billions or more in other embodiments associating large amounts of complex data. In this fig. many of the illustrated nodes do not show their connections for clarity of the illustration. An additional network layer is represented by a dotted horizontal line (108) which may have nodes and loci as well in some embodiments.

Nodes or loci may be extremely small, limited only by current manufacturing technology. There may be thousands or more nodes, loci, or networks themselves on a very small chip in some embodiments. On the other hand, the one or more nodes or loci may be as large, or larger than, a computer for some distributed embodiments. Some embodiments may utilize tens, hundreds, thousands, millions or more networked computers on a network grid. There may be multiple network layers (108) of nodes and/or loci, and multiple networks, depending on the embodiment. There may be nodes in one layer and loci in another layer in some embodiments.

In FIG. 8 the node (22), or locus (49) can be seen as a sub-component of the network with a downward extension of node (25). Although not shown on all the nodes in the figure for clarity, most in this figure would have this extension. An example extension of node (25) includes a variable resistor and/or threshold activated switch (24), with an adjustable threshold that some embodiments may use. The threshold activated switch (24) acts as an adjustable on-off switch. The switch may be activated by an adjustable threshold level being reached, which may be triggered by wave amplitudes from single waves, or multiple waves such as in addition or summation. The switch when on, may be all or nothing in simpler embodiments but may also include variable levels of transmission such as a variable resistor might have in more complex embodiments. When a wave or waves of sufficient strength in amplitude, frequency or both, pass across the node (22) or locus (49) in the network (20) the threshold is exceeded and a signal is passed beyond the variable resistor and/or threshold activated switch (24) to the extension/connector for recording and playing (30) causing initiation of recording of the waves. Waves of great length can be recorded in some embodiments. Here we see a wave recorder (121) which may record waves or entire wave sequences in some embodiments. This wave recorder may be a part of a wave processor in some embodiments. Waves may add to one another due to constructive interference/cooperative waves, and summation, and this may contribute to the exceeding of the selected threshold of the switch.

In order to prevent excessive numbers of activated nodes lateral inhibition extensions network layer (108) are present. This would be in a separate network layer with their own nodes and or loci in some embodiments. This may also be incorporated into the upper network layer of the fig. in some embodiments. Nodes and/or loci with earlier, stronger relative activation may inhibit nearby less active areas with this lateral inhibition. In some embodiments the stronger areas of constructive interference/cooperative waves inhibit the nearby weaker areas of constructive interference/cooperative waves and limit excessive activation of nodes automatically, via these lateral inhibition extensions. This inhibition lowers the node and/or loci level of activity and likelihood of reaching the threshold. This inhibition could be for example a seven node radius in distance in some embodiments. A sub-network layer extension can be seen as a dotted line extending sideways and upward, inhibiting some of the nodes or loci in this FIG. 8 (108) (for clarity only five nodes are shown connected in this way). This extension is a part of an interconnected sub-network layer in some embodiments.

This lateral inhibition could be achieved by raising the threshold of the variable resistor and/or threshold activated switch (24) by the lateral inhibition extensions network layer (108). The wave mid-level could also be lowered alone or in combination with raising the threshold in some embodiments. This raising or lowering would be 30 percent in some embodiments for example.

Blank node or Blank Locus (106) are shown which reflect waves. They may be highly irregular in shape and there may be groupings of these blank nodes or loci.

Sensors and Other Topics

In some embodiments the network would receive numerous inputs from sensor systems connected to the network sensory input (36), many of which would be spread out through the dedicated sensory areas in their respective positions in the previously mentioned body layout sensory homunculus. Sensory waves would enter the network in some embodiments at these specific entry nodes (36). These network sensory input nodes or loci would be connected to the sensor systems, including any sensors whose output might be spectrally shifted or transduced so that they could interact with the network's waves. The network's operational wave spectrum might be lower frequency for software networks and tuned circuits, or higher for physical crystals that would resonate and oscillate in some embodiments.

Actuators and Other Topics

The network also includes outputs, for example, motor waves leave the network at motor actuator output (38) nodes that connect to actuators. These motor output nodes would be found in the dedicated motor areas, distributed as mentioned in the homunculus in some embodiments.

The actuators themselves have a motor actuator feedback sensory input (40) to the network. This is in the motor area as physically close as possible to, or surrounding, the motor actuator output (38) nodes in some embodiments. In some embodiments the motor feedback to the network would be through the same motor actuator output (38) nodes so as to be exact in location. This allows for targeted triggering of motor motions by the association area based on their passive feedback during learning.

Intrinsic Waves

The network in some embodiments creates its own waves for interacting with other waves. Some of these enter the network and are called the sub-threshold intrinsic wave spectral input (32) as shown in FIG. 8. This input is radiated when new waves have caused recording in some embodiments. When recording occurs, the recording wave travels via the sub-threshold intrinsic wave learning output/temporal marker (34) to signal the application of the intrinsic wave spectrum via the sub-threshold intrinsic wave spectral input (32). This induced and applied sub-threshold intrinsic wave spectrum permits greater amounts of constructive interference/cooperative waves, and increased resolution for the creation of associations if used in some embodiments. This intrinsic wave spectrum is sub-threshold but can be amplified and modified as needed for learning. This spectrum is present across the association areas of the network in some embodiments. Input wave type, attack, sustain, and decay would be adjustable for these intrinsic wave spectrum waves in a form similar to waves in synthesizers, in some embodiments. These Intrinsic wave spectrum waves may be automatically similar in wave characteristics to the waves that triggered them in some embodiments.

The wave recorder (121) in FIG. 8 records waves if they exceed the threshold set at the variable resistor and/or threshold activated switch (24) in some embodiments. Recording may occur utilizing any method as seen in the glossary under recording.

Extension of node (25) to surface in FIG. 8 is for recording, and after, for playback or radiation of recorded waves as seen in extension of node with playback to surface (26). This playback may simply travel back up the node and extension of node (25) in a reverse direction as seen in (26) FIG. 8 in some embodiments. In FIG. 8 we see sequence link extension (28) connect to the extension of node (25) to surface above the variable resistor and/or threshold activated switch (24) as it could be represented in a software or other embodiment when multiple nodes or loci and sequences of waves are required. These links would be represented in a daisy chain of frequency specific nodes linked together for some embodiments. These links would be made or visualized as sequences of waves are recorded in some embodiments.

FIG. 9

Figure 9:
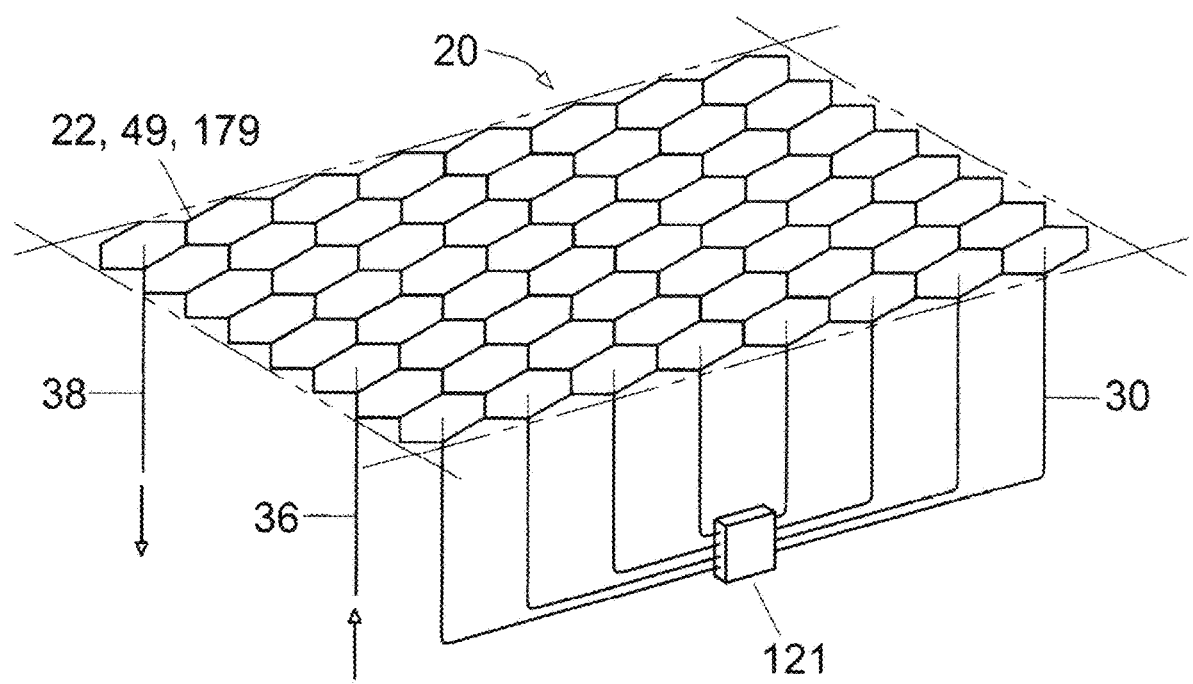
FIG. 9 Perspective view of a network embodiment.

FIG. 9 is an isometric, magnified view of a small portion of a network (20). In this figure we see side by side or contiguous hexagonal nodes or loci. Each node (22) or locus (49) consists of a hexagonal transducer. These can transmit waves along their surface, record waves, allow wave recognition, and radiate waves. In this embodiment, they can act as a passage for waves, microphone for recording, later recognizing, and as a speaker for playing waves. However other embodiments may use other wave detecting, recording and radiating mechanisms such as a photodetector and a nano-laser for example. The entire spectrum of waves in both type and frequency could be utilized in these embodiments with different wave detector types, recognition methods, recorders and players as suited for the particular wave types in use.

In the embodiment of FIG. 9 we see the transducer/photodetector/wave detector-recorder/player hexagons (179), and that waves can move across these transducers or wave detectors along the plane of the network. Each transducer would employ the mechanism of a node or a locus in some embodiments as explained in the figures. Below the transducers, at the bottom of the fig. we see a wave recorder (121). This connects via an extension/connector for recording and playing (30) to the transducers for recording, and radiation or play back of the recordings as waves at the transducer where they were originally recorded. Although not shown for clarity, most of the hexagonal nodes or loci in FIG. 9 would be connected to wave recorders in some embodiments. Some nodes and loci that would not be connected to wave recorder (121) would include specialized input/output nodes, some non-connected reflective blank nodes, and some nodes at specialized input and output areas.

Some embodiments would have microcontroller wave recorders (121) recording from and driving the transducers, and differing ratios of hexagonal nodes or loci to wave recorders. These ratios may be in some, one to one, others such as shown here, eight to one, but any other ratios would be possible only depending on the chosen microcontroller's capabilities. In some embodiments the hexagonal node or locus transducers would be made out of a material that is rigid, yet light and thin, and that could readily transmit the chosen wave frequencies for the spectrum of the network. Some embodiments could be made by using integrated chip manufacturing techniques employing a material that is capable of transmitting waves, such as silicon derivatives, quartz, metal, sapphire, or others and could include embedded microcontrollers. Neural networks would be employed by microcontrollers or remote computers to recognize, or help recognize waves in some embodiments.

Wave Recognition, Learning and Other Topics

When new waves radiate on the network, they are radiated across the transducers and they are compared to previously recorded, stored waves. These new waves are compared to see if they are the same as, similar to, are a part of, or contain a component of, previously recorded waves, by the microcontroller, with the neural network aiding in the recognition in some embodiments.

Some repetition, or teaching may be employed to train the network in some embodiments. For example when a wave sequence is input, it may be automatically repeated for learning by the neural network a selected number of times. Whether this learning takes place or not depends on the threshold levels at the nodes or loci across the network, in addition to: the amplitudes, frequencies for summation effect, the waves from currently active sensors, intrinsic waves, and waves from other currently radiating associations in some embodiments. In other words if a wave sequence and the wave associations it triggers have an amplitude that exceeds a selected level, it will be recorded. With further repetition, if needed, the new wave sequence will be more easily recognized by the neural network for future use. A simple software script could monitor the amplitudes and frequencies of the incoming waves, compare them to a selected level, and repeat them if triggered. This repetition would help the neural network recognize the repeated waves in some embodiments.

This network also shows a network sensory input (36) sending waves into the network, and a motor actuator output (38) sending waves out to the motor actuators. There would actually be many more of these inputs and outputs than shown here, much farther apart, in their own specialized areas in most embodiments. The sensory input would take waves from the sensors to the network in the specialized sensory areas of the network as described previously, and the motor output waves would leave the network at the specialized motor area of the network.

FIG. 10

Figure 10:
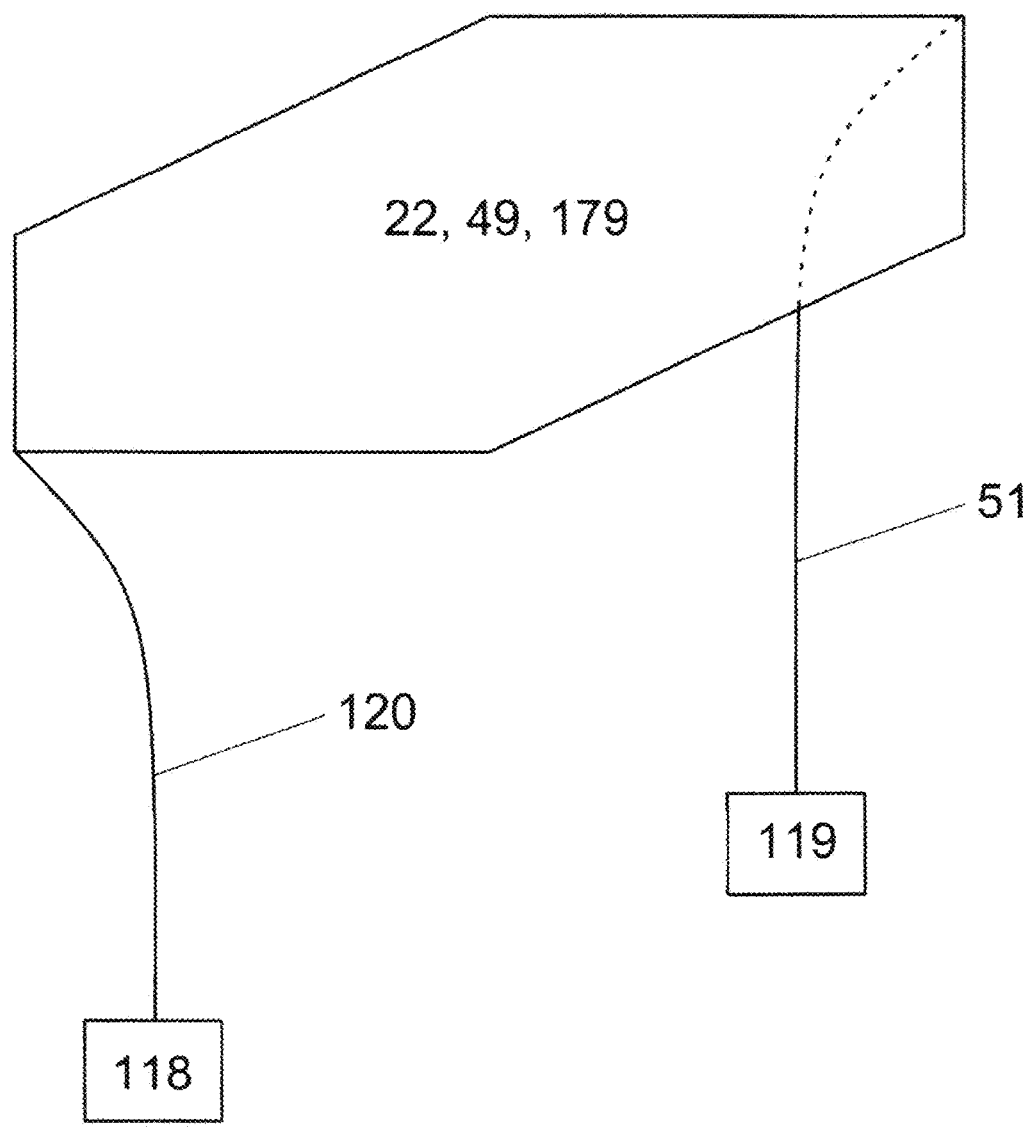
FIG. 10 Perspective view of network components in an embodiment.

FIG. 10 is a perspective, magnified view of one node or locus and two connections leading to processors. This view shows a hexagonal wave detector and player at the top. This could be a transducer or photodetector/nano-laser or other wave detector and emitter combination. This FIG. 10 also shows the sequence recorder (118), and its sequence recorder connector (120). In some embodiments most nodes or loci have the ability to detect, record, recognize, and playback waves.

Below the hexagonal transducer/photodetector/wave detector-recorder/player (179), the wave mid-level processor (119) and its wave mid-level processor connector (51) can also be seen. As mentioned these components may be photo lithographically etched and manufactured into integrated circuits in some embodiments. These components may be microcontrollers, or controlled by one or more remote central computers in some embodiments. The sequence recorder records the order of frequencies as they arrive at the transducer if over-threshold in some embodiments. The wave mid-level processor controls the likelihood of activation of the node or locus by incoming waves. The wave mid-level processor can adjust the levels of threshold and wave mid-level away from selected levels in some embodiments. In some embodiments the wave mid-level is automatically set to the average amplitudes currently seen across the network.

FIG. 11

Figure 11:
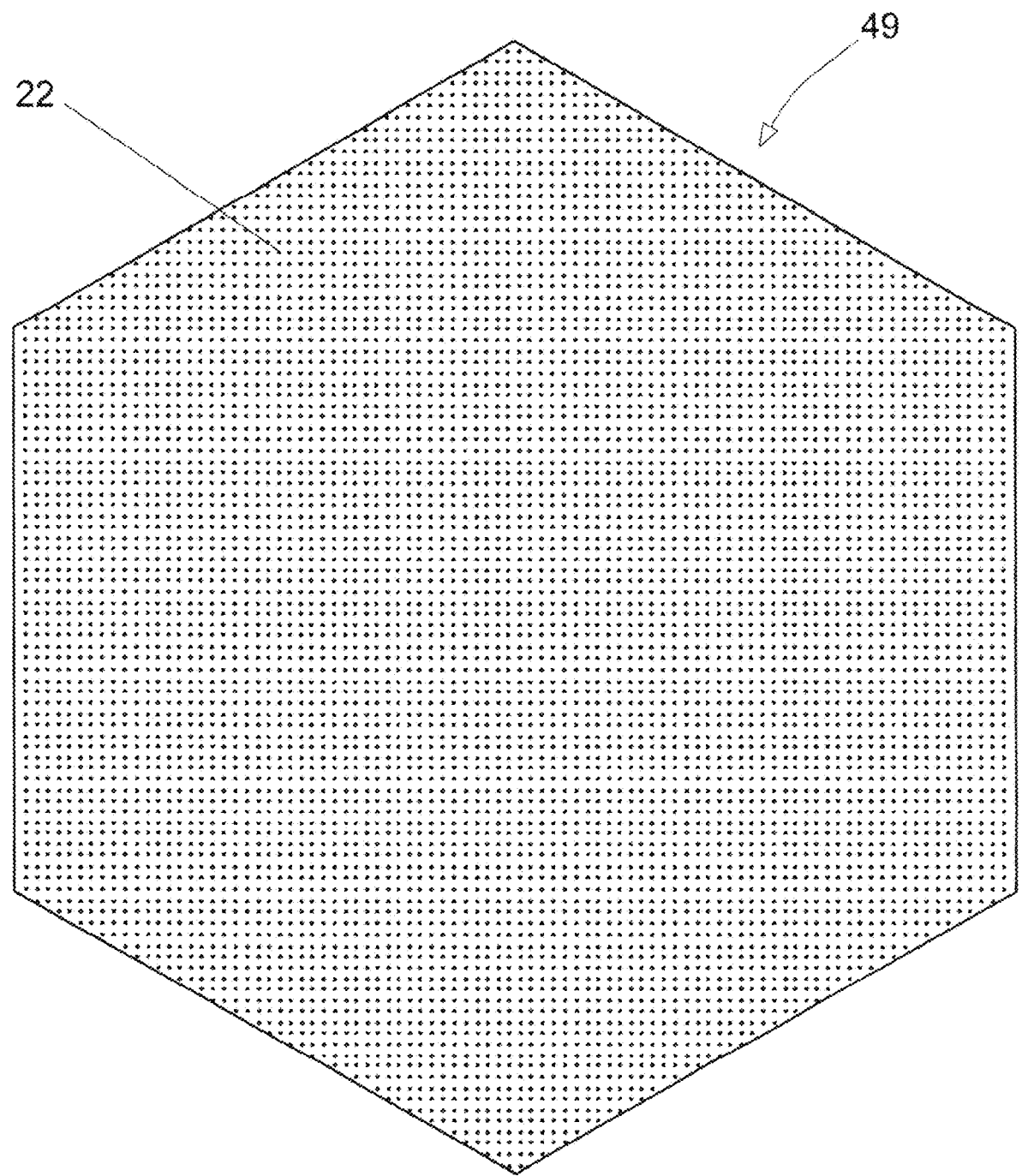
FIG. 11 Overhead view of network components in an embodiment.

FIG. 11 is an overhead, magnified view of a hexagonal locus (49) similar to the small hexagonal loci in parts of networks in previous figures. These loci could be set up as in FIG. 9, and FIG. 10. This fig. shows an embodiment using individual frequency specific nodes in the hexagonal locus which are seen as small dots.

There may be one or more loci in embodiments, more complex networks having millions or more, and still more nodes inside each locus as illustrated here.

Resonance and Other Topics

The dots in the locus would be sensors in a medium based embodiment, or specific frequency sensitive areas in other embodiments such as a resonance based embodiment. Resonance based embodiments would detect frequencies or help detect frequencies by physical or simulated resonance.

A resonance based embodiment radiates and recognizes waves by employing resonance or vibration. This embodiment of FIG. 11 may have approximately one thousand nodes per hexagonal locus, each node having a specific frequency of resonance which is one of the frequencies from 1 Hz to 1000 Hz, but this can be different in other embodiments, such as 50 to 20,000 Hz or any other frequency range.

In the embodiment of FIG. 11 most of the loci in the network would have 1 to 1000 Hz as the locus' frequency spectrum, and the hexagonal locus would contain 1000 nodes, one for each frequency.

FIG. 12

FIG. 12 is an overhead, magnified section of the top left of the hexagonal locus of the previous FIG. 11. This fig. shows the individual dot-like nodes (22) seen previously, now magnified as small circles within the section of the locus (49). One possible method of numbering the nodes is shown with ten numbering examples starting from the top with number 1. This figure also includes three example frequencies as they would be assigned to the numbered nodes in some embodiments, these are at the bottom left marked with squares. Although the shape of a locus is illustrated here and in previous figures as a hexagon it could be of any shape or without any border in some embodiments. In this embodiment the nodes are numbered as illustrated at the top of the figure, by their frequency from 1 to 1000 Hz, however the whole locus is not shown. These frequencies are simplified examples for clarity and may actually differ by many orders of magnitude from those illustrated in this figure, for example in some optical, mechanical or crystal based embodiments. The nodes are numbered starting at the top to bottom and left to right. These numbers are the frequency in Hz. The nodes for 1-10 Hz are shown as examples but would continue onto 1000 Hz for this locus in this embodiment. Most other loci in this network would be similar or identical to this one. Some loci and nodes in the motor and sensory areas would have the same design for resonating or playing but not have the same recording capability in some embodiments.

Wave Sequences, Resonance and Other Topics

Also illustrated here are three nodes marked with squares around them depicting an example frequency sequence. These three nodes would have resonated due to waves radiated on the network for example. These three waves arrived at the locus and nodes and may have originated from external environmental sensors that fed input to the network. Also, they may have originated from other nodes or loci in the association area of the network that became overthreshold and started radiating. The frequencies of the waves radiated on the network were 150, 152, 154 Hz. Due to node resonance in this embodiment, the sequence of nodes would resonate in the order radiated on the network, and be recorded in the order 150, 152, 154 by the locus' sequence recorder (118) previously seen in FIG. 10. This would occur if over a selected threshold as determined by the wave mid-level processor (119). Although this embodiment uses resonance other embodiments may use many other forms of frequency sensing, tracking, recording and playing.

Later, if new waves radiated on the network and caused one of the nodes in the recorded 150, 152, 154 sequence to resonate, this would trigger the sequence to radiate from that frequency forward and then start the sequence from the beginning in some embodiments. That is, the locus' sequence recorder (118) would play any sequence starting with the recognized or resonating frequency, continuing the sequence from there to the end, and then begin the whole sequence from the start one time.

If there were no recorded sequence with the resonating frequency in the memory of the locus' sequence recorder, then the nodes may resonate or oscillate, but there would be no playing of any sequence in this case in some embodiments. However if over the selected threshold they would be recorded for future recognition in some embodiments.

FIG. 13

FIG. 13 is an overhead, magnified section of a locus (49) as was seen in FIG. 12, now with the previous circular dots including more detail showing node (22) resonator/oscillators, and interconnecting node branches (23). A partial example edge of locus is marked for clarity with a heavier, bold double dash line (180).

Electrical waves are transmitted in some network embodiments by node branches, although other waves may be used and may also travel through the medium. Although not represented in the figure for clarity, the locus is adjacent to, and continuous with other loci in this embodiment. Contiguous loci are illustrated in earlier figures. Waves may travel across a network built up of loci and nodes in these embodiments. The nodes extending over the heavier, bold, dark, double dash lines at the edge of the locus show this continuous wave transmitting network.

The node circular, central resonator/oscillators, wave detector/emitter (21) are shown in this embodiment. These are frequency specific shaped crystals, or tuned circuits in these embodiments but may be any resonating component such as tuned polymers, metal, or other material such as a silicon derivative. This embodiment would use the frequency distribution depicted in previous figures for the tuning of the nodes. Some embodiments could use modified quartz crystals and their characteristic vibrational spectra. The resonant components would determine the network's operational spectrum. The frequency spectrum utilized by the network, loci, and nodes can be tailored to the chosen sensory input. For example, a network using only sound could use a frequency spectrum of 10 to 5000 Hz, although it could use any frequency spectrum. As described in FIG. 7, in some cases the sensor's frequencies would need to be transposed up or down to the network spectrum when input to the network so that they could affect the resonant components.

FIG. 14

FIG. 14 is a perspective, magnified, isolated node of FIG. 13, with central resonator/oscillator, node branches, and an extension downward to a processor, although there may be more than one. This view of a node (22) shows node branch (23) along which waves are transmitted, and the central resonator/oscillator, wave detector/emitter (21) in this embodiment. Nodes (and loci) may contain different types of wave detectors and emitters and utilize different spectra in embodiments. Items such as photodetectors, nanotubes, nano-laser emitters may be used. Gallium-arsenide nanowire lasers may be used in some embodiments as emitters.

The medium would be the area between the node branches, and would allow waves to travel as well in some embodiments. The hexagonal perimeter of this node is not shown and may not be physically present in some embodiments.

The resonator/oscillator is the tuned, shaped crystal specific for its designated frequency as seen on FIGS. 12 and 13. This frequency may be different than the example frequencies given and depend on the resonant frequency of the resonator/oscillator type chosen. Some embodiments may choose multiple types of resonator/oscillators to fit their chosen spectrum. The resonator/oscillator may also be a tuned circuit, tuned polymer, tuned metal, tuned silicon derivative, other tuned material, other wave detector or software simulated.

Also seen in FIG. 14 are the sequence recorder (118) and its sequence recorder connector (120), and extension/connector for recording and playing (30). These processors could be combined into a wave processor as well. These would be photo lithographically etched in an integrated circuit as mentioned earlier in some embodiments. The wave mid-level processor (119) and the sequence recorder (118) may be part of a microcontroller in some embodiments as mentioned.

The sequence recorder records the specific nodes that fired in that locus along with the order, duration, and timing of firing, and can induce those same nodes to oscillate in the same way, with the same order, duration and timing again later if called upon. One or more wave processors may combine these and other functions.

In some embodiments these nodes (22) would be able to record or play multiple frequencies and sequences.

FIG. 15

Figure 15:
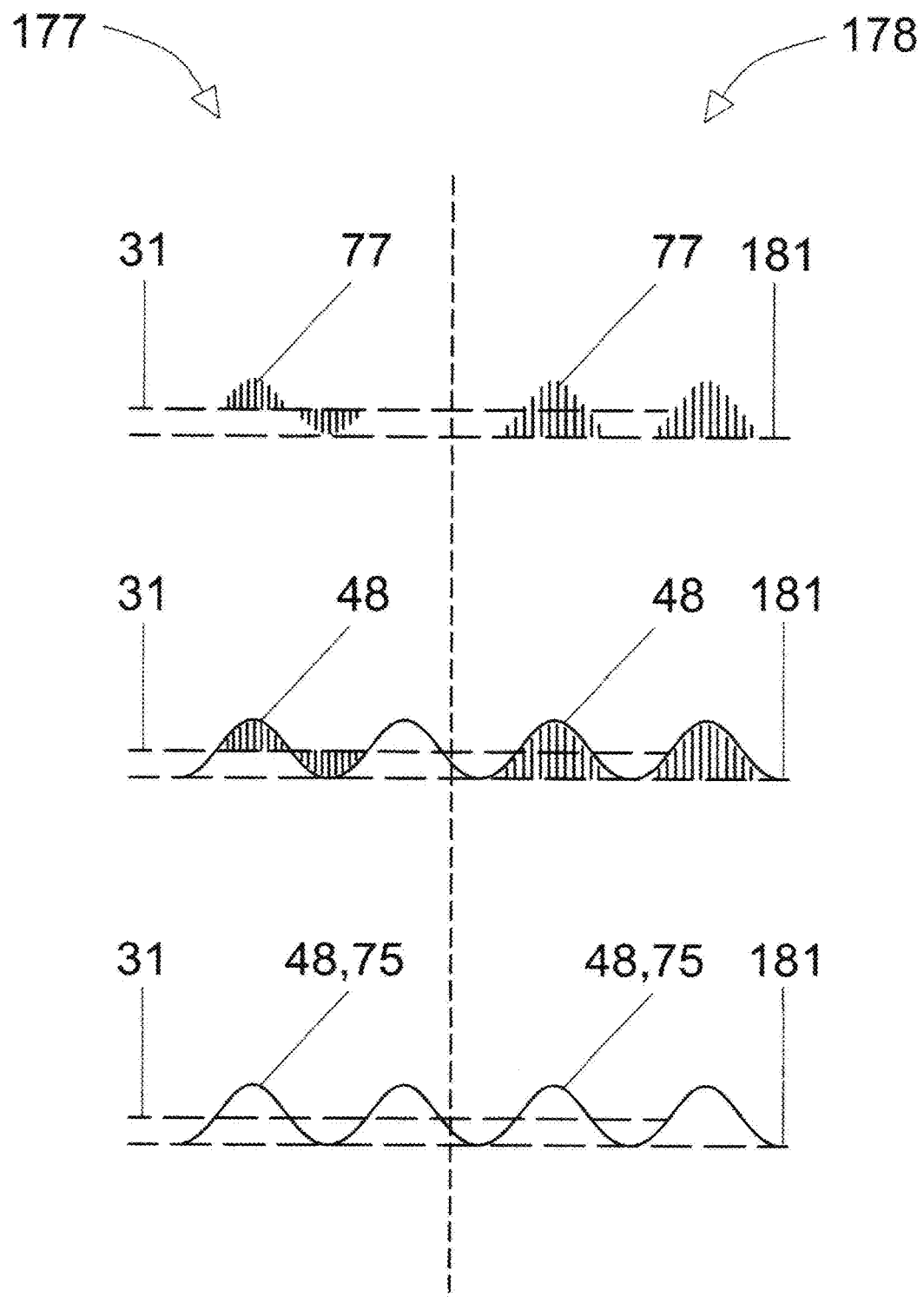
FIG. 15 Two sided diagram.

FIG. 15 is a diagram of short vertical lines representing pulses, spikes, or firing creating waves in embodiments. These are represented in two different ways, one on the left, and the other on the right, with two different dashed horizontal reference lines shown.

These pulses, spikes or firing come from nodes or loci, and create waves as may be seen in some embodiments. On the left, wave creation type A (177), and wave creation type B (178) on the right. To create waves, the nodes or loci may fire and vary the characteristics of multiple pulses or spikes (77) over time in the same or nearby nodes or loci. For example, an area increasing and later decreasing their pulse or spike height or amplitude in some embodiments. This is represented by different vertical line height across the waves in this fig. This may occur in many nodes or loci across the network in some embodiments as a wave passes over the nodes or loci. These amplitudes and timings may be recorded in some embodiments.

The number of firing nodes or loci may determine the amplitude in some embodiments. The network may, or waves may, cause variation of the number of nodes or loci firing to imitate, record, transmit or create waves. By firing many individual nodes or loci as pulses or spikes together, a wave may be created. A few nodes or loci may fire at first starting the wave. Some more node or loci pulses or spikes are added to these, increasing the amplitude of the wave, this addition may continue until a wave crest is reached. At this point the number of nodes or loci firing may decrease creating the downward slope of the wave to the wave trough. This may cycle again or repeat if it is a sustained wave establishing a frequency. In this way the number of firing nodes or loci may create waves in some embodiments. Passing waves would be recorded in the same way for future playback.

Moving waves may be created or transmitted by nodes or loci firing as a wave reaches them when a wave travels across a network, much as a wave is created by a moving display sign, or for example, an audience in an arena with their arms, flags, or bodies in some embodiments.

Nodes or loci may respond to waves, with wave addition, summation, constructive interference/cooperative waves, cancellation, destructive interference, creation of beats and other wave phenomena in some embodiments. These effects may occur above or below the threshold level. Wave beats may be created with somewhat different frequencies, emphasizing differences or changes in waves. The beats may cause sub-threshold waves to appear above threshold with constructive interference/cooperative waves in some embodiments, or below with destructive interference. These conditions may trigger further changes, depending on the node or locus connections at that point.

In FIG. 15 the first dashed horizontal line is the upper one, the wave mid-level (31) and is seen in each of the three levels of the figure top to bottom. The second line is the lower dashed line in each of the three levels on both sides and is called the wave lower reference level (181) here.

At the top left for pulses, spikes, firing to wave creation type A (177) we see upward pulses or spikes (77) from an upper dashed wave mid-level (31), and then negative pulses or spikes from the same dashed line, under the line. This line continues across the page to the right side for pulses, spikes, firing to wave creation type B (178). On the right side the pulses or spikes (77) originate from a lower reference line, the wave lower reference level (181) line.

In the center of the page on the left we see the outline of a wave (48) placed over the spikes or pulses on both sides. This same wave continues across the page from left to right still following the pulses or spikes for both types of wave creation A and B.

Finally at the bottom level of the page we see the wave (48,75), the same on both sides, having been created by spikes and pulses in different ways which may be used in embodiments. These wave forming mechanisms may be used with many different wave types and embodiments. Different wave types, and transmitters, recorders, media, and players/radiators for them may be used in the same embodiments.

Any wave type (75) may be used or created in embodiments. Any wave (75) type may be built up from pulses or spikes of sound, light, electrons and other types in embodiments.

FIG. 16

Figure 16:
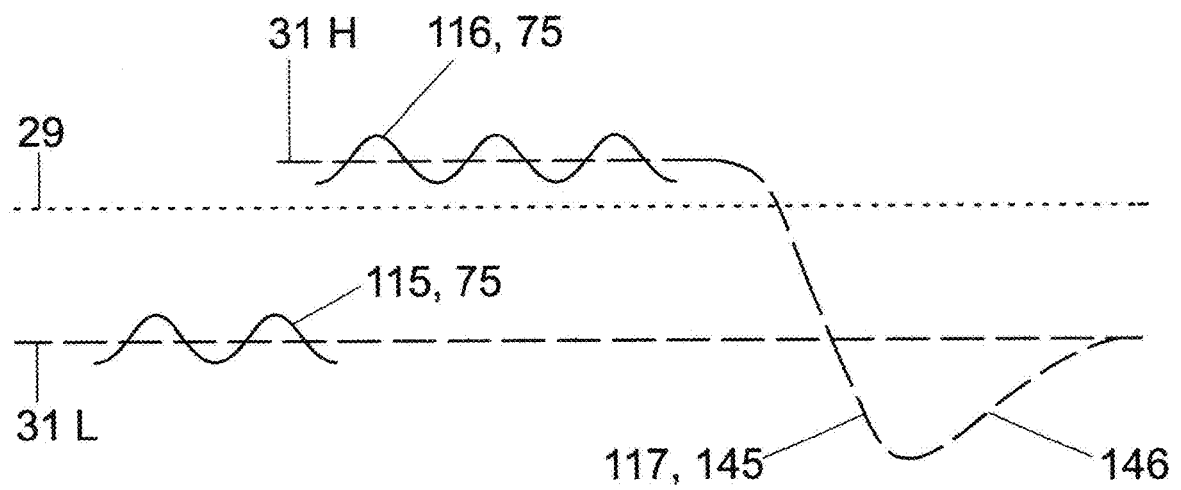
FIG. 16 Level diagram.
Figure 16:
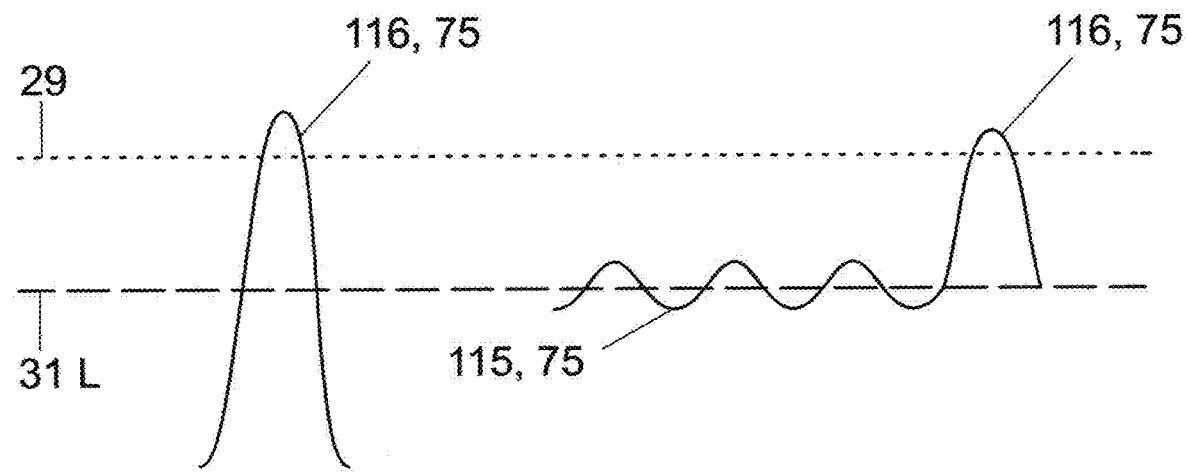

FIG. 16 at the top, is a diagram of two waves, with a threshold depicted as a dotted line, two wave mid-levels as dashed lines, dormant period with reduced wave mid-level, and recovery period with rising wave mid-level.

These could be a simplified example of waves built up from spikes in one embodiment as previously explained. These waves may also be at a node or locus in an embodiment utilizing conventional digital recording with the node or locus as the transducer speaker/microphone. This diagram shows two waves (115, 116), two wave mid-levels (31 L, 31H), a threshold (29) level, and a dormant period (117, 145). There are three horizontal lines, the highest dashed line (31 H), the dotted line (29) and the lower dashed line (31 L) in the figure. The lower dashed line, lower wave mid-level (31 L), is the adjustable default wave mid-level before waves arrive, in this embodiment. The dotted line (29) above the lower wave mid-level (31 L) is the threshold (29) level.

At the top, there are two waves shown (115,116), but their wave characteristics such as amplitudes and frequencies might not be representative, as they may vary due to different sensory inputs and network situations. Many more waves may be present as well in some situations and embodiments. For clarity only two waves are shown, but the upper wave (116) would be elevated to the shown overthreshold level by waves that are not illustrated in this fig. in some embodiments. An alternative illustration could show all the other waves present, or, as one combined higher amplitude wave exceeding the threshold as seen at the bottom of the page. When triggered to record, all waves present at the node or locus would be recorded in some embodiments.

Back to the top of the page, one wave is sub-threshold wave (115) and the other is over-threshold wave (116). In sub-threshold conditions for the node the wave would be transmitted unchanged, sub-threshold across the node and its node branches (23) onto the next nodes in some embodiments, and through the medium in others as well. The network transmits waves with little or no decrease in amplitude over distance in some embodiments.

Waves may arrive over-threshold, or waves may be elevated above threshold by constructive interference/cooperative waves, addition, summation, multiplexing, carrier waves of high enough amplitude, beats and any other wave phenomena.

In some embodiments as seen at the bottom of the page, waves may also be depicted utilizing the lower wave mid-level (31 L) with the amplitude or crest exceeding the dotted threshold (29) line.

For FIG. 16 top, the lower dashed line, lower wave mid-level (31 L) is a sub-threshold wave mid-level at a default average level as might exist across a network before many wave inputs in some embodiments. As mentioned, this wave mid-level can be adjusted up or down closer or farther from the triggering threshold (29) level to change the node's or locus' likelihood of triggering or firing, that is, activating or triggering the node or locus to record, or playback in some embodiments. This activation would be taking the node or locus from passively transmitting most of its waves along its branches and medium along the network, to now passing waves down its extension, recording, recognizing, playing or radiating depending on the situation in some embodiments.

That is, if a wave or part of a wave is at or above the threshold the node or locus may trigger or fire in some embodiments, recording, radiating, playing, or transmitting to other components, such as, for example, a locus sequence recorder, or transmitting waves to a motor actuator if the node were in the specialized motor area.

Wave levels could be quantified relative to one another and the threshold levels using an X axis (not shown). For example the lower wave mid-level (31 L) may be at an X axis level of ten with the threshold (29) above it at an X axis level of twenty. An arriving lone wave of amplitude two on this lower wave mid-level (31 L) would not reach the threshold, and the node or locus would not trigger or fire. This wave of amplitude two would continue to travel on the network from node to node, locus to locus, sub-threshold, that is, below threshold (29) at the wave mid-level (31 L) in some embodiments. No recording or playing of this sub-threshold wave would occur in this example, although recognition may occur in some embodiments due to wave interactions which are not present in this example. New wave amplitudes, should they be present, are added on the X axis to the waves currently present at a node or locus. This can be represented as shown at the top in this FIG. 16, or as a combined wave, utilizing wave mid-level (31 L) with a larger, threshold exceeding amplitude, as at the bottom of the page.

A default lower wave mid-level (31 L) and the threshold (29) are normally set across the network so that the majority of waves at any one time are sub-threshold, and this may be set manually or automatically by a microcontroller or computer to a selected level such as the previously mentioned ten for the default lower wave mid-level (31 L) and twenty for the threshold (29). In some embodiments they may be set so that 90% of waves across the network may be sub-threshold.

All over-threshold waves across the network could be eliminated by setting the threshold out of reach of any possible network waves, thus shutting the network down in some embodiments. Also, the default wave mid-level (31 L) could be lowered out of reach of the threshold across the network to achieve the same shut down. Both could be done as well in some embodiments, in combination with removed sensory input and motor output.

After being shut down in this way the degree of network activity could be increased by slowly lowering the threshold level across the network (or raising the default lower wave mid-level (31 L)), until some areas of large amplitude constructive interference/cooperative waves begin exceeding the threshold, thus causing activation of the network. These areas of constructive interference/cooperative waves exceeding the threshold could be due to multiple sensory wave inputs from sensors interacting, such as spectrally shifted light and sound for example, or recalled associations. There could be many more sensory and association area activations in some embodiments than shown here. Depending on the areas of the network where the constructive interference/cooperative waves exceeded the threshold, this could cause wave outputs from the extensions (at motor areas to actuators), recording or playing (at association areas), or creating sounds or images (in sensory areas) in some embodiments. The specific locations in these areas stimulated by this constructive interference/cooperative waves are selected by wave mechanisms described later.

Summation of waves, constructive interference/cooperative waves, a wave of higher amplitude, a carrier wave (not shown) for example could cause the threshold (29) to be exceeded. In other words, the lower sub-threshold wave (115) would be elevated to above the threshold (29), like the position of over-threshold wave (116) at the top and bottom, by the presence of one or more other waves in some embodiments. As shown, this could be represented by one combined wave in some embodiments. Displays of the waves on the network could have a toggle for switching between these two wave display modes.

Most or all the waves present at the node or locus over-threshold would be sent along the extension to be recorded or radiated in some embodiments. Sub-threshold waves may build or add up, and summation may occur causing them to become over threshold in some embodiments.

Dormant Period and Other Topics

A selected duration of post-activation node or locus dormant period (117) with a reduced wave mid-level (145), and a selected node or locus recovery period (146) curve, would stop, and later limit, post activity transmission along extensions in some embodiments. This can be seen in the dormant period (117) in this FIG. 16. No activation of the node or locus is possible after over-threshold firing, triggering or transmitting down an extension, during the subsequent dormant period in some embodiments. Any wave's mid-level (31 H, 31 L) on the X axis is lowered a preselected maximum amount, which could be thirty on the x-axis in some embodiments, for 50 milli-seconds (ms) or more to create the dormant period in some embodiments. This would recover upwardly during a recovery period (146) to the pre-activation default lower wave mid-level (31 L) after a period of rest time. This recovery period (146) after the dormant period would allow activation during the upward slope portion should waves of sufficient strength arrive to reach the threshold (29). The recovery period duration would be an additional 100 ms or more in some embodiments. These time periods may be shorter, longer or adjustable in different embodiments, depending on the network requirements. For example the dormant period, recovery period and the global reset wave can be adjusted relative to one another in some embodiments. The time period of dormancy and recovery would be adjustable and equivalent to the time the wave was radiating at the node or locus plus an additional pre-determined dormancy and recovery time which would be proportional to the size of the network in some embodiments.

This over-lowering of any present wave mid-level prevents wave re-entry phenomena and uncontrolled network-wide discharge of nodes. Wave re-entry phenomena here would be when a wave radiates from node or locus A, then that same wave or similar wave is sent back by another node or locus B, then node or locus A is re-stimulated to radiate again, and so on, repeating the cycle. This wave re-entry phenomena is prevented by the dormant and recovery periods. Thus the locus or node does not re-recognize or play new incoming radiated waves at the radiating nodes or loci until recovered. This is due to the fact that the sequence is still playing out, and after the sequence is finished, the loci that played or radiated the sequences go into their dormant period as described. Any new recognition, recording, radiating or playing due to this wave sequence during the dormancy period of nodes or loci will be recorded by other nodes or loci that did not play—and so are rested—if they achieve an over-threshold condition. When the dormancy period is over, that node or locus may become activated again in the usual manner.

A selected node fatigue curve, may limit post activity excitability in some embodiments. The fatigue curve would be based on lowering the lower wave mid-level (31) a selected amount further down after each activation of the node or locus, taking any waves which may pass through the node farther and farther from the trigger threshold. As described earlier, this would recover upwardly to the selected normal state with a selected period of rest time as the term fatigue implies.

FIG. 17

Figure 17:
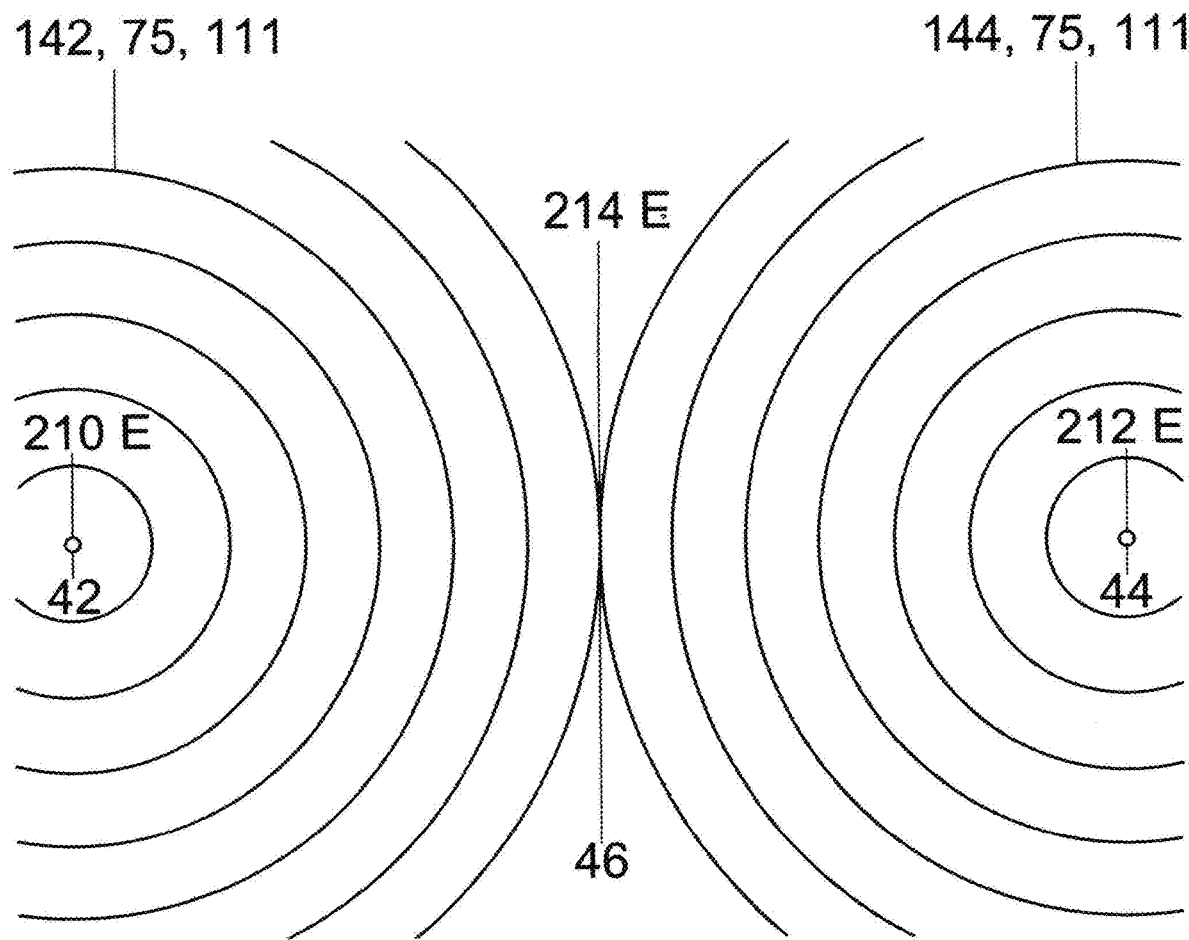
FIG. 17 Overhead view of an embodiment shown on FIG. 17 through 20.

FIG. 17 shows an overhead, simplified, diagram of two interacting waves. The process shown on FIG. 17 through 20 includes wave time reversal. Time reversed waves may also be used in some embodiments.

For simplicity and clarity, FIG. 17 through 20 do not show details that are shown in later fig. Although not shown, different combinations of components such as networks, media, more nodes, and loci could be used in embodiments. Different waves, input locations, recording and playing locations, types and numbers of these could be different in embodiments and scenarios. Also, reflections, refraction, other phenomena and activities could be present in different embodiments.

In FIG. 17, source (42) and source (44) may be radiating waves into the network from sensor inputs or association area recordings. Constructive interference/cooperative waves between the two waves leads to over-threshold conditions which cause recording.

Wave Time Reversal

FIG. 17 through 20 will show time reversal, and wave time reversal, mechanisms that by recording and later playing or radiating, the recorded waves locate their sources (42, 44) on a network, and recreate the waves that originated there at those sources, with wave time reversal finishing with an original, forward wave sequence.

In FIG. 17 we see two wave sources radiating waves at locations source (42) and source (44). The emitted waves are (142) and (144). They can be any wave type (75). These two waves (142, 144) are seen to overlap and interact causing an over-threshold condition due to constructive interference/cooperative waves (46). Due to this over-threshold condition, the waves are recorded at constructive interference/cooperative waves (46). This constructive interference/cooperative waves and recording would occur in a network or medium including nodes or loci, over a node or locus (not shown) in some embodiments. There may be one or more of these interference or cooperating wave areas and recordings in some embodiments. Since these are the first waves in the example or chosen time segment, these can be differentiated from later waves by calling them preceding waves (111) from 42, 44 (210 E, 212 E) which meet at interference (214 E).

FIG. 18

Figure 18:
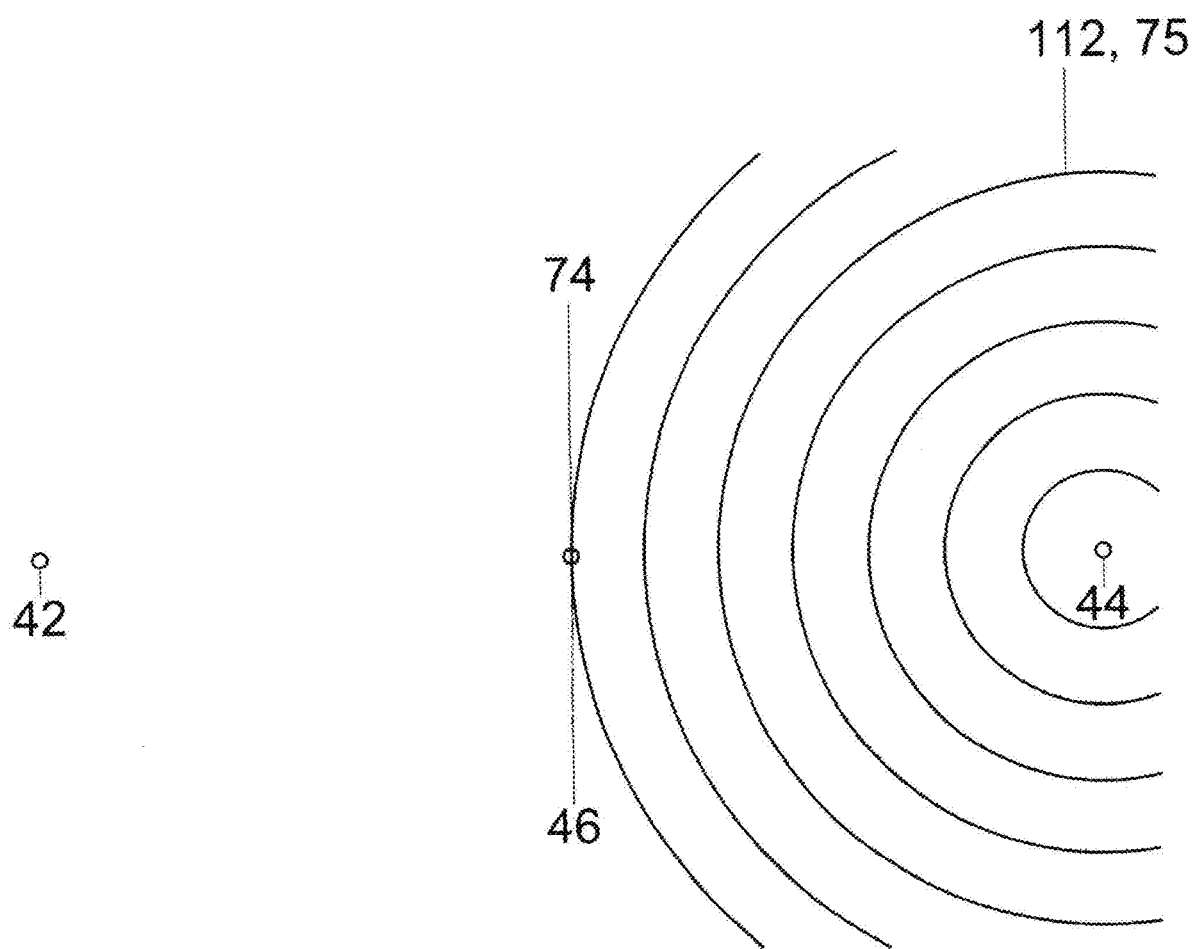
FIG. 18 Overhead view of an embodiment shown on FIG. 17 through 20.

FIG. 18 is an overhead, magnified, simplified representation of an embodiment, continued from FIG. 17 with a new incoming wave shown.

The new incoming wave (75) from the right is the same, similar, or a component, of a previous wave from FIG. 17. This new wave will be recognized at the location of previous constructive interference/cooperative waves (46) which had created an over-threshold condition which led to recording.

This new wave may be called a following wave (112) to show that it occurs at a later time than the earlier FIG. 17 preceding wave. We see this new following wave (112) in FIG. 18 radiating or playing from source 44 (44). This may be any wave (75) type.

So, this wave in FIG. 18 is called a following wave (112) to differentiate it from the wave in the earlier FIG. 17 which is called a preceding wave (142,144,210 E, 212 E), or waves which interacted at interference (214 E) in the previous FIG. 17 embodiment.

As stated before these waves may be constructive interference/cooperative waves (46) in some embodiments. The preceding wave or waves are the original wave or waves of FIG. 17 in these examples. In FIG. 18 the following wave that is radiating is the same as, similar to, or a part of preceding waves from sources 42 or 44 or both (142,144) from FIG. 17 in some embodiments. Any similarity in the following wave of FIG. 18 to either recorded wave of FIG. 17 may be enough for recognition in some embodiments.

This new following wave (112) in FIG. 18 radiates over the location that recorded earlier in FIG. 17 due to constructive interference/cooperative waves (46). In FIG. 18 following wave (112) is recognized at location (46) as similar to wave from source 44 (144) from FIG. 17.

FIG. 19

Figure 19:
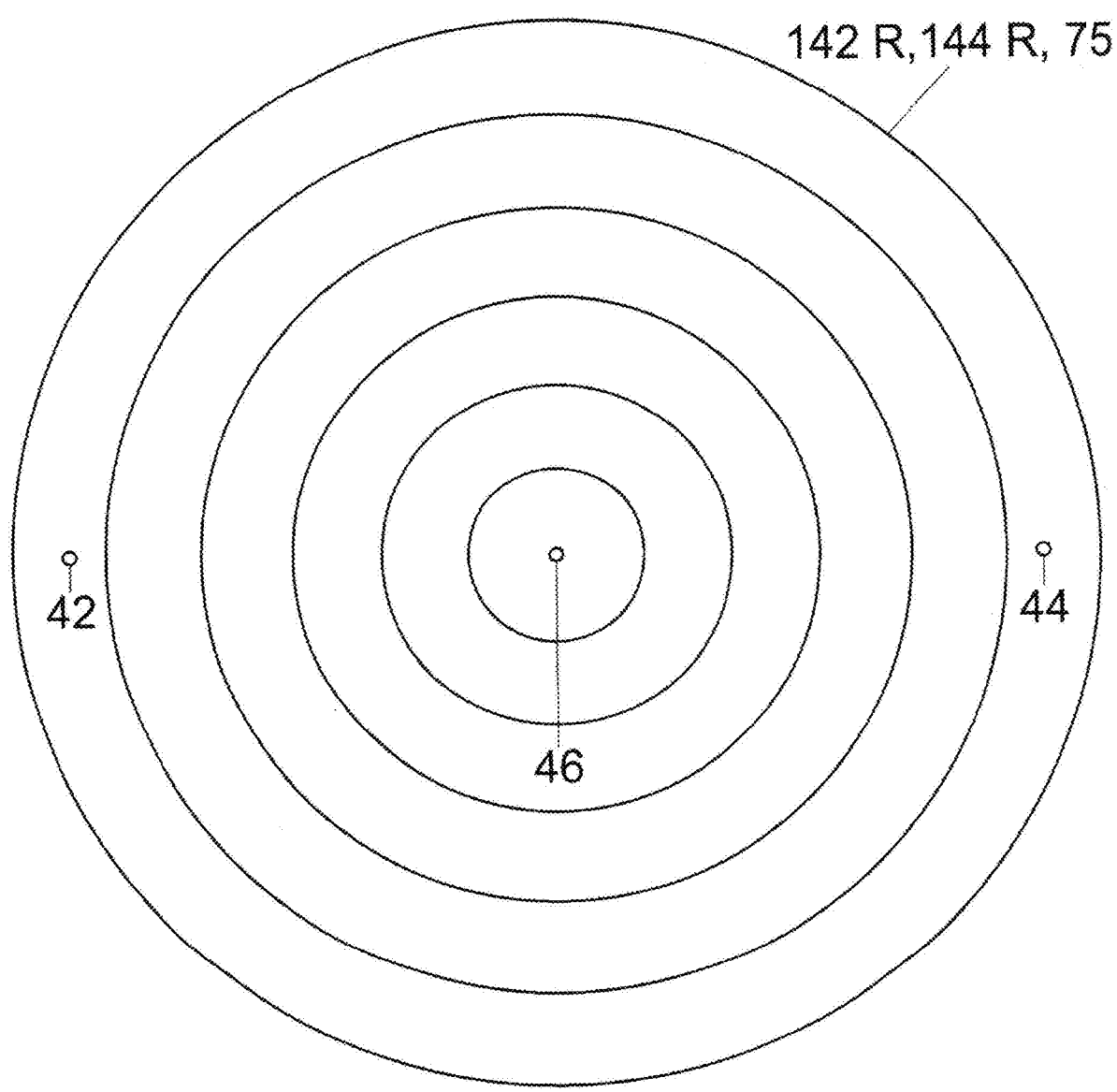
FIG. 19 Overhead view of an embodiment shown on FIG. 17 through 20.

FIG. 19 is an overhead, magnified, highly simplified, process continued. In this fig. recognition of waves causes previously recorded waves to be radiated or played, to return to, and focus, on their origins from FIG. 17 due to time reversal or wave time reversal. This time reversal or wave time reversal focusing causes an over-threshold condition at these original sources. Reflective blank nodes, refractive nodes, or blank loci, and other reflections or refractions may help focusing but are not shown for clarity. Once the waves from the recordings are played or radiated at area (46), area at (46) enters the inactive, dormant period. These played recordings include both waves from source (42) and source (44) in some embodiments. As mentioned some embodiments include all waves present when the recording was made. This allows for more complex associations to be recalled and re-created.

As stated, due to the recognition (74) from FIG. 18, location (46) in FIG. 19 now radiates the recordings it made of waves (142) and (144) in this example. For clarity only one wave is shown in this FIG. 19. In this FIG. 19 the original wave recordings are now playing back recorded waves from location (46). These recorded waves were originally from source 42 (142 R) and from source 44 (144 R). They now radiate over their original sources (42, 44) from FIG. 17.

Now, location (46) having radiated, becomes dormant as described earlier. Other locations, not shown for clarity, but behaving similarly to those illustrated at (46), also radiating (142 R) and (144 R) may also participate in the process in some embodiments. When speaking of location (46) recording, recognizing or playing this can be referring to nodes or loci at this location, and may utilize microcontrollers, remote computers, software simulations or other means or mechanisms in some embodiments.

FIG. 20

Figure 20:
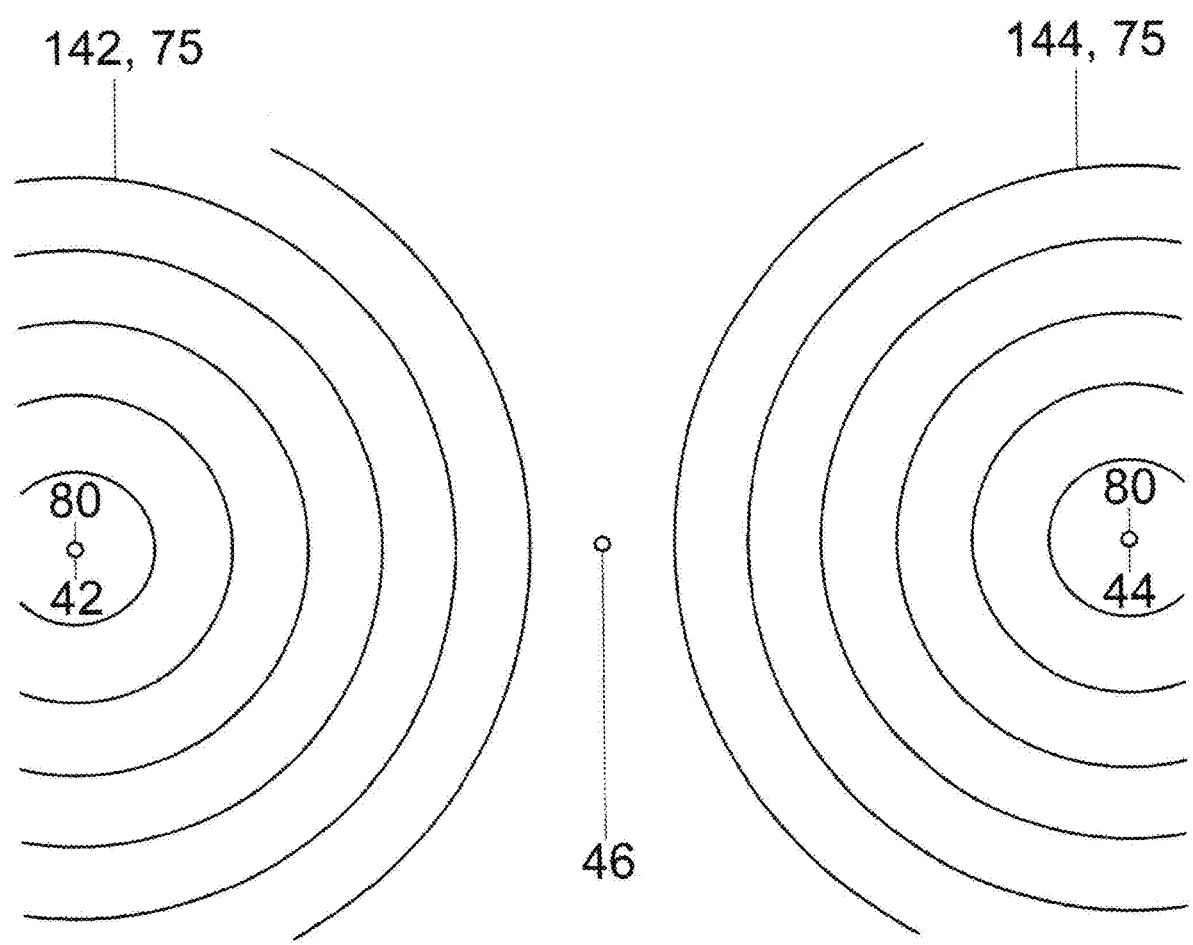
FIG. 20 Overhead view of an embodiment shown on FIG. 17 through 20.

FIG. 20 is an overhead, magnified, highly simplified process continued. Original wave sources as seen in FIG. 17, are shown radiating their original waves in this FIG. 20, due to time reversal (80) or wave time reversal (80) focusing. As mentioned previously the waves in the figures are representative, and actual wave characteristics would differ in some embodiments.

In the previous FIG. 19 the recorded waves arrive at their original source locations (42,44) causing the nodes or loci at these original sources to resonate or play the focused, over-threshold, recorded waves as seen in this FIG. 20. This is the association of the first two waves from FIG. 17, now recalled, recreated, or retrieved at a later time by only one of them, a part of one, or a similar wave. In this way an earlier memory or association may be recalled by a later wave stimulus or part of a wave stimulus.

The waves are not re-processed at the now dormant area (46) in some embodiments, as previously mentioned, due to dormancy, recovery and fatigue effects.

Although the fig. shows only two dimensions, the mechanisms described can work in one or more dimensions. Only a small number of waves are shown but there may be many more taking part.

Locations (42) and (44) receive the effects of wave time reversal, time reversal, reflections, triangulation, refraction (80) of the waves (142 R) and (144 R) from FIG. 19. In the case of reflections off blank nodes, blank Loci or other reflective areas as described earlier, one source would need to radiate to re-create the original waves temporally and spatially, but many more may be present in some embodiments. One location can be enough to locate another in embodiments, using one or more of: reflections, focusing, triangulating.

Wave Time Reversal and Time Reversal

The mechanism and terminology wave time reversal (80) will now be described: These are waves that return to their original source locations (or analogous locations) as if time were reversed, however, they are radiated at their original source locations in their original, correct temporal order in wave time reversal, not backwards or reversed as in time reversal.

Wave time reversal as used here refers to the waves returning to their original one or more dimensional source locations in the network or media. The waves are focused and radiated at their originally radiated locations, as they were originally, or with some similarity to how they were originally, thus being recalled, in some embodiments.

If, for example, the waves in wave time reversal first enter the network or medium at their original locations of FIG. 17 (42,44), in the order "hello world", then the waves are recreated in the later FIG. 20 with the same order "hello world", at their final original source locations in FIG. 20 (42,44). In other words, they are recreated temporally and spatially at their final focus located source or origin in their original order. That is, wave time reversal re-creates the temporal order "hello world" at the end in FIG. 20, in the receiving original nodes or loci (42,44). The temporal order of the original first waves is the same as the temporal order of the last waves created by focusing in wave time reversal embodiments.

On the other hand, time reversal would take "hello world" and recreate "dlrow olleh" the waves are reversed as if time were reversed. Still, time reversal may be used in some embodiments but this end result of "dlrow olleh" would need to be reversed to be understood as "hello world". When time reversal is employed (instead of wave time reversal), the backwards wave temporal order of time reversal would be reversed at a selected point to recreate the original waves in some embodiments. In other words, time reversed waves could be corrected/reversed at a selected point to go from "dlrow olleh" to the understandable "hello world" for the end result. Time reversed waves could be maintained in memory as they entered, in their correct order, for example "hello world", for later recall at the original focused source locations, in some embodiments.

Correcting of the final result by reversing, or maintaining the correct temporal sequence throughout would be wave time reversal. In wave time reversal the correct wave order is maintained throughout the process, or it can be re-created at different times in different embodiments if time reversal is used, as long as the end result is the correct temporal order, for example: "hello world". Time reversal focuses "dlrow olleh", and when this is corrected to "hello world" it becomes wave time reversal.

When one or more locations time reverse or wave time reverse, the original sources are located and focused on in one or more dimensions depending on the embodiment. This can be in part by triangulation by one or more different points with the aid of reflected waves in some cases. This causes constructive interference/cooperative waves due to one or more time reversed or wave time reversed (80) waves overlapping and focusing at the original source or sources.

The overlapping of waves can cause constructive interference/cooperative waves, and an over-threshold condition, that is, wave focusing at the original sources in some embodiments. The mechanism described here uses these constructively interfering or cooperating original waves, and their reflections as recreated at the original source or sources. The waves may induce radiation, vibration, resonance, or recognition in some embodiments at their original source locations, nodes or loci. The original source nodes or loci now radiate the original waves as received from the recordings in some embodiments as seen in FIG. 20.

With this process associations are made between multiple waves and their information content, and in this way, recall of multiple waves and information can be triggered again in the future by recognition of one similar wave or part of one.

In FIG. 20 we see original locations (42) and (44), now radiating the waves that passed over them and concentrated or focused on them, causing the over-threshold condition. These waves were (142 R) and (144 R) from FIG. 19, the recordings of the original waves from FIG. 17 (142, 144). The original waves are now re-created by wave time reversal at their original source locations temporally and spatially, in their original, recognizable, order or sequence, thus associating them and recalling them. In this way the situation of FIG. 17 is recalled or recreated. This recall was caused by a stimulus having similarities to a previous one, where the similarity takes the form of wave or stimulus characteristics. With the above process associations are made between wave stimuli with their information content, and recall is triggered by a similar event or part of a similar event in some embodiments.

Wave time reversal, time reversal, reflections, triangulation, refraction (80) may be distributed to one or more networks for processing in some embodiments. Associations or parts of associations may be distributed to one or more networks or parts of networks. As mentioned, networks are paired in some embodiments, so when one network is busy it can delegate activities to another. Also, if one network is recalling associations, the other can be processing sensory input.

If part of the time reversal or wave time reversal mechanism takes place on one network, and another part of the mechanism takes place on another network, the waves can be recreated with time reversal or wave time reversal at locations that are not original. Time reversal or wave time reversal is still used, even if the mechanism is split into one or more or networks mentioned earlier.

For example time reversal might be used on one network then the waves mapped onto a different network, so using two networks with final focusing on the second non-original network in some embodiments. Another embodiment might use time reversal on one network and then map the waves onto another network and continue with wave time reversal. Some embodiments might start the time reversal or wave time reversal process on one or more networks and then map the waves onto one or more other networks and continue with the mechanism focusing on sources which are not original. In some embodiments the networks may be layered or stacked.

FIG. 21

Figure 21:
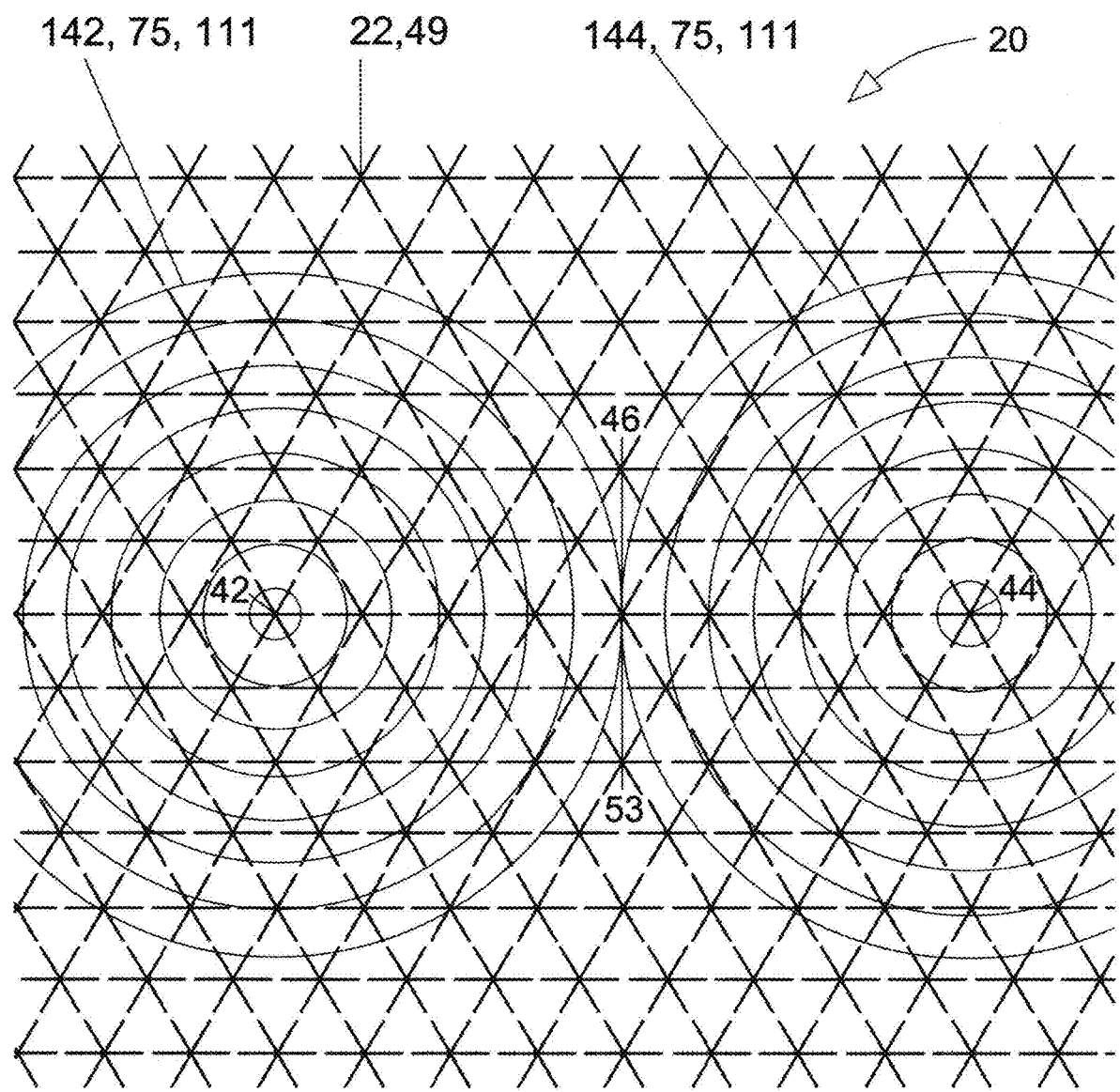
FIG. 21 Overhead view of an embodiment shown on FIG. 21 through 23.
Figure 22:
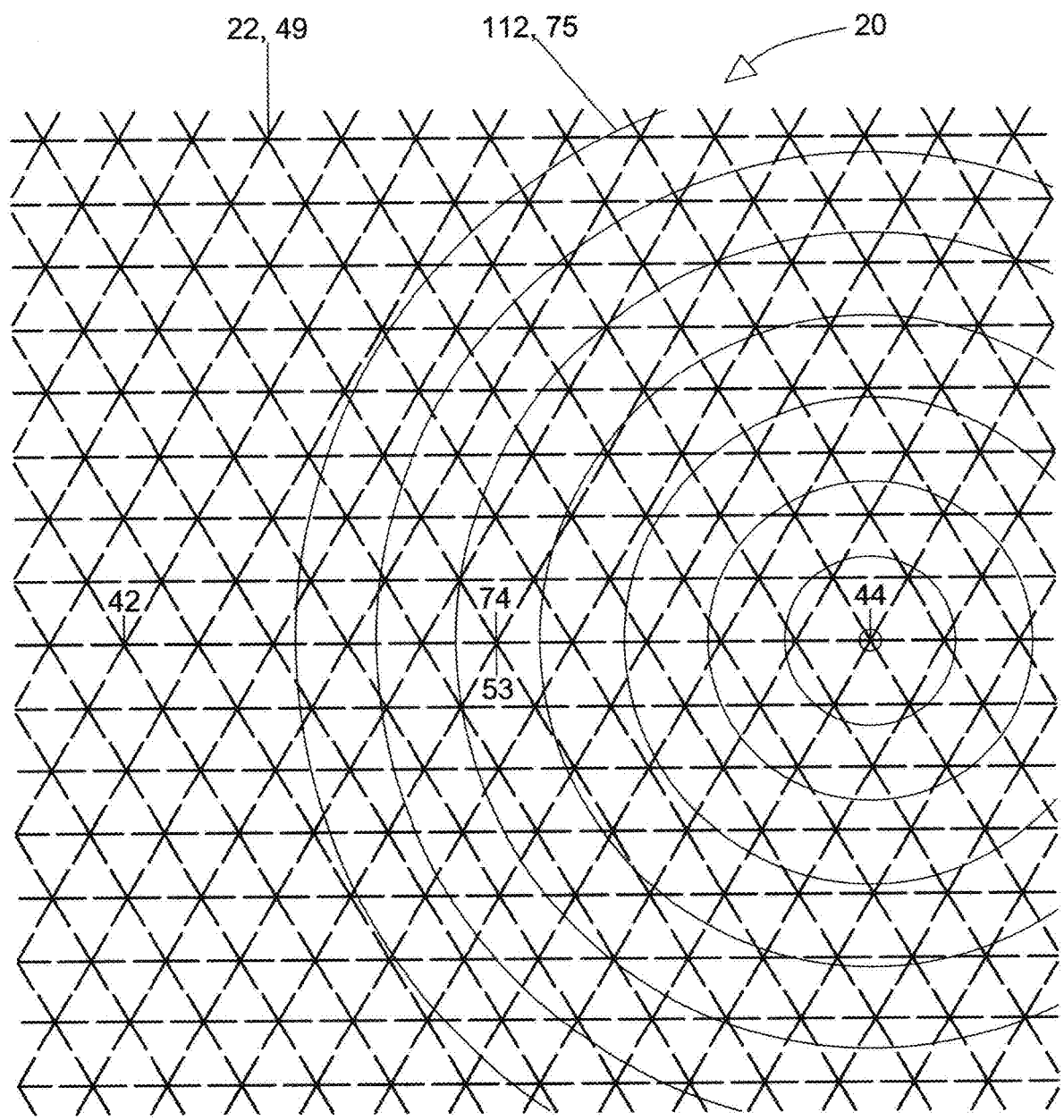
FIG. 22 Overhead view of an embodiment shown on FIG. 21 through 23.
Figure 23:
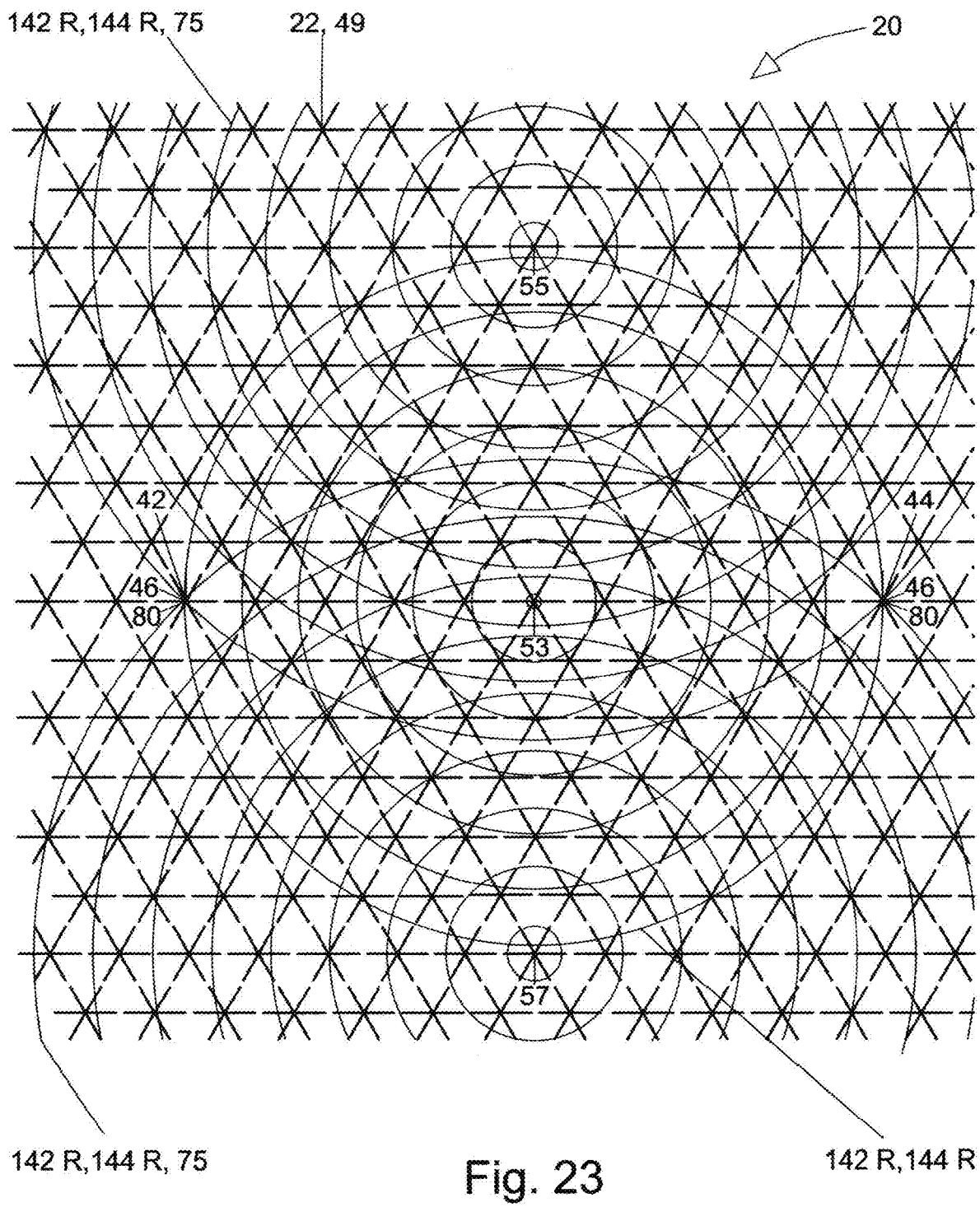
FIG. 23 Overhead view of an embodiment shown on FIG. 21 through 23.

FIG. 21 is similar to FIG. 17, only now showing nodes or loci present. FIG. 21 is an overhead view of a network, or a part, with nodes or loci, two sources and constructive interference/cooperative waves. FIG. 21 through 23 include time reversal or wave time reversal on a network. FIG. 21 shows two incoming preceding waves (111). The two wave sources are seen at either side of the fig., and constructive interference/cooperative waves in the middle at a middle node. Constructive interference/cooperative waves (46) create an over-threshold condition and recording of the wave environment in the network at the location of the node (middle) (53) or nodes in this embodiment. Recording of the wave environment including one or more waves allows for more complex associations. One or more waves or parts of waves may reflect at multiple points and arrive here also in some embodiments. Waves with an amplitude above a selected threshold will cause recording. When the network waves at the location of the middle node drop below threshold the recording ends in some embodiments, in others it continues for a selected time or distance below threshold.

FIG. 21 shows the two wave sources at either side of the fig., sensory source (42) and sensory source (44), these would radiate in the sensory areas, motor areas, association areas, or other areas which as mentioned, would be far apart in some embodiments but are shown much closer together to show the mechanism more clearly in these figures.

The representations in this fig. may take place in multiple network areas or in different connected networks in some embodiments. There may be one or more examples of these processes in some embodiments. In some embodiments there may be very large numbers of simultaneous processing events taking place, some interacting with one another either directly as waves or indirectly via calculation. Some processing may take place on delegated networks connected to the main network.

In some embodiments these areas would radiate to, and interfere/cooperate in the central association area for the creation of associations or memories there. The association area, and in some embodiments, other areas, may have cooperating/interfering areas within them. For example, a location in the association area may radiate a wave and interfere/cooperate with another wave in the same association area in some embodiments. If over-threshold, another recording and association would be made between those two previous associations. Associations of associations can lead to more complex sequential associations. Due to fatigue, the lateral inhibition effect, retinal processing and other effects in some embodiments, these associations would be activated sequentially. In some embodiments waves or associations may be played in other networks or parts as one network area fatigues and the other network activates. Node or locus fatigue of a selected duration may aid in this effect in some embodiments. As mentioned, this fatigue may be seen as a numerical reduction of the default wave mid-level in some embodiments. In this way one sensory input can trigger an assortment of previously associated sensory inputs and associations.

In this example of FIG. 21 we will assume the waves are of sensory origin. The radiated waves (142, 144) from the sources (42, 44) contain the sensory information received from one or more sensor's input to the network. This input may be one or more of frequency of sound, frequency of light (spectrally shifted for the network if needed), actuator length of movement (length of wave), actuator rate of change feedback (frequency), and others in some embodiments.

As another example in this highly simplified figure, a wave (142) from location (42) could be a wave from the visual sensory area representing the equivalent of a pixel of a two dimensional image, containing the frequency related color information, the pixel location in the image relative to other pixels, and in some embodiments the brightness as amplitude. Brightness could also involve number of pixels in some embodiments. The pixel's location would be relative to other nodes or loci in the network with their other pixel inputs. These relative pixel locations would create an image in some embodiments.

The second wave (144) in this example could be a frequency of vibration input from a sound, along with its source location information in some embodiments. Both of the waves would interfere/cooperate at constructive interference/cooperative waves (46). As mentioned before, light frequency would be converted to a wave compatible with the network wave spectrum as would other waves, if needed, in some embodiments. In this way a light or an image would be associated with a sound, such as the sound of a bell for example.

In most embodiments these two sources (42, 44) would be much further apart as stated, that is, separated by a large number of nodes, and the constructive interference/cooperative waves and recording would occur in the central association area as seen in FIG. 6 (88). Due to the network's scalability the number of nodes in some embodiments could be anywhere from just one, or that illustrated, or to billions of nodes or more.

Continuing with FIG. 21 these source locations (42, 44) may be greater in number than the two illustrated here, and if in a sensory area may be enough to create a recognizable image in one, two or more dimensions, multiple sounds, or motions in some embodiments.

There may also be many waves from other sources, including waves that were spontaneously generated in the network itself due to interfering/cooperating waves, much as rogue waves are generated in the ocean, called internally generated waves (68) as seen in FIG. 33A.

Continuing with FIG. 21 the waves meet at (46) and this causes the initial constructive interference/cooperative waves (46). In this example the constructive interference/cooperative waves is shown in its initial stages and exceeds the threshold of the network node (middle) (53) at (46) first, and recording of the waves begins. Here one node (53) is shown at (46) for clarity, but in some embodiments there would be far more. Recording when it begins in some embodiments, records the waves for a selected length of time depending on the capabilities of the recording mechanism employed. In some embodiments the entire duration of the waves can be recorded, while as mentioned, in others it is amplitude and threshold determined.

When recording takes place, the wave environment, that is, all the waves present at the recording location are recorded in some embodiments. This allows for the recording of complex associations of sensory information, and associations of associations in some embodiments.

In some embodiments the waves are moving and as the waves overlap there will be other areas of constructive interference/cooperative waves. The network response to them will be limited by gain and contrast control that minimizes all but the strongest areas of constructive interference/cooperative waves, as would lateral inhibition in some embodiments.

The network may be automatically adjusted to allow a selected amount or number of the strongest nodes to fire at any one time, much as one would adjust a radar gain control for its display. In the radar analogy the radar display is adjusted to show the strongest returns so as to see the image more clearly on the radar display without the weaker unwanted clutter. In this way the recognizable images in some embodiments would be seen mainly in the sensory areas, such as the visual area for example. The nodes representing the stronger pixel locations and color frequencies would be in their environmentally detected positions relative to one another on the network. This would allow making recognizable images for example if output to a user for example. These images would appear as recognizable, pixelated images in some embodiments or as very high resolution in others. Amplitude brightness or activated pixel density would create areas of light or dark in some embodiments.

These images, as well as sounds and other network phenomena, would be recorded as described, and would output to a monitor to be seen by the user in some embodiments. Retinal processing such as retinal receptive field, surround, on-center, off-center excitation and inhibition organization can also be used in the network to increase contrast, detect changes and movement, and to also help limit excess activation in some embodiments.

FIG. 22

FIG. 22 is an overhead, magnified, highly simplified process, including time reversal or wave time reversal on a network, continued from FIG. 21. This FIG. 22 shows a new incoming following wave (112), which may be thought of as a trigger wave if it causes playing or radiating in some embodiments.

This wave is occurring some time later than FIG. 21, and we see the new incoming wave passing over the area (including the middle node) of earlier constructive interference/cooperative waves of FIG. 21 (46) that recorded. This new wave on FIG. 22 may be from a new sensor input to the network, or an old association that just fired from far away, or anywhere in the network for example, but is shown originating at source (44) for this FIG. 22.

This new wave is the same as, similar to, a component of, similar to a component of the waves from FIG. 21 and is called a following wave (112) to differentiate it from the original, first waves of FIG. 21 which are called preceding waves (111). This following wave is now recognized by the node (middle) (53) utilizing resonance, neural networks or other mechanisms. This recognition will cause the middle node to play or radiate what it has recorded in the past, as seen in the next figure.

In this example of FIG. 22 this following wave (112) may have come from a sensor due to new sensory input, a previous association, or it may have been internally generated as previously described. In some cases, this new input could be part of an association from far away that includes waves that are one or more of: the same as, similar to, a component of, similar to a component of the earlier preceding waves.

As this following or trigger wave passes over the node that recorded the two interacting waves (142, 144) in FIG. 21 at constructive interference/cooperative waves (46), the new following wave (112) or trigger wave is recognized as one or more of: a repeat, part of, or similar to, one of the two preceding waves recorded by the node that recorded initially at FIG. 21 (46). In some embodiments more than one node may do this recording and recognizing. This recognition may be caused by mechanisms mentioned in the glossary under recognition, in FIG. 18, and other methods in some embodiments.

Resonance and Other Topics

Resonance here is where a wave causes oscillation or vibration of an object or simulated object sensitive to that same frequency, here in this embodiment, a frequency specific node. Resonance simulation is where a virtual node or object resonates virtually, as for example, in a software program.

In one embodiment a wave creates a node that is sensitive to its frequency when recording, and from then on, the node is sensitive to resonance at that frequency. This could be in the form of tuned or tunable circuits (74). This could also be achieved physically, or simulated, by a distribution of channels in a fluid membrane, set during recording by the wave's characteristics along the node's linear portions. This would occur by the wave's vibration opening, closing or distributing physical channels in a fluid membrane much as grains of sand are distributed on a speaker or flat surface due to the vibrating wave's characteristics. The channels may be opened or closed based on the wave characteristics much as in a flute in some embodiments. This might be protein ion channels in a phospholipid bilayer. This might also be resonating polymers of proteins being built, breaking or being enzymatically trimmed to the length of the wave due to wave characteristics or resonance. This could be the protein actin in some embodiments. These mechanisms could also be simulated in a computer.

Resonance could be simulated in a computer in a different way in some embodiments by numerical representation to save processing power and CPU processing time. Also this recognition (74) could take the form of comparing or matching of wave characteristics codes of different waves. This could be mathematically modeled in another embodiment. In yet another embodiment there would be a node for most possible waves the network might encounter in its spectrum in a localized area, as is explained in the description of a locus.

So, in FIG. 22, the previously seen following wave, component or similar wave, triggers, causes resonance, at the network node or nodes at (53) and so causes radiation of their full or approximated, previously recorded waves as will be seen in the next figure.

FIG. 23

FIG. 23 is an overhead, magnified, simplified process, including time reversal or wave time reversal on a network, continued. This is the next step after FIG. 22. In FIG. 23 we see two additional radiating locations (55, 57) above and below the radiating node (middle) (53). The three nodes lined up vertically in the center (55, 53, 57) are all radiating their recordings of preceding waves (142, 144) they received from source locations (42) and (44) seen in FIG. 21. These nodes were not shown in FIG. 21 for clarity, but would have undergone situations similar to that explained for node (53). FIG. 23 shows these three radiating points down the midline of the fig. causing focusing on original sources (42, 44) from FIG. 21, which are at either side, causing them to radiate.

Wave time reversal, time reversal, reflections, triangulation, refraction (80) with constructive interference/cooperative waves (46) are focusing at the original sources at either side, recreating the original waves, or waves similar to the original waves from FIG. 21. These recreated waves were created by recordings and may not be exact copies in some embodiments.

Only 3 nodes are shown radiating or playing in this fig. for clarity but there may be many more in some embodiments. These additional areas of constructive interference/cooperative waves (not shown) would occur at other nodes, and with the intrinsic wave spectrum, if added, in some embodiments. The number of activated nodes would be limited by lateral inhibition and similar mechanisms as described earlier. In some embodiments less active nodes or loci would mean the mechanism would use a lower resolution but need less processing. For example, a pixelated picture with less active pixels, although still recognizable.

Wave time reversal or time reversal and constructive interference/cooperative waves occur at the original input source locations (42) and (44). This is seen at the far left and right. These original source locations experience their original preceding waves (142, 144) once again as can be seen in the figure at the areas of constructive interference/cooperative waves (46 at the left and 46 at the right). The constructive interference/cooperative waves at (42, 44) cause the original source locations (42, 44) to now radiate their original preceding waves (142) and (144) at (42, 44). The waves from recording, radiating, and recreating may not be identical due to lower wave resolution by design to reduce processing in some embodiments, or due to choosing different wave characteristics, different numbers of reflective items, different numbers of nodes, in different embodiments.

By employing wave time reversal, time reversal, reflections, triangulation, refraction (80) some embodiments can localize the original radiating source node locations in one or more dimensions, wherever they may be, and cause them to radiate their original waves. In one dimensional embodiments a linear network could exist with multiple external, virtual reflective items or calculated virtual nodes.

Multiple reflective obstructions, imperfections or discontinuities in the paths of the waves to their intended final locations aid the locating mechanism. The waves reflect off of these obstructions, each reflection acting as a triangulating, locating mechanism.

This completes the association between the two waves as both original preceding waves (142, 144) radiate (as seen in fig. previously but not shown in this FIG. 23). These two recreated pixels would be two of many more required to recreate an image, sound, or other data in some embodiments.

The described mechanism would be multiplied across the network areas, and in some embodiments there would be enough nodes and recorded wave sequences involved to create recognizable images and image sequences, sound sequences, data sequences, and wave controlled actuator motion sequences by employing sequential waves and wave recordings. In this way a sensory input could cause a corresponding learned memory association or physical response in some embodiments. Sequences would create moving images, sounds, motions and other phenomena in some embodiments.

FIG. 24

Figure 24:
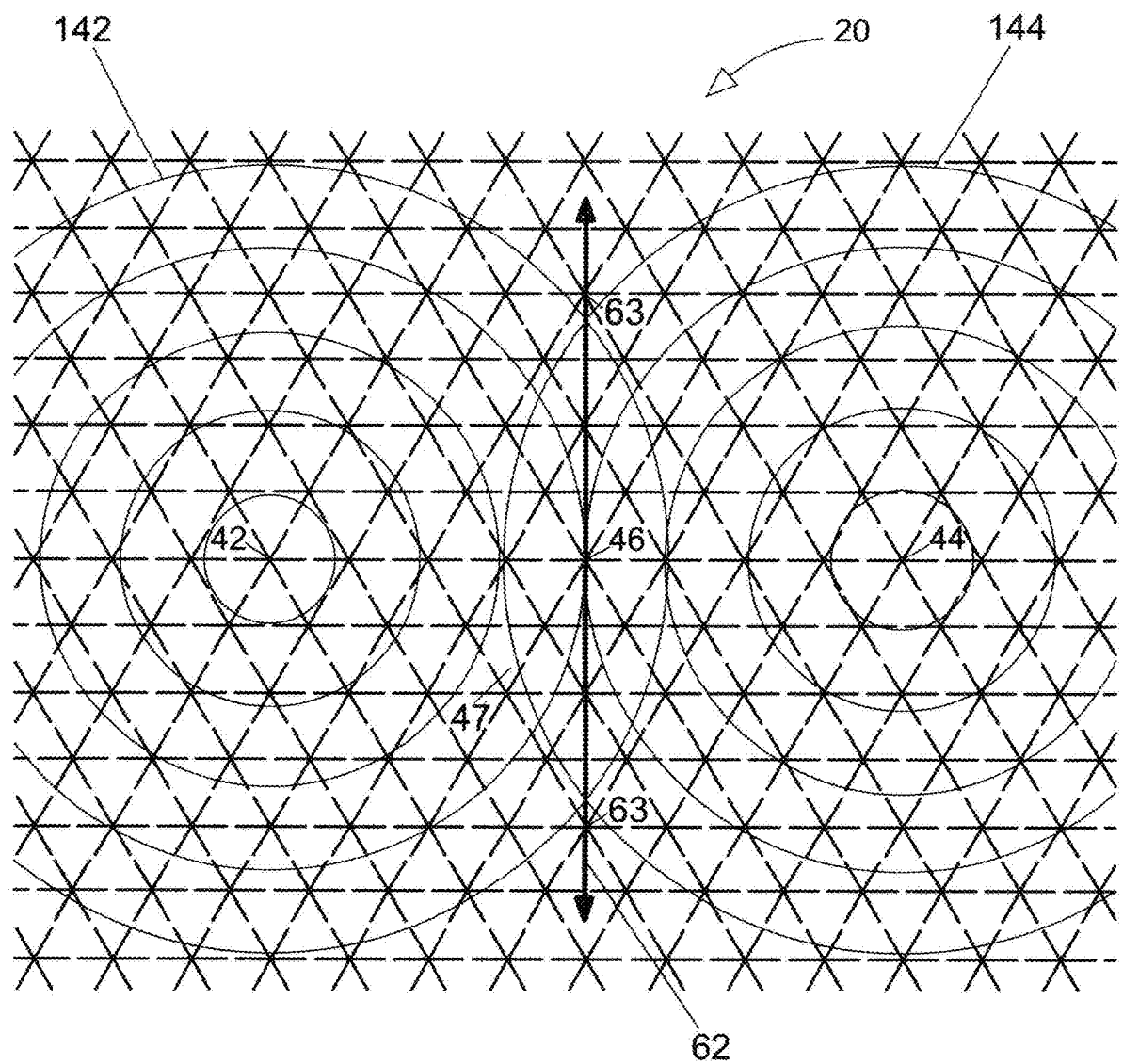
FIG. 24 Overhead view of an embodiment shown on FIG. 24 through 26.
Figure 25:
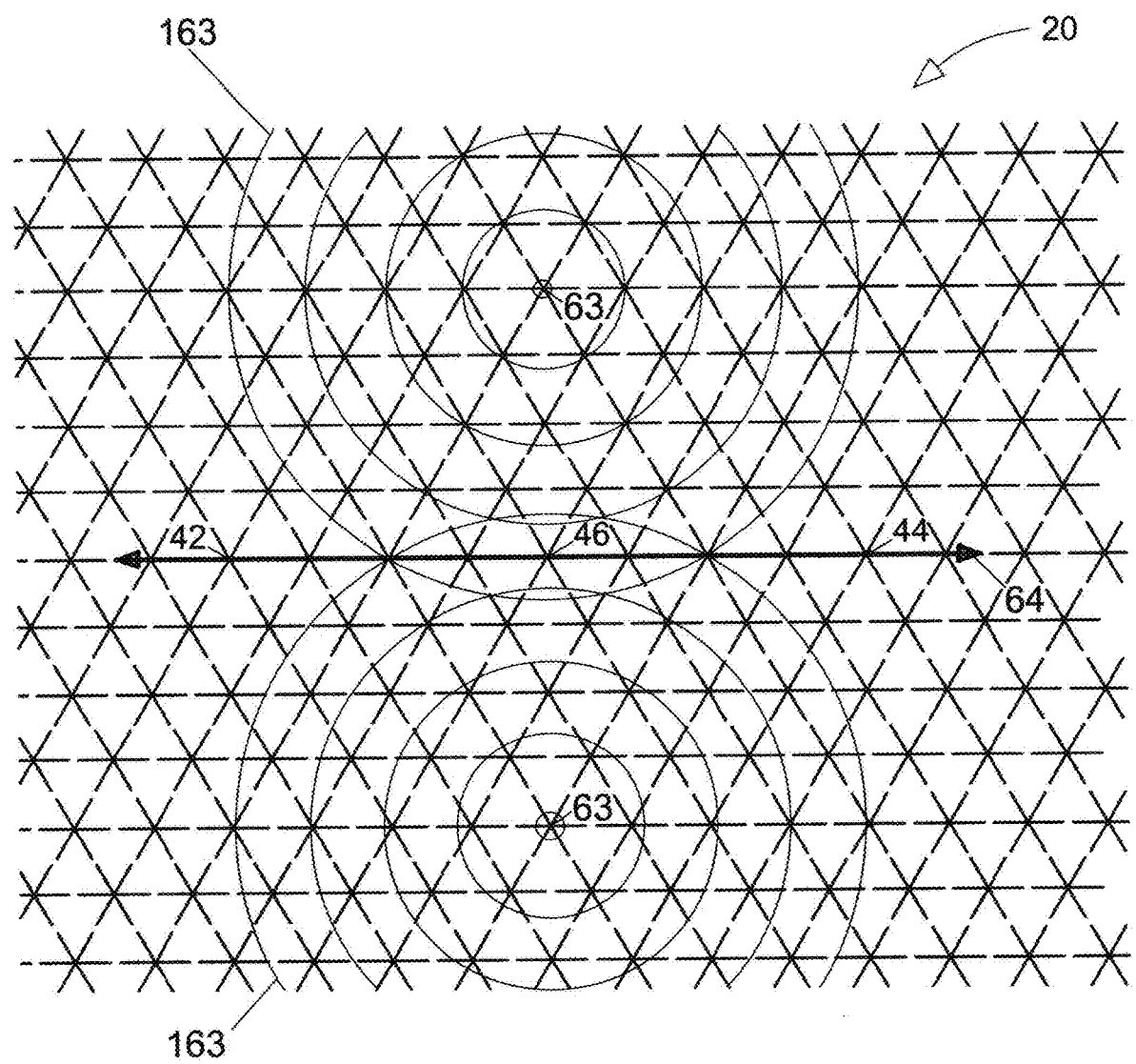
FIG. 25 Overhead view of an embodiment shown on FIG. 24 through 26.
Figure 26:
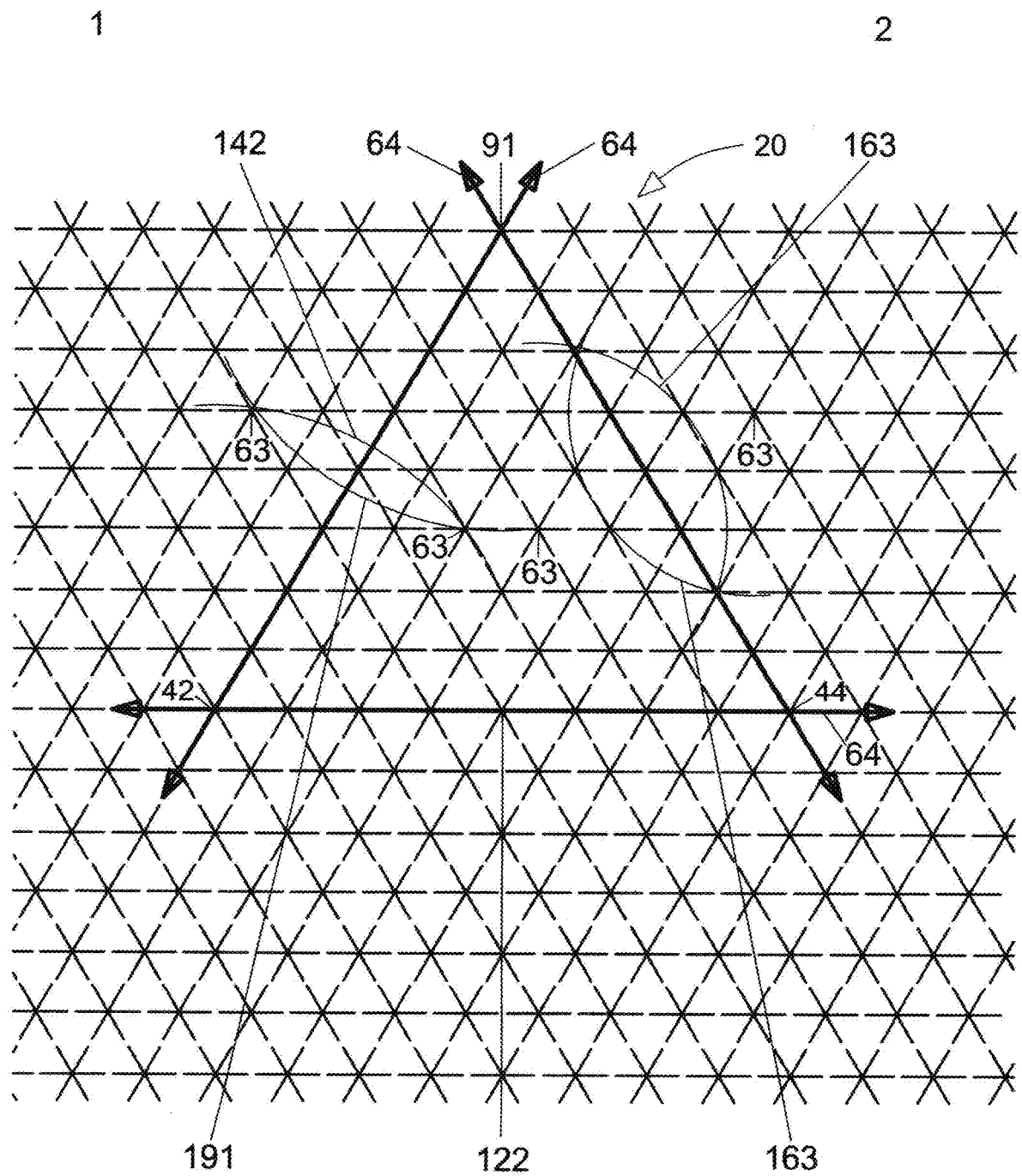
FIG. 26 Overhead view of an embodiment shown on FIG. 24 through 26.

Triangulation of Association Sources (FIG. 24-26)

FIG. 24 is an overhead, magnified, simplified section of a network involving recording of waves, association and memory creation. It is part of a sequence shown on FIG. 24 through 26 that includes triangulation of original sources with lines. This figure shows the creation of a memory by recording of waves at three points along a vertical line 2225 in an embodiment. Lines formed later in this sequence will eventually lead to recall of the recorded waves at their original locations, or memory.

These FIG. 24 through 26 show how some embodiments can calculate original source locations by triangulation with lines created by the interaction of waves. Some embodiments may use calculation and triangulation rather than wave interaction.

Additional points, secondary nodes (63) created by the mechanisms described, participate in finding the original sources, and recalling or recreating the original waves there in some embodiments.

Recording of the preceding waves (142,144) from locations (42,44) takes place at the middle (46) and upper (63) and lower (63) nodes or loci. Other recording locations are omitted for clarity.

We see the two sources radiating (42,44), creating a lengthening line of primary constructive interference/cooperative waves (62) between them. As the waves move out, the lines lengthen. These lines of constructive interference/cooperative waves consist of nodes or loci that have a raised wave mid-level and they can be over-threshold due to constructive interference/cooperative waves (62) as the waves radiate outward and interact. As mentioned, lateral inhibition, and other mentioned mechanisms inhibit some of the nodes or loci along the line in some embodiments, so that not all of them activate.

The preceding waves (142, 144) may be from sensory inputs or previously recorded associations in some embodiments. These are radiating and causing lengthening lines of primary constructive interference/cooperative waves (62) as the preceding waves (142, 144) expand. In some embodiments the waves may expand in different numbers of dimensions than those represented here. The first point of constructive interference/cooperative waves occurs when the two waves (142, 144) meet in the center (46). Because these are the first points to interact in the sequence of initial input to the network for the creation of a memory and later recall, their line is called primary.

Points (46) and both (63,63) record the preceding waves. The nodes or loci between (46) and (63) are inhibited due to the previously mentioned lateral inhibition. This lateral inhibition fatigues or fades in strength in the manner described earlier with time and distance in some embodiments. There may be a larger or smaller radius of lateral inhibition in different embodiments and situations.

The waves and their lengthening lines of constructive interference/cooperative waves raise the node or loci wave mid-levels once past the areas of lateral inhibition at both (63). Due to the reduced inhibition the upper secondary node (63) and the lower secondary node (63) activate. This secondary activation then inhibits surrounding areas from firing around them, however, sub threshold waves are still transmitted in some embodiments.

Destructive interference/destructive wave cooperation (47) or other wave interactions can be used to predict, infer or calculate the locations of wave phenomena such as constructive interference/cooperative waves in some embodiments.

FIG. 25

Triangulation and Recall

FIG. 25 is an overhead, magnified, simplified section of a network shown on FIG. 24 through 26. This fig. takes place later, and is showing the first stages of recall or the start of recall. This takes place after a following, or trigger wave occurs (as shown on other fig.), the wave has been recognized, and has started the recall process. The nodes or loci (46) and both (63,63) have recognized the trigger or following waves and are radiating. For clarity the middle wave of (46) is not shown but would be present in some embodiments. This radiating of previous recordings will lead to localizing the original sources, and cause them to recall or recreate the waves they played in the previous FIG. 24.

A horizontal lengthening line of constructive interference/ cooperative waves is created as the triggered nodes or loci (46,63,63) radiate due to the recognition of the following or trigger wave (not shown).

The interaction of the waves (163, 163) from these two points (63, 63) creates a lengthening line of secondary constructive interference/cooperative waves (64). This line locates the original sources (42,44) of the waves (142,144) from FIG. 24 along one horizontal line.

FIG. 26

Triangulation (Continued)

FIG. 26 is an overhead, magnified, simplified section of the network shown on FIG. 24 through 26. This fig. shows triangulation with some of the effects of an additional source (91) on both memory formation on the left, and memory recall shown on the right. The added wave source (91) is at the top middle. The wave characteristics and geometric variables for triangulation may be different than shown here in this simplified example. Also, embodiments may have one or more additional sources due to other waves on the network. Waves are simplified to only one crest for clarity in this figure.

Recording (Left Side of FIG.)

This figure has a left half labeled one at the top left and a right half labeled with a two at the top right. The left half labeled with a one shows the earlier stage of association, recording, or memory creation when you include a third wave source (91), and its wave (191). This wave interacts with wave (142) from source (42) on the left.

The right half of the fig. labeled two shows a later stage of memory recall with the third source (91) included and triangulation. Locations on the right (63, 63) are seen radiating only partial wave crests again for clarity.

So the left side of the fig. shows the points labeled (63,63) recording due to waves (191,142). The right side of the figure shows the points labeled as (63,63) radiating creating a line, and helping to triangulate the original sources from FIG. 24 (44), and when applied to both sides, also source (42). Although the description of the fig. includes left and right in actual practice this would not be the case, and the sequence and locations would vary from those depicted in this simplified fig.

The left side of this figure, that is the left side of the triangle shown, is occurring at the same time as the recording from FIG. 24. As mentioned, this FIG. 26 adds the wave source at the top center source (91). When wave (191) from this third source (91) undergoes constructive interference/ cooperative waves with the other waves such as source input waves from FIG. 24 (142, 144) from sources (42) and (44) by the mechanisms described they create recordings at nodes or loci (63,63) like on the left of FIG. 26. The wave's central recording point between (63) and (63) is omitted for clarity.

In this way the wave environment, as waves from source (91) and source (42) interact, is recorded at the points labelled as (63,63). This recording would also occur on the right side in the same way between source (91) and source (44) as can be seen by the nodes or loci (63,63) on the right of the fig. Other waves in the network environment at these points would also be recorded in some embodiments.

Recognition and Radiation (Right Side of FIG.)

On the right of the fig. we see a later stage that occurs when a trigger or following wave is recognized and causes radiation of the points (63,63). A lengthening line of secondary constructive interference/cooperative waves (64) is created. This line is shown on the right helping to locate sources (44) and (91). Again, this same process after recognition would also occur on the left side of the diagram locating sources (42,91), and this line (64) is also shown on the left. Not all of the lengthening lines due to waves interacting are shown for clarity.

After recognition, the multiple locations create their lengthening lines of secondary constructive interference/ cooperative waves (64) via radiation of waves (163,163) from nodes or points labelled secondary node (63, 63) and triangulate the original source locations (42,44) and (91).

This is done by creating an area of overlap or focusing between the lines at the original sources with further constructive interference/cooperative waves. This effect creates additional stimulation of the original first and second input source locations (42) and (44) along with the third source (91), raising their wave mid-levels relative to the surrounding area, increasing the possibility of, creating, or adding to, an over-threshold condition at the source locations (42,44) and (91). As described before, these points would then radiate the original recordings from their original locations in some embodiments.

Some embodiments may record and radiate simplified recordings, which may be a lower resolution or lower sampling rate for example to reduce processing burden.

The points or secondary nodes (63, 63) which recorded the waves can recognize similar waves in the future and radiate, thus causing triangulation via constructive interference/cooperative waves to stimulate the original source locations to radiate by exceeding their thresholds with their original waves. The expanding lines of constructive interference/cooperative waves effect can also lead to the activation of other more distant areas on the network.

Wave time reversal, time reversal, triangulation, and reflections due to reflective nodes, irregularities in the network or edges can all re-stimulate or help stimulate the original sources with their original corresponding waves in some embodiments. As mentioned before, any of these may be used in virtual, simulations, or software embodiments as well.

Line Detection

Due to the large number of sub-threshold lines, and their various orientations on the network certain effects may occur, especially in the visual areas of the network. These lines in the visual area of the network can create lines of higher activation or higher wave mid-levels. These are closer to the thresholds for recording. These sub-threshold lines on the network may match the position and orientation of lines in visual images. This makes the lines, edges and their orientations in visual images more likely to be recorded, as they are closer to the thresholds. This may aid in line and edge detection in visual images in some embodiments.

FIG. 27

Language, Harmonics and Global Reset Wave

Figure 27:
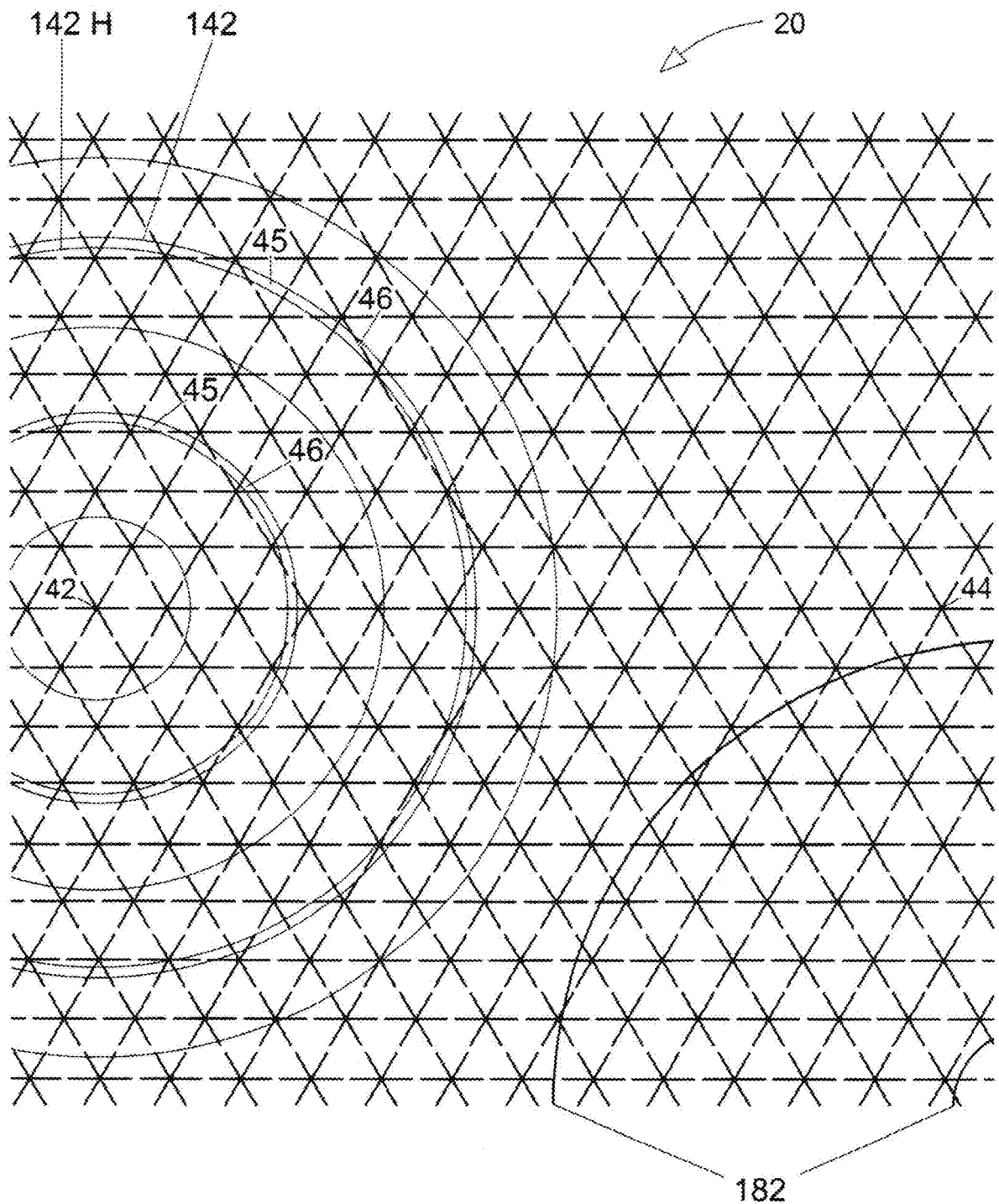
FIG. 27 Overhead view of an embodiment.

FIG. 27 is an overhead, magnified view of part of a network. On the left this shows two harmonizing waves with harmonious integer frequency ratios and constructive interference/cooperative waves. A global reset wave is also shown at bottom right.

Human speech utilizes harmonious integer frequency ratio waves. These harmonious waves are favored for recording and radiating on the network due to their greater likelihood of exceeding the threshold due to their constructive interference/cooperative waves.

This fig. shows a wave source (42) and two waves radiating from it, which are wave 2385 (142) and harmonious integer wave (142H). One of these waves is two times the frequency of the other.

Double lines represent the constructive interference/cooperative waves (46). We see the double lines representing the harmonious integer ratio waves (45) at every other wave line. This constructive interference/cooperative waves (46) causes the harmonizing waves (142, 142H) to be over-threshold or closer to over-threshold than the singular waves, or non-harmonic or out of phase waves. In this way harmonic integer ratio waves are more likely to activate, be recorded or play than non-harmonic waves. This creates a preferential recording, recognizing, and playing of harmonic integer ratio waves (45, 46).

Languages are made up of harmonically interrelated phonemes. Therefore the network's sound wave input allows for the preferential recording, association, and thus learning of languages over random environmental sounds.

This harmonic interaction and constructive interference/cooperative waves (45, 46) at the nodes can also stimulate and trigger other network features—features such as 2400 increasing the likelihood of recognition and playback, or the production of intrinsic wave spectrum for learning the constructive interference/cooperative waves prioritized harmonious integer ratio waves (45, 46).

Global Reset Wave

Also seen on this figure is a periodic global reset wave on the bottom right, which radiates across the network at a selected frequency clearing away lower amplitude wave sources, and leaving only the more persistent, stronger higher amplitude wave sources.

As the frequency of this wave increases more and more weak stimuli are removed leaving only the strongest. This is similar to attention or focus on the strongest waves as they are the only ones left on the network in some embodiments. As the frequency of this wave is reduced more and more associations can be made as weaker stimuli are present for a longer time. This would be similar to low activity or resting phase.

Periodic global reset waves (182) may pass over the network, and these waves may cause inhibition of the nodes or loci they pass over in some embodiments. These waves would move the nodes or loci they pass over away from activation, that is below, or further below, the threshold to a lower, reduced default wave mid-level position as seen in FIG. 16 (145). When this inhibitory wave passes, it causes the weaker stimuli in the network to be reduced, leaving only the strongest after it has passed. The strongest, most recent stimuli are re-established in the network very soon after the inhibitory wave has passed. Lateral inhibition and retinal processing further amplify this effect. Remote associations and weak stimuli take more time to re-establish themselves, whether due to summation or various other stimuli.

The parameters of the inhibitory wave may be adjustable in some embodiments. In some cases the frequency of the inhibitory wave would be increased in proportion to the amount of stimulation of the network, such as more areas of stimulation or stronger stimuli. This may be by the percentage of activated nodes or loci in the network. The stimuli may be from external sensors, internal sensors, or network associations.

With a higher frequency more filtering occurs, removing weaker stimuli more often, thus greater selection for stronger stimuli occurs. With a lower frequency inhibitory wave, more time for associations is permitted, and there can be more associations.

In some embodiments the global reset wave may activate most or all of the nodes or loci as it passes over them thus resetting them until they are re-stimulated. The stronger, more persistent waves would re-establish themselves more quickly and inhibit the weaker waves.

The global reset wave allows for focusing of the network on stronger stimuli, and stimuli with more associations. The higher the frequency of the periodic global reset wave the more the network focusses on the stronger stimuli, and the less time there is for weaker or distant associations. The lower the frequency of the periodic global reset wave the more time there is between inhibitory events for more associations, weak associations, and more remote associations.

Some embodiments may use harmonic integer ratio wave (45, 46) interaction or also wave beats to cause an increase in the periodic global reset wave frequency. This constructive interference/cooperative waves (46) would cause over-threshold conditions which would send signals down the node or locus extensions previously mentioned to increase the periodic global reset wave frequency. Recalled or recreated associations may do this as well in some embodiments.

FIG. 28

Figure 28:
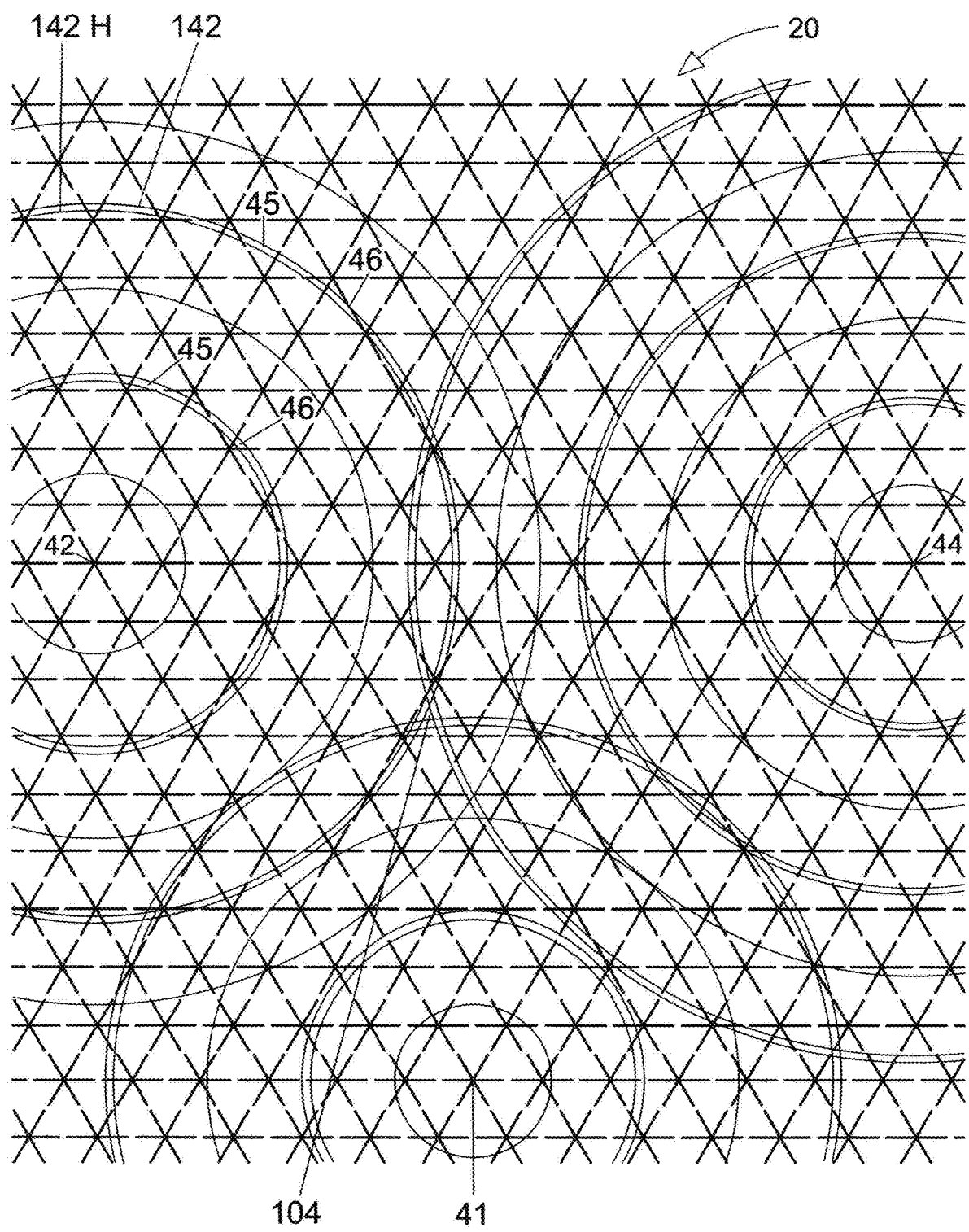
FIG. 28 Overhead view of an embodiment.

FIG. 28 is an overhead, magnified view of part of a network showing the same mid left harmonic waves of FIG. 27 emitted from three different sensory locations now with a triangulated area of central constructive interference/cooperative waves.

These same waves of FIG. 27 (142,142 H) are emitted from three different sensory locations, wave sources (42), (44) and (41). These three wave sources are radiating the same waves and can be auditory sensory inputs in this case. The central area is the zone that is the shortest distance from each or all three of the sources, and in embodiments with decreasing wave amplitude with distance, would be the area of constructive interference/cooperative waves and recording or playing in this example.

Due to harmonious integer ratios (45) and the effects of constructive interference/cooperative waves (46) the central area which may have the largest central constructive interference/cooperative waves (104) is triangulated in some embodiments. This can trigger recording of the waves by the nodes or loci in this area for example, by exceeding their thresholds in this embodiment. The harmonically interacting waves in the central constructive interference/cooperative waves (104) area create a much larger amplitude than non-harmonizing waves, and so would be preferentially recorded, and in some cases recognized or played.

FIG. 29

Figure 29:
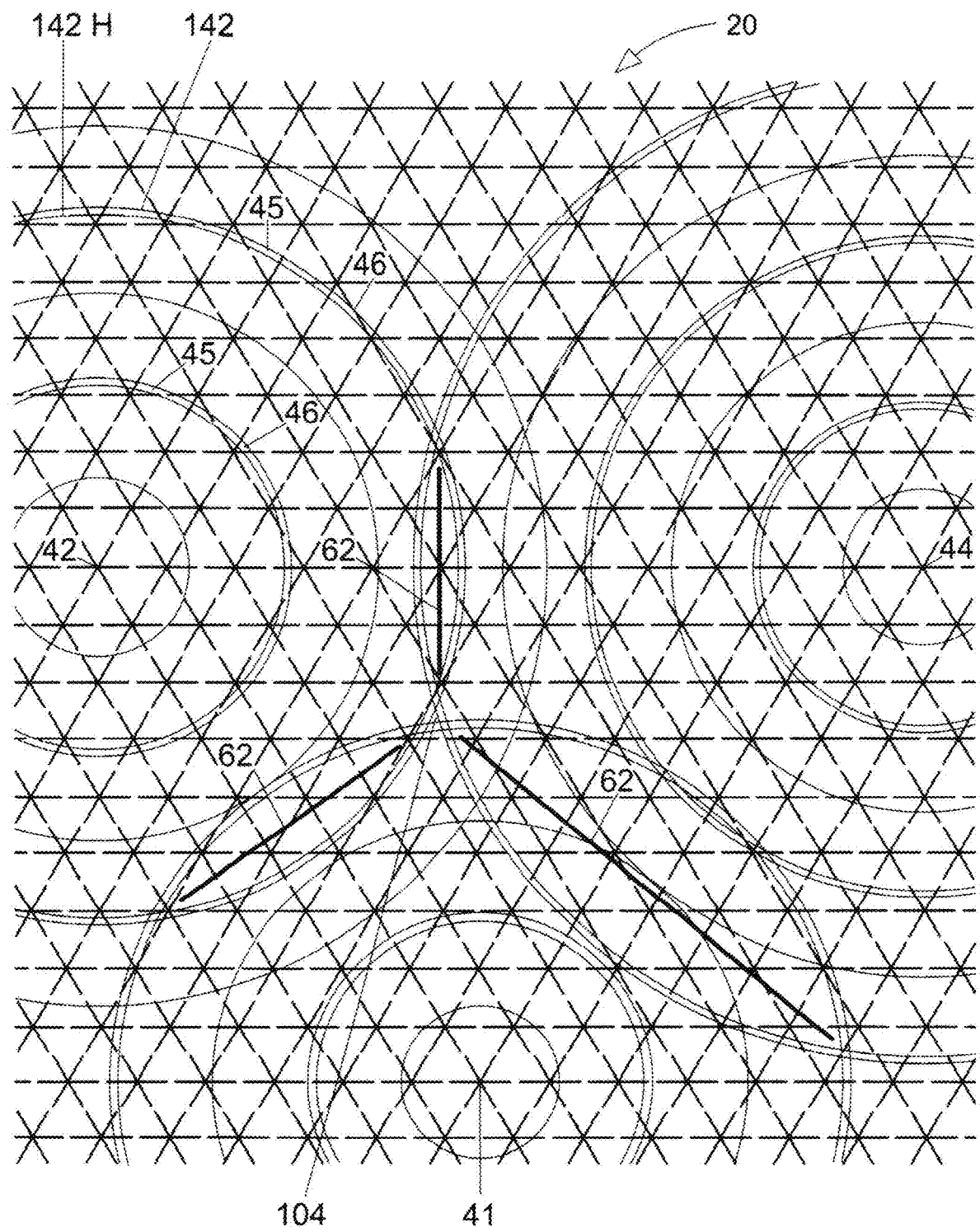
FIG. 29 Overhead view of an embodiment.

FIG. 29 is an overhead, magnified view of part of network from FIGS. 27 and 28. This FIG. 29 shows dark lengthening lines of primary constructive interference/cooperative waves (62) triangulating the area of stronger than normal central constructive interference/cooperative waves due to constructive interference/cooperative waves and harmonization.

The lengthening lines of constructive interference/cooperative waves that overlap at the intersection (104) induce the recording in these central nodes or loci due to the relative maximum constructive interference/cooperative waves occurring in this central area with selected gain/inhibition tunings in some embodiments.

FIG. 30

Figure 30:
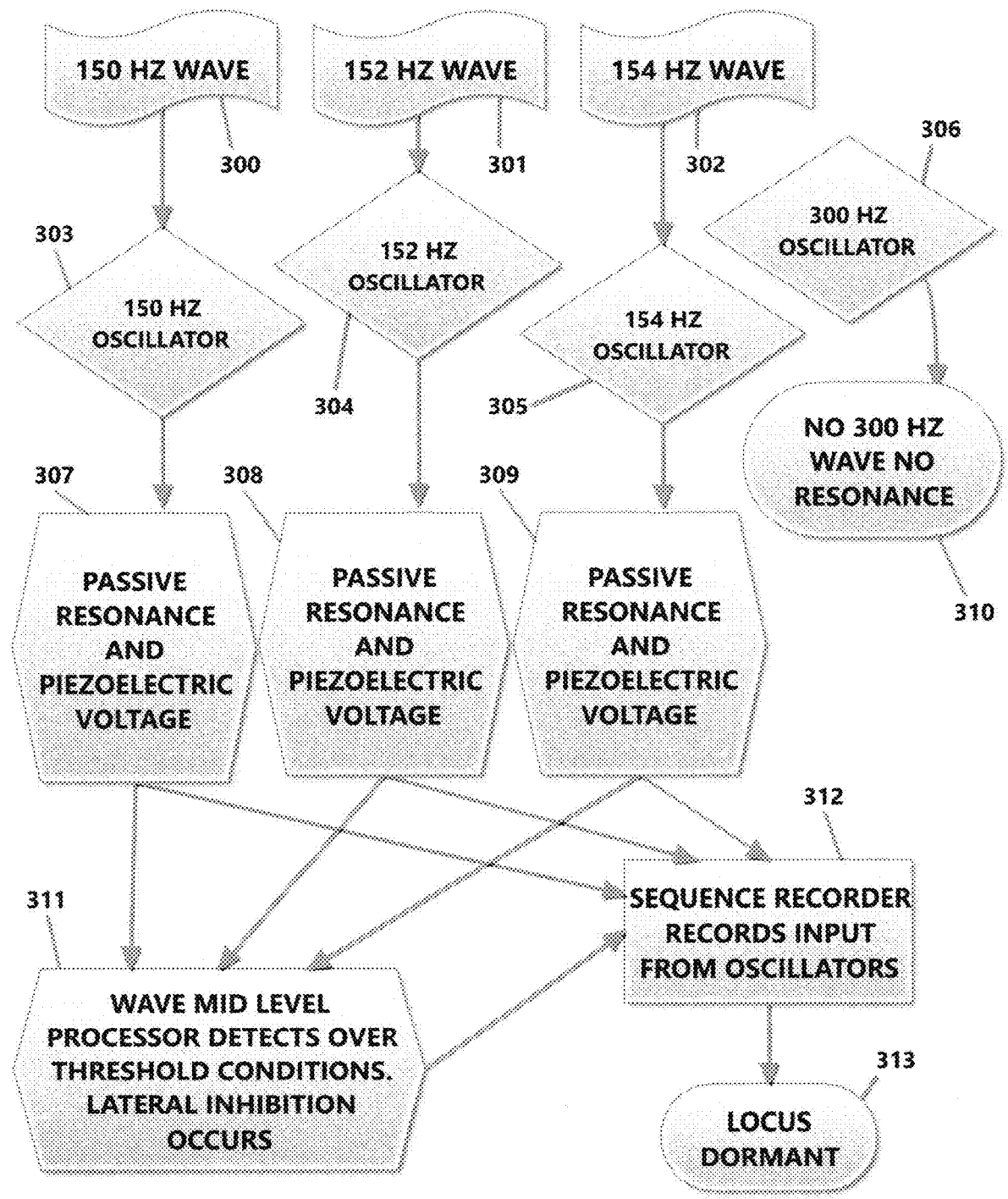
FIG. 30 Flowchart showing steps in one or more embodiments.

FIG. 30 is a flowchart showing some of the steps involved in associating and recording three waves in oscillating, resonating, software, and other embodiments. The geometric shapes in the flowcharts and diagrams here are chosen for clarity and function and do not necessarily correlate to other common uses.

At the top in this diagram we see three example waves of 150 Hz, 152 Hz, and 154 Hz. These waves are arriving at the nodes (boxes 303,304,305,306) as seen below them in the diagram. These are nodes within a locus such as those in the description seen in FIG. 12 and other figures.

As mentioned, these waves are simplified examples for clarity, and the wave characteristics may actually differ by many orders of magnitude from those illustrated in these figures in some embodiments. The wave types may also vary in different embodiments such as sound waves, light waves, software waves, simulated waves and other types mentioned. Different types of waves may be used together in some embodiments.

Association Area Example

Waves may enter the network from external sensors, such as body sensors for example connected to sensor areas of the network, and waves may come from within association areas and others in some embodiments. These waves from association areas may be recalled associations. Waves may also enter from other network's association areas in some embodiments.

The waves flow across the network and reach the loci of this example in the association area. In the loci (49) of this embodiment the waves encounter nodes tuned to different frequencies. In the figs. they are shown as oscillators but may contain or utilize the methods and mechanisms described elsewhere in this document including in the glossary, and the definition of recognition.

The loci would be modular in some embodiments and there would be one or more in the network, and a very large number in some. They would be placed so waves may pass through and between them as seen in previous fig. in some embodiments.

The 150 Hz wave at the top left of the fig. (box 300) causes a node's crystal oscillator (box 303) tuned to 150 Hz to resonate in some embodiments. Moving down in the fig., this resonance or vibration causes the piezoelectric crystal in one embodiment to emit a voltage (box 307). This voltage is sent down a connection to the wave mid-level processor (119) in (box 311) of this fig. This wave mid-level processor (box 311) determines the sub or over-threshold condition based on the voltage in this embodiment, and connects to the sequence recorder (118) in (box 312) as also seen in FIG. 14. The wave mid-level processor (box 311) also initiates lateral inhibition and other mentioned processes if it determines an over threshold condition in some embodiments. The first wave of 150 Hz is now analyzed for its amplitude, rise or attack, sustain, and decay and other characteristics in some embodiments such as wave type for example. This is recorded by the sequence recorder (118) (box 312) if the condition is over threshold. The same occurs for the other waves, including their timing relative to one another and sequence in some embodiments. Once incoming waves become sub-threshold or the node finishes recording the node or locus goes dormant (box 313) as described previously in some embodiments.

Sub-threshold waves are transmitted across the network, they can interact and add to other waves, and become over-threshold in some embodiments. As stated before, many of the processes here would be contained in a wave processor in some embodiments.

Motor Area and Sensory Area Example

If the above described locus or node is in the motor area, instead of the association area, for example, motor area posterior body/proximal limb (92), and the wave arrives sub-threshold it may cause the frequency specific node to resonate sub-threshold. This sub-threshold wave will not be transmitted out of the network to the connected motor actuators in some embodiments. Motor areas use a threshold that prevents unwanted wave transmission to the actuators. Motor areas require time reversal focused or wave time reversal focused, constructively interfering/cooperating waves to exceed the threshold and transmit the waves down to the motor actuators. The motor areas do not record waves in some embodiments. In some embodiments there may be a delegated or secondary network for the motor area to connect to before reaching the actuators.

These motor area comments apply to the sensory area also in that the nodes or loci do not create or radiate sensory images, sounds and other stimuli unless they receive over-threshold waves. These over-threshold conditions are due to time reversal, wave time reversal, constructively interfering/ cooperating waves or from sensors in some embodiments.

Association Area Example, Continued

Back at the top of FIG. 30: now the second wave is radiated across the network and arrives at this same locus. This 152 Hz wave now causes the node for 152 Hz to resonate its crystal, or other mentioned wave sensitive system in the locus, again creating a voltage. The sequence recorder now marks this as the second wave of the sequence along with its characteristics such as the aforementioned amplitude, rise, sustain, and decay, and timing relative to other waves.

Now the third wave arrives at the locus (49) and causes the 154 Hz tuned circuit or crystal in the 154 Hz node to resonate. The 154 Hz node then emits a voltage, and the locus sequence recorder once again takes down the characteristics and this wave's temporal relationship with the previous two.

An example 300 Hz node oscillator that receives no 300 Hz wave, and does not resonate or oscillate, is included in the figure. As seen previously there are many possible 2565 node oscillators and frequencies.

The locus' (49) decision to record is made by the wave mid-level processor (119) and the sequence recorder (118) in this embodiment. If there is a sequence currently stored in the sequence recorder for that locus, there is no new recording made in some embodiments.

Sequence recordings fade with time at a selected rate which is three days in this embodiment, but can be adjusted to any length of time. The more repetitions of the same or similar wave stimulus the longer the sequence recording is held in the sequence recorder. Sequences may be kept permanently after enough repetitions, which may be 100 times in this embodiment, but may be any number of repetitions based on the amount of memory storage in the sequence recorder (118) and network.

In this embodiment the threshold is determined by the wave mid-level processor on a locus by locus basis, although it can be node by node or network wide average as well. This processor receives the voltages from the resonating nodes in the locus via the wave mid-level processor connector and compares the locus voltage to the average of the voltages from all the loci in the network or a selected area of the network in some embodiments. The threshold is adjusted so that: if this locus' voltage is over three times the network locus average, or selected area locus average, recording is enabled at that locus, and inhibited in the surrounding loci for a radial (or spherical) distance of 7-10 loci in one embodiment.

FIG. 31

Figure 31:
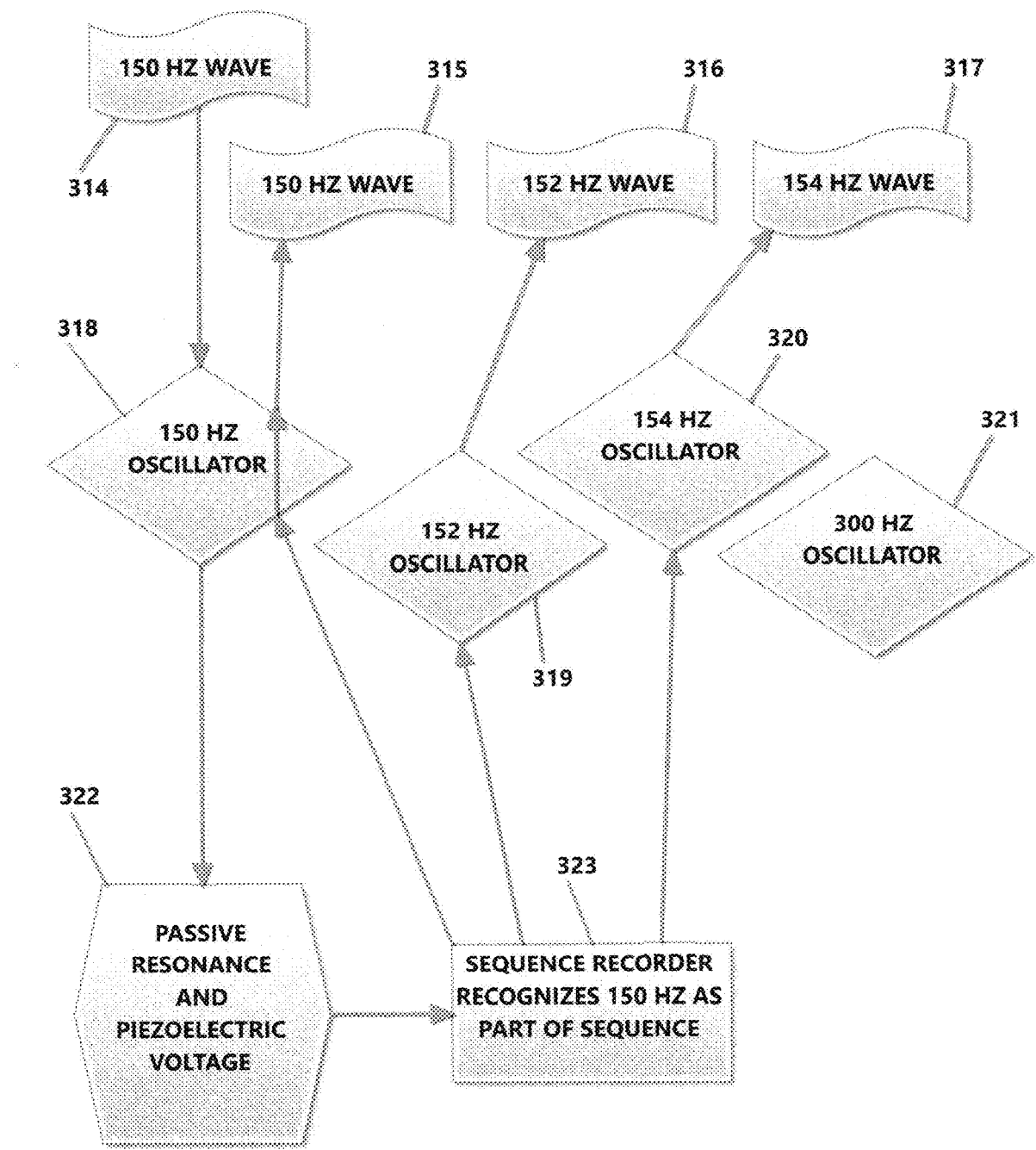
FIG. 31 Flowchart showing steps in one or more embodiments.

FIG. 31 is a flowchart that follows FIG. 30 and occurs at a later time. It shows some of the steps involved in recognizing and re-creating the three original source waves in oscillating, resonating, software, and other embodiments.

In this figure we see the reception of one following wave, or trigger wave, in the form of a 150 Hz wave (box 314) which is similar to, or a component of the 150 Hz wave of FIG. 30 (box 300). This wave causes resonance of the same 150 Hz oscillator of FIGS. 30 and 31 (box 303 and 318 are the same oscillators at different times). The sequence recorder receives the voltage input from the 150 Hz oscillator. It now looks for a previously recorded sequence with 150 Hz. It does find a recorded sequence containing a 150 Hz wave (box 323), and this causes signals from the sequence recorder microcontroller that induce oscillation at the 150 Hz, 152 Hz, and 154 Hz oscillators/nodes in the locus, in the recorded temporal order, with the recorded wave characteristics such as wave rise, sustain, and decay (box 318,319,320). In this way the full wave sequence is played or radiated at the locus (box 315,316,317). Other loci and nodes function in the same way in some embodiments.

In other words, the sequence recorder finds the 150 Hz wave or node in a sequence of waves or nodes that resonated and that it has recorded or stored. The sequence recorder now induces oscillation of the crystals or tuned circuits in the three oscillators with the wave and temporal sequence characteristics it recorded previously. These waves will now radiate to their original sources, focus there, and be recreated there, by time reversal, wave time reversal as described previously. The three wave sequence is now recreated and radiated from its original source or sources. In this way a part of a stimulus re-creates or recalls a whole stimulus or sequence of stimuli.

In some cases, more than one locus (49) may be needed to record more complex waves, although each locus has the capability to record any frequency in the network's spectrum in this embodiment. In some embodiments loci sequencing would also occur in the same manner as with node sequencing. Some embodiments would have far more loci and nodes than shown in the fig.

FIG. 32 A, 32 B

Figure 32:
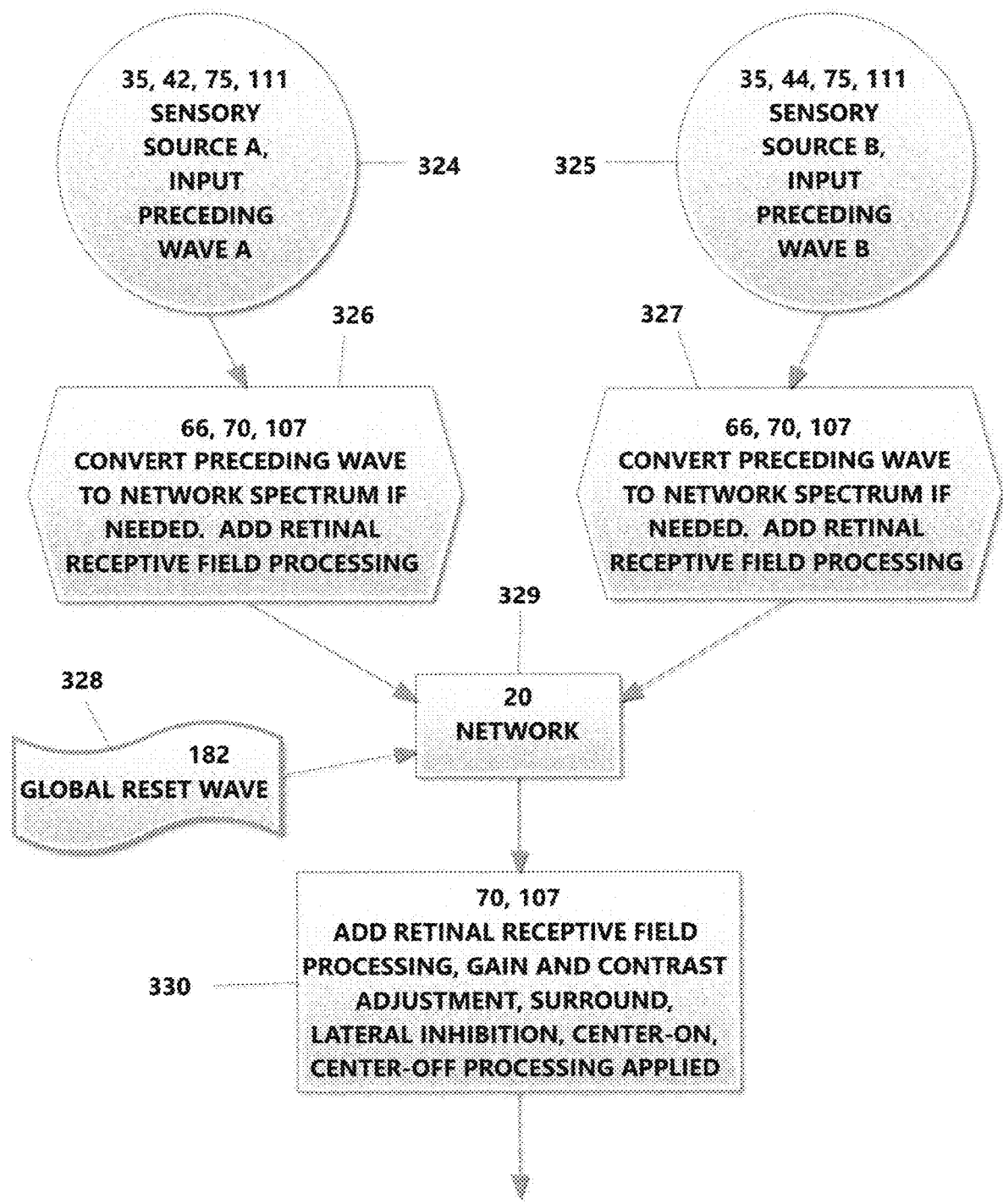
FIG. 32 A, 32 B Flowchart of steps in one or more embodiments.

The next four FIGS. 32 A, 32 B and 33 A, 33 B will diagram the overall steps involved in association and recall in some embodiments, for example, software. The numbers inside the boxes (or geometric shapes) refer to relevant reference numbers. FIG. 32 A and B show a two page flowchart or block diagram of the association process from two or more sensory inputs (circles 324,325) to the recording of the waves at multiple locations (box 331) and dormancy (oval 332).

This fig. includes wave input pre-processing (box 326, 327) before input of waves to the network which may be used in some embodiments to simplify the input. In box 330 at the bottom of the page, we see further simplification processes after the waves are on the network. As mentioned before this wave processing greatly simplifies the wave environment on the network.

As described previously, a global reset wave (182) is seen at the left (box 328). Again, this global reset wave focuses network attention on the strongest inputs by lowering the wave mid-level or resetting the local network area as the wave passes. In this way the strongest, most persistent, current stimuli will recur soon after the wave crest passes in some embodiments. As the global reset wave passes all nodes and loci are reset to the network average wave mid-level in some embodiments. The slower this wave the more time for associations to occur including weaker ones. The faster the wave the more focus is on the strongest stimuli and the less time there is for associations, so mainly the strongest will have an effect.

The global reset wave is a repeating wave, or continuous moving wave with an adjustable frequency in some embodiments. The wave moves across the whole network in some embodiments. The frequency of the wave is determined by the activity level of the network based on number of active nodes or loci and their current amplitudes. The more network activity the faster the wave repeats, and the higher its frequency. This global reset wave frequency can be, in one example embodiment, one Hz during typical network resting state and six Hz at a high level network activity. High level activity would mean over 50 percent of normal number of nodes firing in a selected, standardized environment, but may vary in different embodiments. One standardized average environment could be a specific quiet office room. An example standardized high activity level environment could be a specific simulated large city street.

In box 331 we see constructive interference/cooperative waves causing the threshold to be exceeded and recording to occur utilizing some of the previously described mechanisms. Not all possible mechanisms are shown due to space limitations in the diagram.

In oval 332 we see the dormant period occur after the node or locus activation as described previously. With time the recordings made by the nodes or loci will be deleted at a selected rate. Repetition of the same or similar stimuli causes the recordings to remain for a longer selected period as described previously.

FIG. 33 A, 33 B

Figure 33:
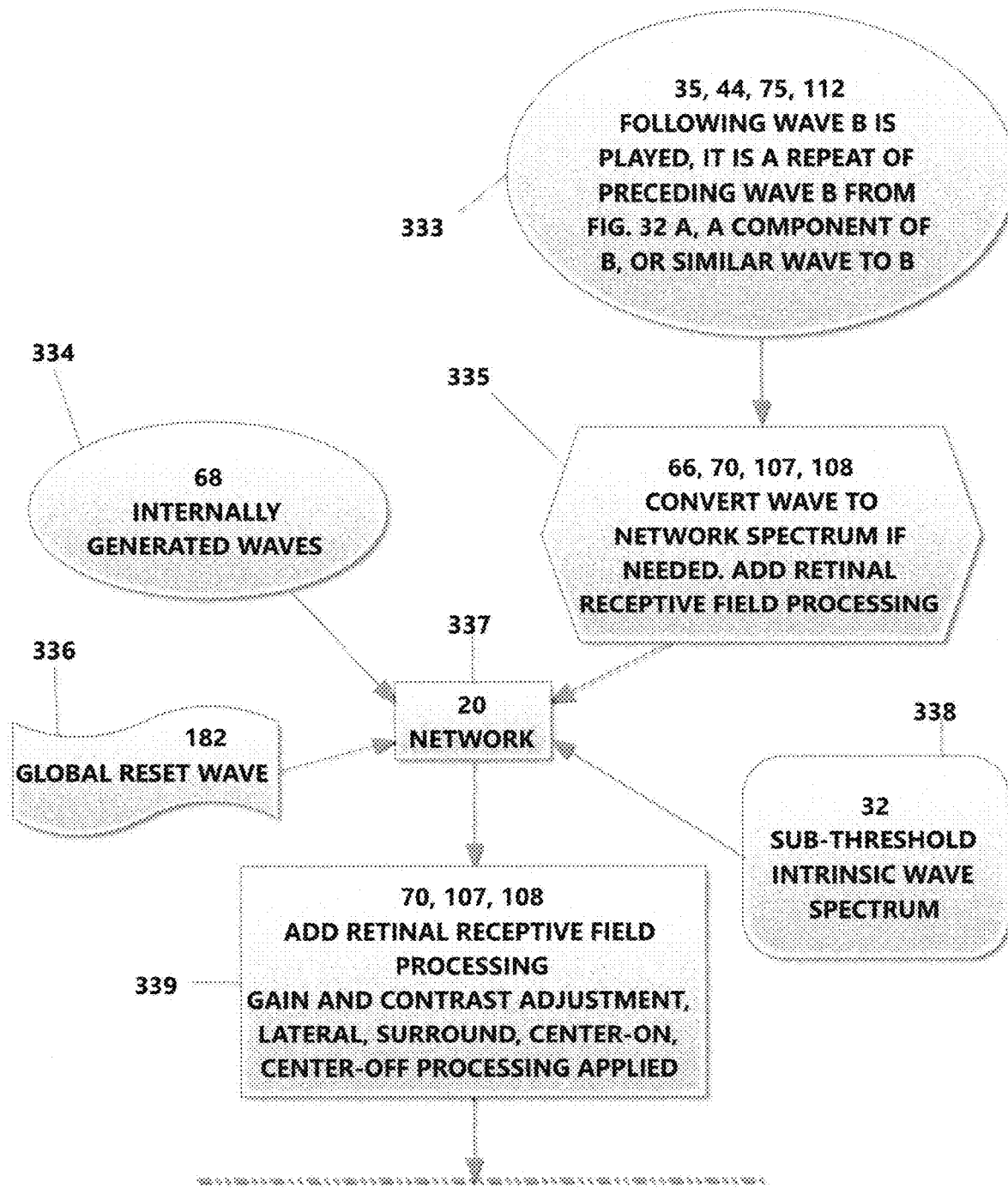
FIG. 33 A, 33 B Flowchart of steps in one or more embodiments.
Figure 33:
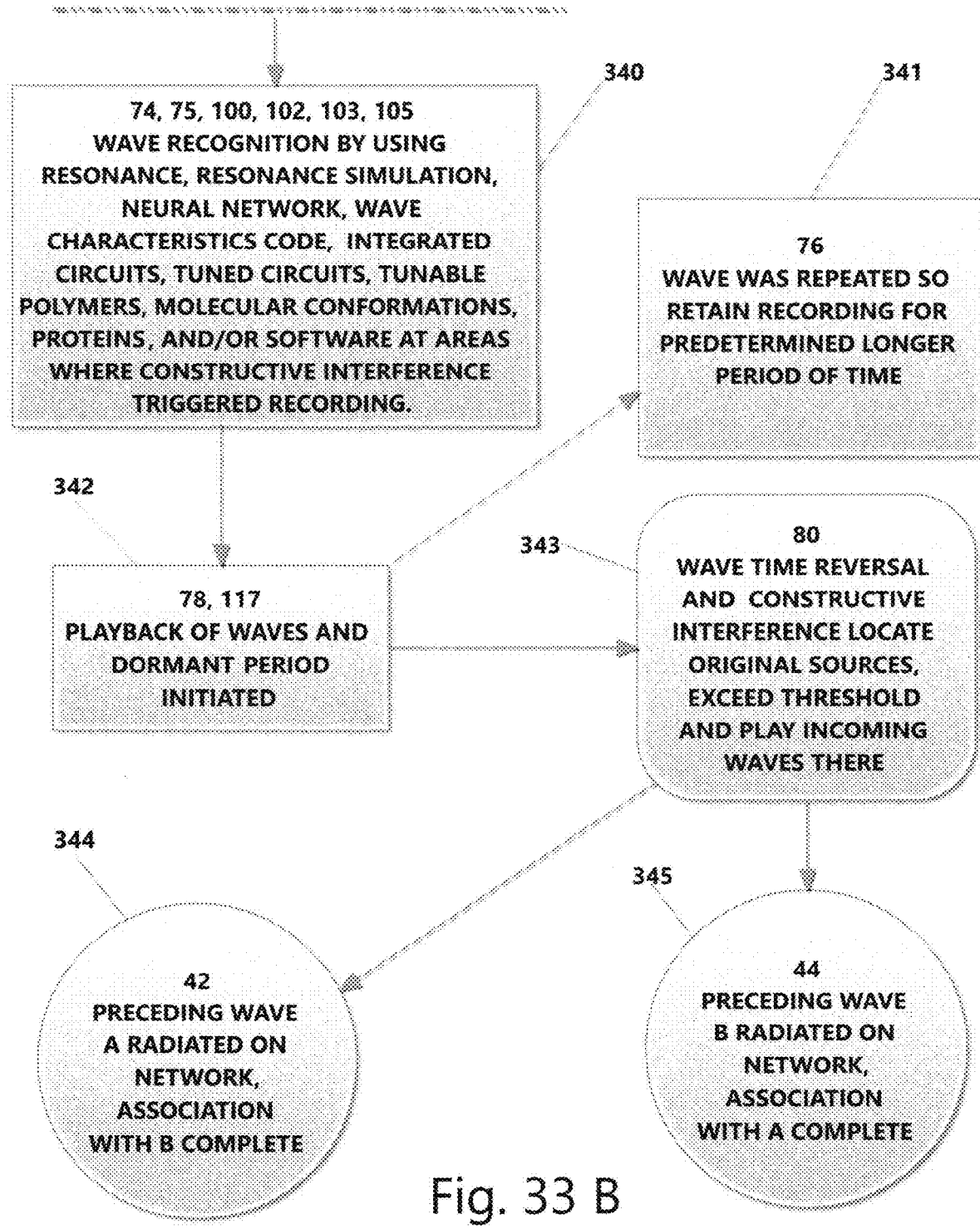

FIGS. 33 A and 33 B are a flowchart of steps including wave recall and association, in a two wave example for some embodiments. This is a flowchart of a later situation than FIGS. 32 A and 32 B. Now the process is starting from one new following, trigger wave stimulus (oval 333) at the top right. The process continues as described previously to the recreation of the two original associated preceding waves from their original sources as seen at the top in FIG. 32 A (box 324 and 325), only now recreated in FIG. 33 B at the bottom (box 344 and 345). These waves are labeled preceding waves A, B to show that they match FIG. 32 A top circles. The match may be simplified, similar, or not be exact in some embodiments.

FIG. 34 A, 34 B

Figure 34:
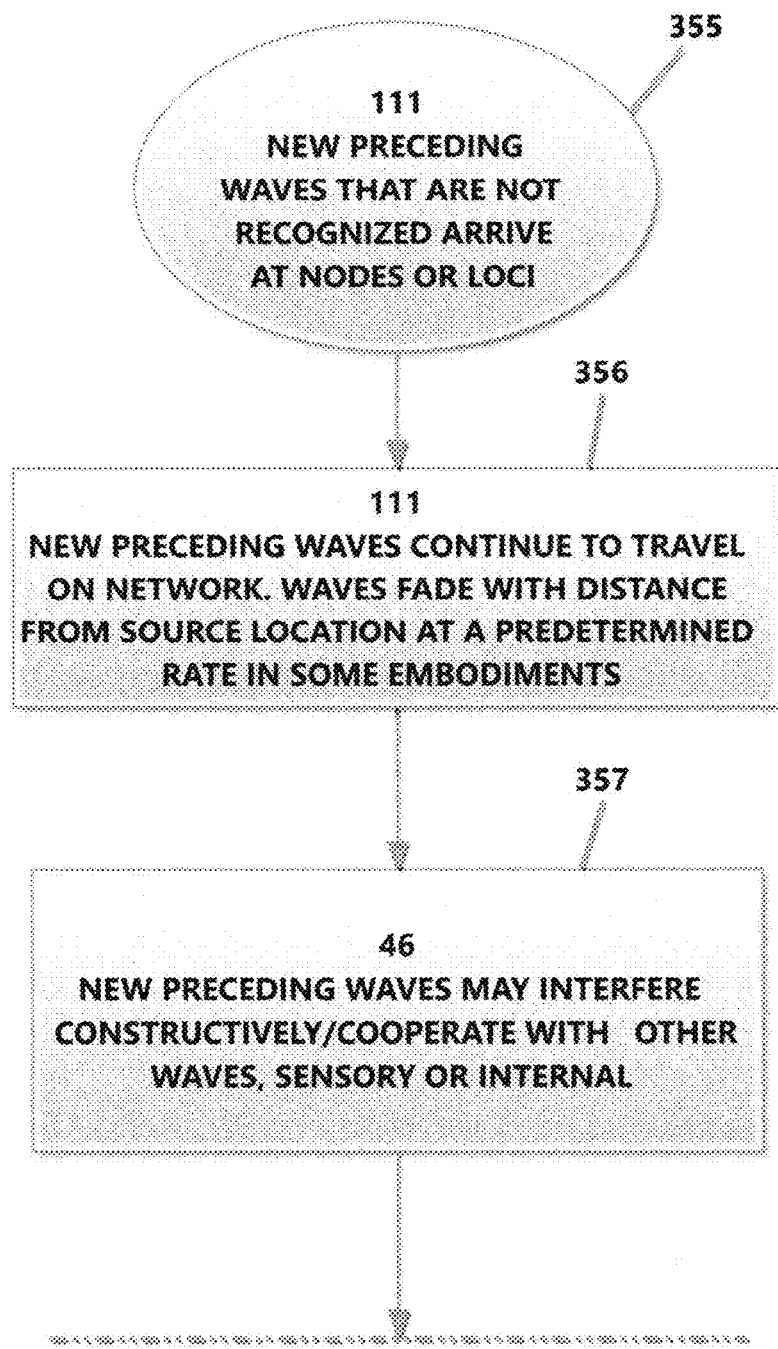
FIG. 34 A, 34 B Flowchart showing steps in one or more embodiments.
Figure 34:
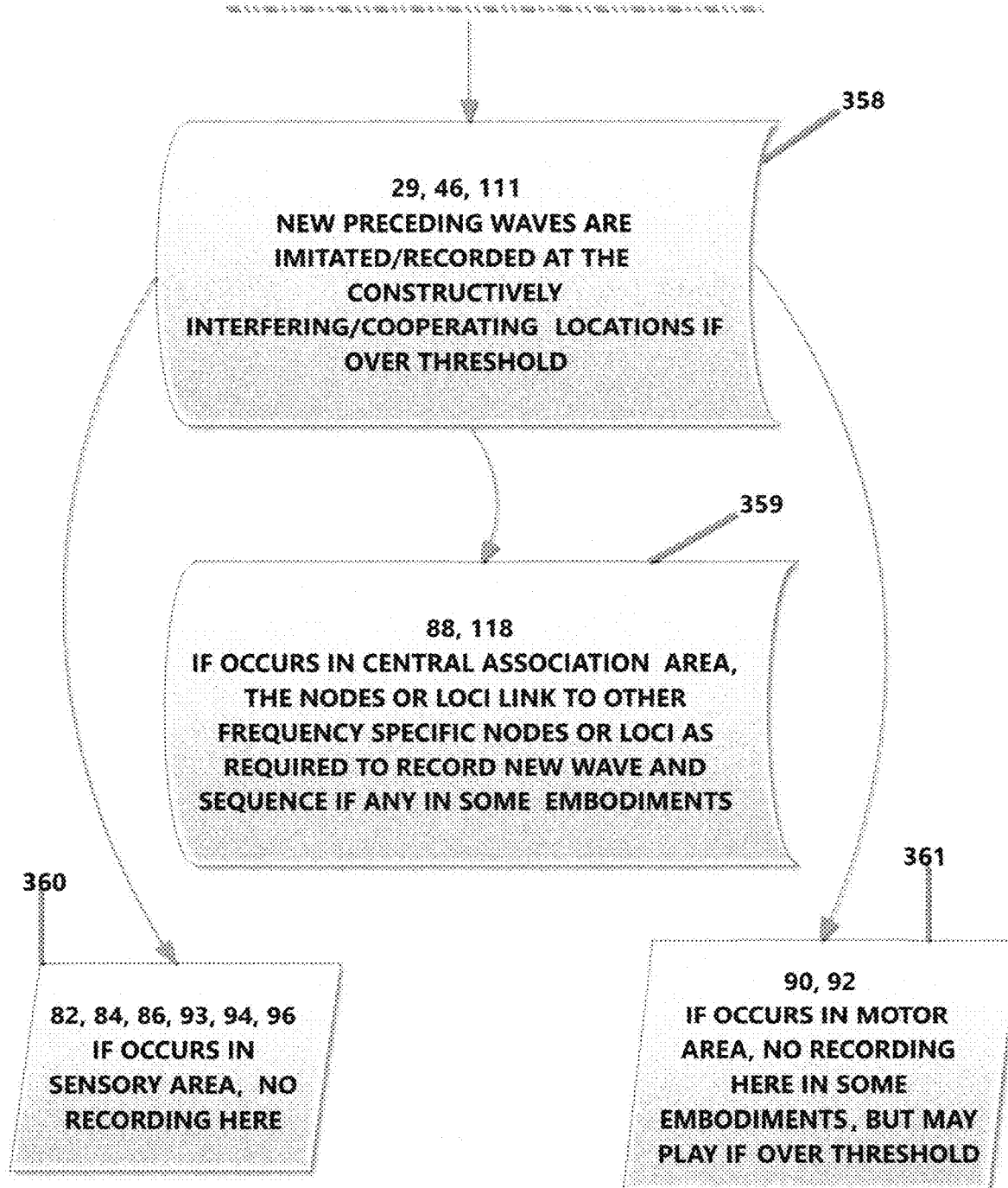

FIGS. 34 A and 34 B are a flowchart showing the steps involved in the process of association (box 357,358) in some embodiments, and the effect of waves at different specialized locations on the network at the bottom of FIG. 34 B (box 359,360,361).

As mentioned previously, in some embodiments waves coming into the motor area or sensory area do not record, but only play waves that are over-threshold due to time reversal focusing or wave time reversal focusing. This would affect motor actuators connected to the motor area, and cause sensory situations to be recreated in the sensory area in some embodiments. A delegated network or sub-network with a one to three node or locus ratio as described, between the main network and the actuators, may allow for a larger number of actuators, sensors, and finer control in some embodiments.

Different waves in a sequence may be recorded and their respective nodes or loci linked by switches in an integrated or printed circuit in some embodiments (box 359). In some software embodiments, there may be a visual representation of the network and its detailed activities that can be seen by a user. In these, nodes or loci of a sequence can show visual links (box 359) between them.

These links may also occur in other parts of the network due to repetition of stimuli or sequences of stimuli in some embodiments. This can create automatic sequences of movements, sensory stimuli, and associations depending on the network areas of the links. A selected number of repetitions would cause the linking, and this could be ten in some embodiments.

FIG. 35 A, 35 B, 35 C, 35 D

Figure 35:
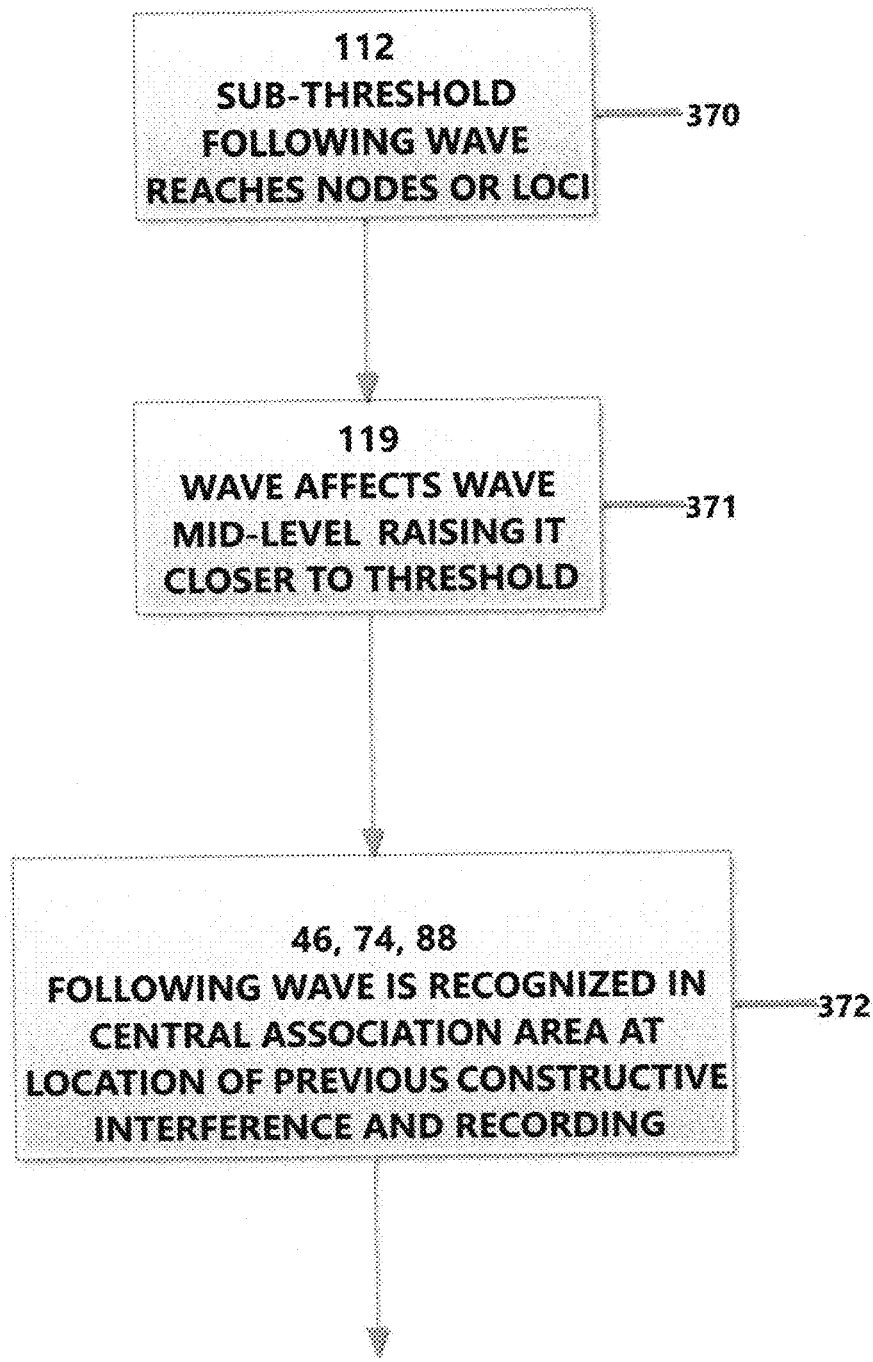
FIG. 35 A, 35 B, 35 C, 35 D Flowchart showing steps in one or more embodiments.
Figure 35:
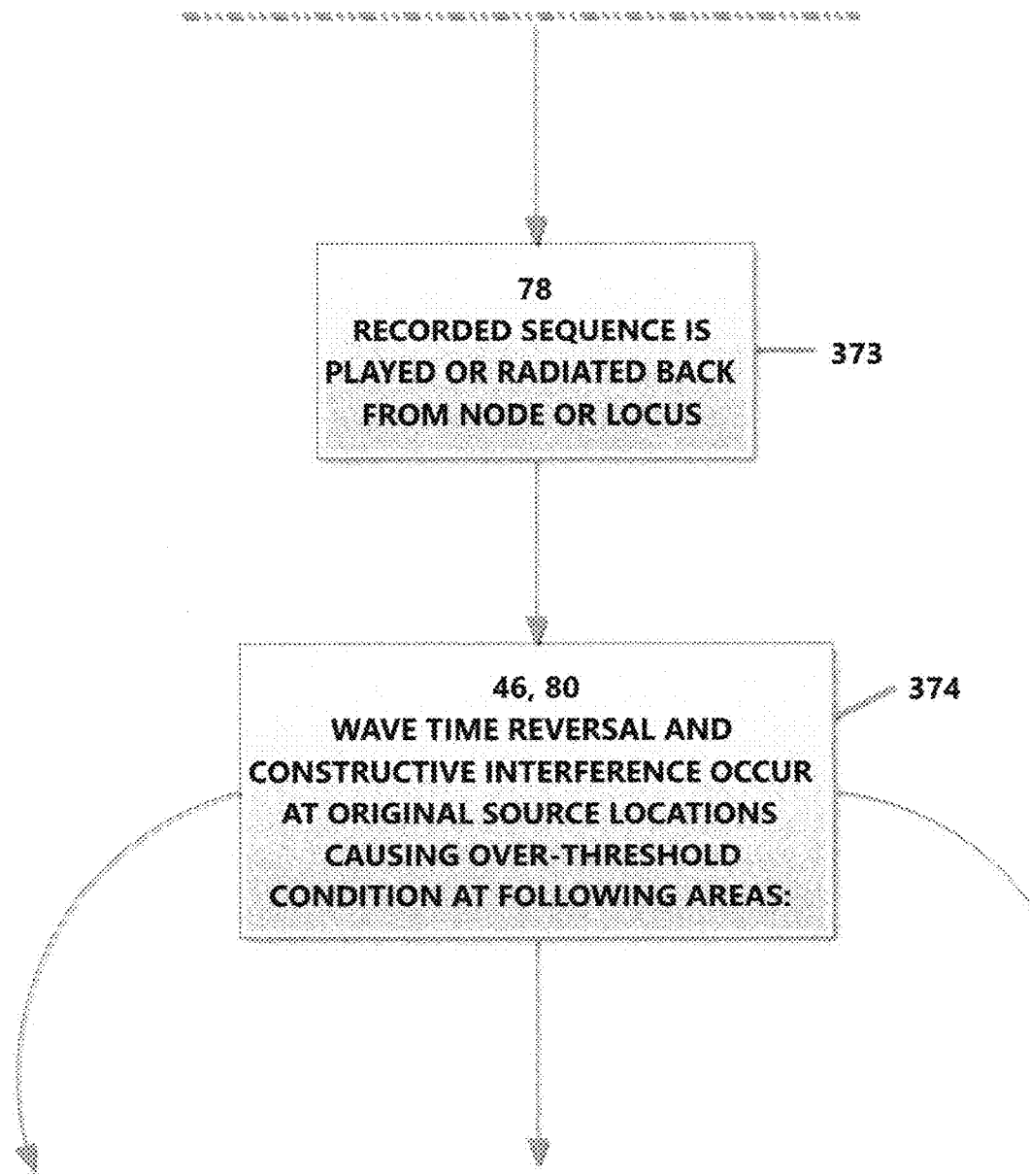
Figure 35:
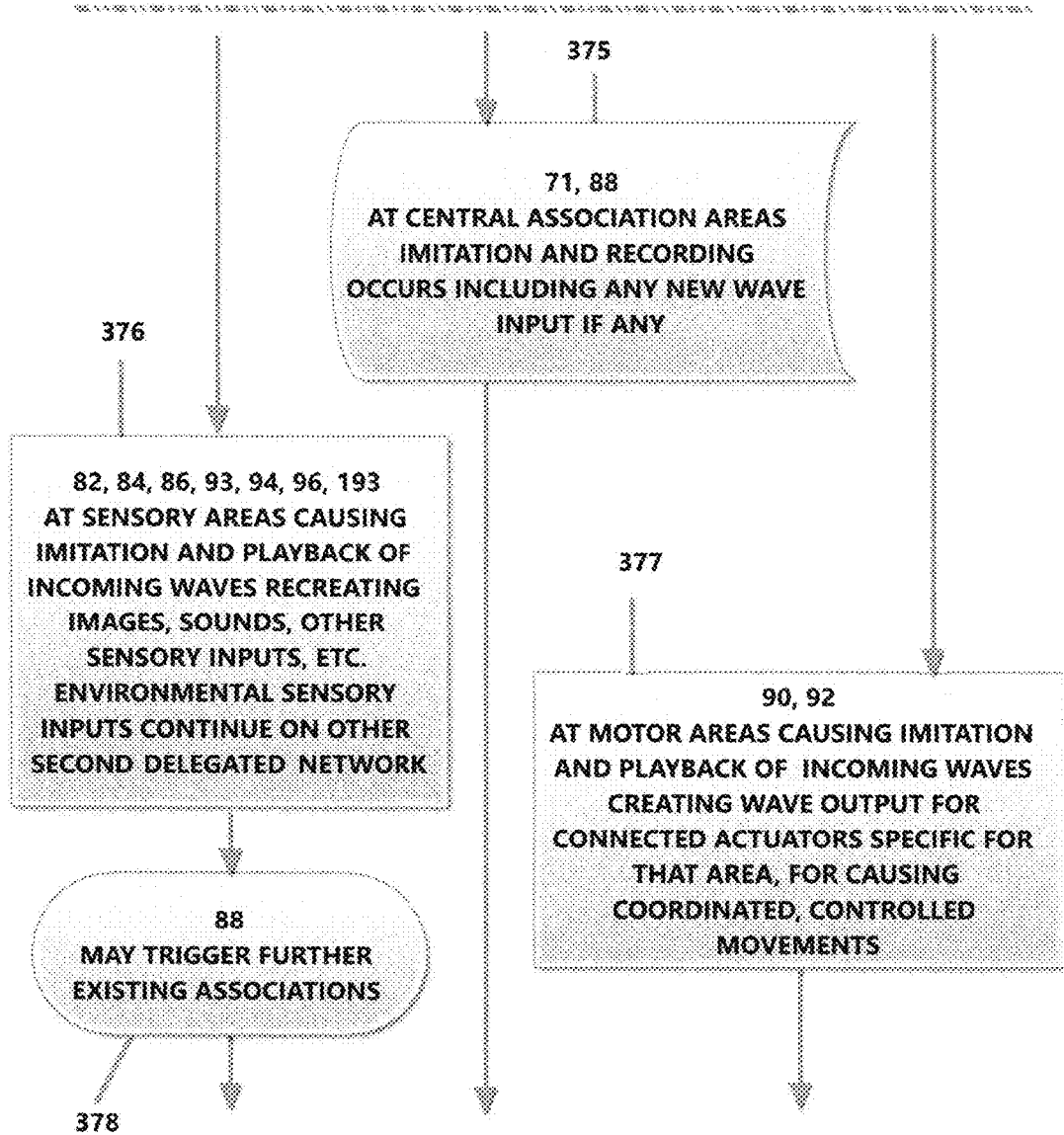
Figure 35:
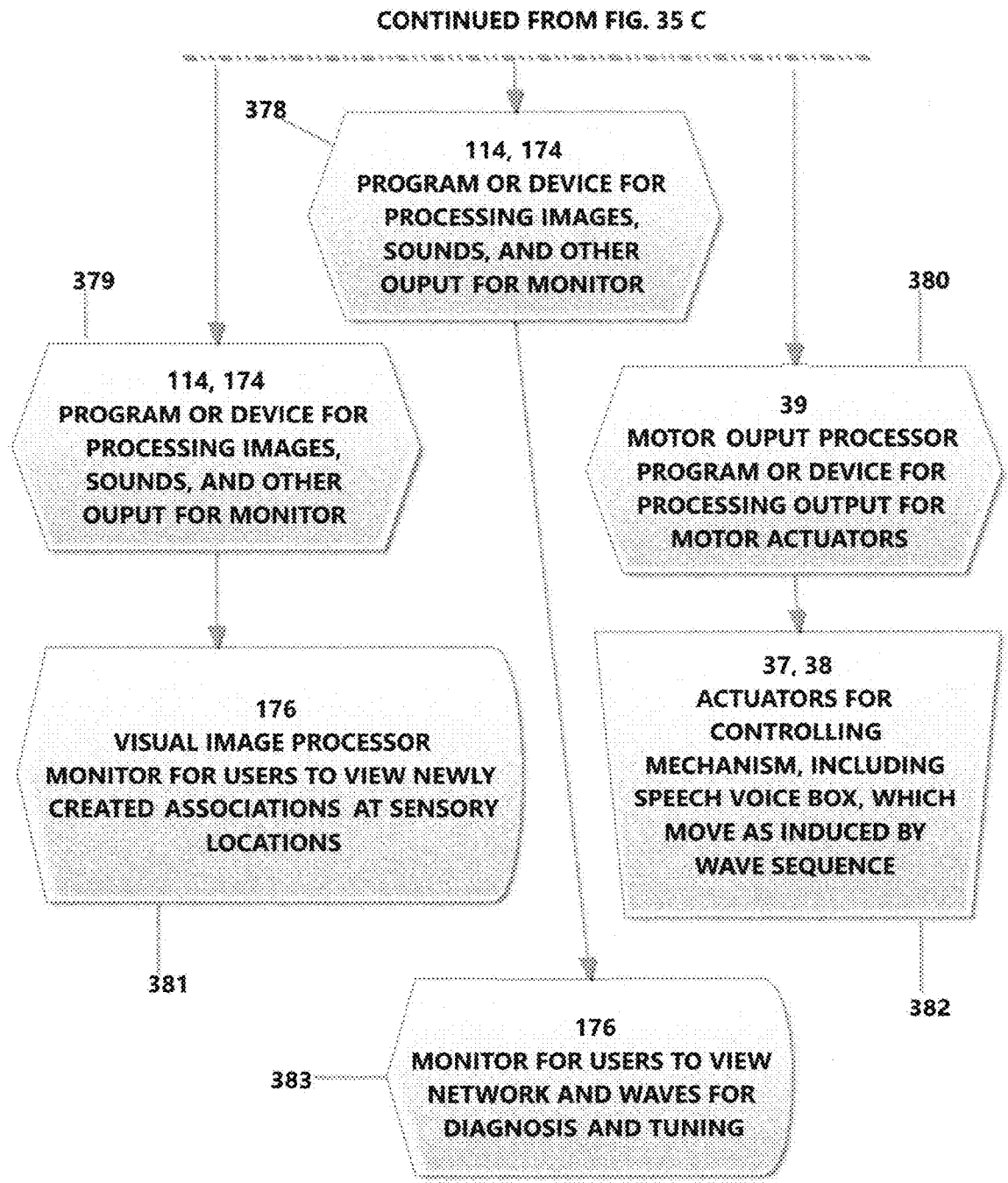

FIG. 35 A, 35 B, 35 C, 35 D are a flowchart showing steps in one or more embodiment's wave recognition, recalling of associations, creating new ones, viewing them, creating motor movements and mechanical speech, and recreating of sensations.

This four page diagram shows overall steps and effects, such as the recognition of a following wave, playing or radiating of recordings, time reversal or wave time reversal and the recall of associations. These associations are recreated at network areas, such as the central association area, motor area, and sensory area. The chart includes outputs such as movement (FIG. 35 D box 380, 382), communication (box 380, 382), and monitoring (FIG. 35 D box 378, 379, 381, 383). Sound output with motor actuator controlled speech voice box (box 382) would be based on motor actuator motion associations with their output sounds. As voice box actuators move they create sounds, such as phonemes which may be learned or taught, and these associations put together to form words. This may also be replaced by digital phoneme wave samples and speakers or transducers in some embodiments.

In box 370 of FIG. 35 A we see that a following wave may be over or sub-threshold and still be recognized (box 372) in some embodiments. In box 373 of FIG. 35 B we see that nodes, loci or both are able to be basic structural units for embodiments. Box 374 shows waves traveling to three different types of locations on the network and focusing at those locations utilizing time reversal, wave time reversal, reflections, triangulation, constructive interference/cooperative waves, to recreate associations.

In FIG. 35 C (box 375) it is seen that arriving waves can be said to be imitated by the nodes or loci receiving them in some embodiments. This is due to the waves focusing and recreating or imitating the original waves. These arriving waves can trigger further associations also, if recognized, in some embodiments. As these waves are arriving some nodes and loci may be recording, thus creating new associations of the waves present on the network at that moment in some embodiments. There may be many waves in associations in some embodiments.

Box 376 shows previous sensory inputs being re-created and played. These may be played on one network, while on delegated, secondary, or paired networks environmental sensory processing continues, in some embodiments. This allows for recall at the same time as awareness of the environment. That is, one network (376) may be recalling associations while another network is playing sensory inputs from the environment. In some paired network embodiments mapped to each other as in FIG. 6 (20 L, 20 R), two networks side by side may be engaged in these activities. These networks are mapped node to node or locus to locus and when one side is radiating the other is not, as it is inhibited in some embodiments.

Associations may trigger other associations as seen in box 378.

Box 377 shows that waves can be focused on network areas that control specific actuators with output to those specific actuators. In this way associations, sequences of associations and sequential associations of motions are created in some embodiments.

In some embodiments delegated networks may contain feedback controlled associations for more precise actuator movement. Feedback may consist of any sensor type such as joint angle, speed, acceleration, sensor pressure, temperature, friction and others in some embodiments. Any or all of these may be associated to create specific reactions in some embodiments through learning, teaching or autonomous learning experiences. For example, pressure from an appendage sensor can be mapped to a frequency scale. A specific frequency or pressure may become associated with the holding of, or an image of an egg. Another appendage or hand contraction frequency may become associated with the image of a heavy metal bar. In this same way other sensors may input feedback waves and be included in associations. A delegated network allows for more associations and feedback for these specific actuator outputs.

As seen in FIG. 35 D and as mentioned previously, some embodiments may have images of the waves on the network or networks output, for examination by a user or controller (for observation or adjustment). The waves on the network may be visualized on a monitor for example (box 378, 379, 381, 383). Box 382 shows that a variable geometry box, boxes, or cavities could be modified in volume and shape by actuators to create sounds. The motions of the voice box actuators would be associated with their sounds, and their triggering associations on the main network of course, with yet other associations in some embodiments. Other associations may be contraction of a cavity to create a moving column of gas in some embodiments, or a specific learned or associated tension in vibrating cords for example. As mentioned previously these associations may be taught, or learned autonomously.

FIG. 36

Time Wave

Figure 36:
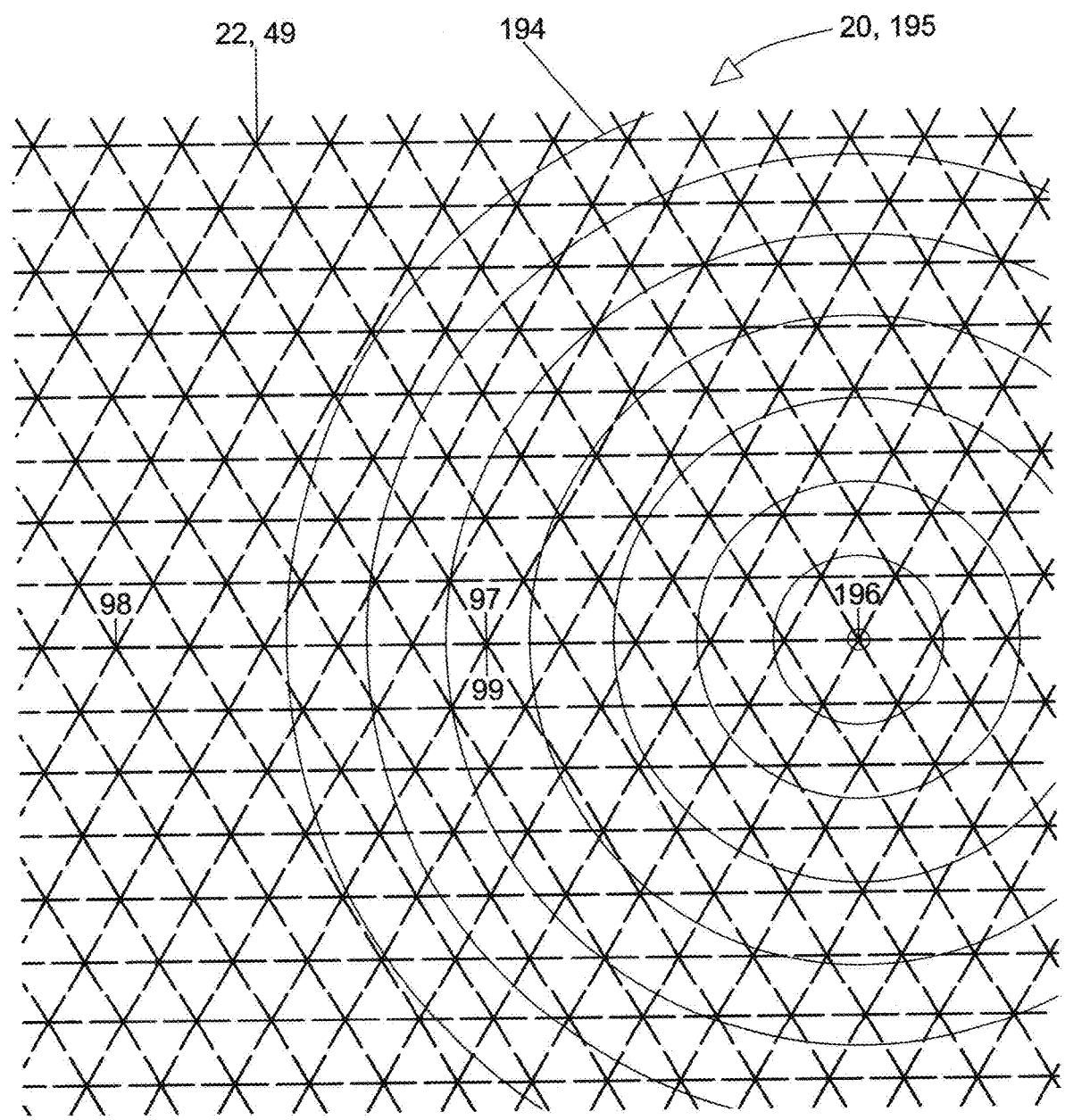
FIG. 36 Overhead view of an embodiment.

FIG. 36 is an overhead, magnified view of part of a network showing an example time wave in some embodiments. A time sub-network (195) would be present in some embodiments and keep track of the temporal order between associations. A slow time wave (194) of a selected wavelength would travel on this sub-network. When a new association is made on the main network a signal is sent to the time sub-network to mark or record the temporal location of the new association relative to older associations (97) or past associations on the wave moving across the time sub-network. The time sub-network nodes or loci locations across the network may have a clock time-stamp associated with them in some embodiments. The new association signal may cause this time stamp to be sent up to the main network for incorporation into the new association in some embodiments.

Some embodiments may utilize multiple time sub-networks with different time wave (194) speeds. When an association is triggered on the main network the temporal order or time-stamp is also triggered at the same time in some embodiments. Some embodiments may have this timestamp automatically appear as an image on the visual network, or a sound on the auditory network, when an association is made so that the time may be included as a part of the new association, and thus recalled if the association is triggered in the future.

Time waves also may function as a timing device for the timing of waves in sequences. These would be much faster waves in some embodiments such as 1000 Hz for example for precise timing, but this number could vary greatly in embodiments. A network, networks or delegated networks with a specific frequency of regular waves may be used as timing devices for the timing of waves in a sequence. For example, a wave sequence may be recorded along with a series of time wave crests, and then another wave. The number of timing wave crests between the waves would mark the length of the interval between the waves. The result would be a wave moving an actuator in the motor area and then for example four time wave crests, and then another wave in the motor area moving an actuator. The result would be a motion in an actuator, with a delay, and another motion in a different actuator in this example. The time waves would be part of the recorded sequences, much as any other recorded waves in some embodiments. These associations or wave sequences would be just as taught or learned in some embodiments.

In another example, during learning, an appendage might be moved passively by a teacher. This would create a feedback wave into the network and be recorded. This feedback wave triggers recording of the time wave crests as well. Time wave crests may differ from one another due to constantly changing waves on a network during their recording. This uniqueness may also be programmed in with a random number generator for example, or changes in wave characteristics during the playing or recordings. Each time wave crest being unique in some embodiments allows for their recognition and for them to be recorded with the next actuator induced feedback wave. In this way a wave may trigger a first actuator, then a series of time wave crests would occur, the last one of which would have been recorded with a second actuator feedback. This now triggers motion in the actuator when played back. The actuator feedback waves are over-threshold while the time waves are sub-threshold.

In some embodiments when recording takes place a signal may be sent to a delegated sub-network to return time wave crests for recording into sequences. Recordings may be set to proceed for a selected amount of time, such as four seconds for example in some embodiments. The recording would be extended with each over threshold wave for a further four seconds. The number of sub-threshold, regularly timed, timing wave crests between over-threshold actuator moving waves would determine the timing of actuator motions in sequences in some embodiments. More conventional timing methods may also be employed in some embodiments. These timing waves may be played sub-threshold on networks in some embodiments, and incorporated into recordings and associations.

Motor Control and Teaching

Resonance or imitation of incoming waves also applies to the motor area nodes or loci which also imitate focused, strong, incoming, over average, over-threshold waves. These would be waves that were focused on specific, previously associated or learned areas in some embodiments. In the motor area these waves can lead to frequency controlled motor actuator motion. In the case of the motor activation, the motor area's node's or locus' location in the previously mentioned (FIG. 6) embodiment specific homunculus determines which actuator will fire. The wave frequency determines the rate, and the number of nodes or loci activated the strength, in some embodiments. Sequences of focused, highly localized, over average, over-threshold conditions due to incoming waves to the motor area would cause sequences of movements.

As mentioned, motion sequences can be taught to the network. Initially for a prototype, random movements due to internal waves moving on the network, and teaching induced motions create the initial feedback waves from the actuators. These feedback waves travel up the motor actuator feedback sensory input FIG. 8 (40) for recording to create the first associations for movements in some embodiments. These motor associations are ordered sequences of learned waves which can be output later to create movements when triggered by specific associated waves. Once learned these could be downloaded for other units or networks.

For example, one simple recorded wave from the central association area may radiate and cause shortening of a proximal joint actuator in proportion to its previously recorded frequency and duration in an embodiment. This wave may be recognized by a nearby node or locus that recorded when the original wave and motion sequence was taught or learned along with its time wave determined delay if any, and also radiate. This may repeat again with yet another recognition, wave and actuator motion. Also, the recorded sequence at the central association area may create another sequence timed wave causing a similar condition for another more distal actuator in a limb. The waves and wave sequences may focus on different limbs, body parts or associations. In this way sequences of complex, timed, coordinated movements may be recorded and triggered such as in this simple example, extension of an appendage.

As mentioned, when the actuators move a feedback signal is sent to the network with wave information regarding the motion. This motor actuator feedback may be created by a mechanism similar to a ratchet in some embodiments. This ratchet-like feedback would create waves of the same duration, amplitude and frequency needed to move the actuator the amount it moved. That is, the new outgoing wave to the actuator generating the movement is the same as, and, the same location as, the feedback ratchet wave that occurred earlier in some embodiments. This allows the wave time reversal, time reversal, reflections, triangulation, refraction (80) to create associations with the movements in some embodiments. In this way associations can lead to movements and movements can lead to associations.

Feedback from the actuators may take different forms in different embodiments such as length change, rate of length change, and joint position for example.

As mentioned, motor feedback radiates to the central association areas FIG. 5,6 (88) on the network where the motor feedback can be recorded and later played back if triggered. The feedback can be recorded with other waves, such as waves for further movements or sensory stimuli for example, creating associations that may trigger the movements later by receiving triggering network or sensory waves. Recording the motor actuator feedback in the central association area allows for movements whose motor waves originate in the central association areas of the network when the recordings are triggered and played back on the network. In this way other associations, specific sensory input in associations, or internally generated waves can trigger movement.

For initial teaching, actuator motion sequences would be created passively by the teacher and the motor actuator feedback sensory input (40) as seen in FIG. 8 would be recorded in the association areas. This motor feedback consists of the ratchet-like wave generators in the actuators driven by movements that would create wave characteristics that drive the specifics of the actuation in some embodiments.

One wave could be associated with another wave temporally in the association area. In this way one motion could be associated with another motion temporally, or any other input to the network. Any input could be associated with the motion, such as a sound wave frequency, a sound wave frequency sequence, a word, or a word sequence, an image, a sequence of images and others.

When a previously recorded sound or word would be radiated due to microphone FIG. 7 (85) wave input to the network, recognition or resonance would occur in some embodiments. This would cause the resonating node, nodes, locus or loci to radiate the association in the association area, and time reversal, wave time reversal, reflections, triangulation would recreate the original wave frequencies and characteristics at their original sources. In the case of learned motions this original source would be the motor area where motor actuator ratcheting feedback sensory input FIG. 8 (40) originated due to learning movements of actuators. These specific motor area in and out locations for specific actuators based on the embodiment specific homunculus would imitate, play or radiate the waves now at the incoming over-threshold frequencies. These waves would now be sent down to the actuators they are connected to, recreating the learned actuator movements and thus motions.

As mentioned, initially, teaching motions create the first ever or initial feedback waves from the actuators in some embodiments, but any movements may create the first feedback waves to be used later in associations. The thresholds and wave time reversal, time reversal, reflections, triangulation, refraction (80) focusing would limit the movement triggering waves to those that were previously learned at the central association area in some embodiments.

Verbal Commands and Other Topics

Passive motion (when teaching occurs) creates feedback waves in specific areas on the homunculus in some embodiments. A teacher could vocalize a specific command word at the same time he passively moves a limb connected to the network. The motion's feedback wave and the word, via microphone input to the network, would be associated and recorded. The next time the word were repeated, it would be recognized, the association's two waves sent out, the same motor areas would now be located by wave time reversal, time reversal, reflections, triangulation, refraction (80)

focusing in some embodiments. These waves as learned and associated, would recreate the wave sequences taught, temporally and spatially in the motor area, and the learned motion sequence actuated. In this way verbal commands could be given to the network and motions executed. Due to wave consistency and precision, great temporal accuracy would be achievable in some embodiments. This learning mechanism would apply to any associations and sensory modalities, including internally generated associations. Motor activity would also occur with autonomously generated over-threshold conditions in the network.

Operation and Use with Examples

Four very simple example embodiments will now be given to show how the system operates. The examples will show how to use the embodiments, and they will be simple systems for ease of understanding.

The first learning example will use a light switch with an actuator connected to it. The actuator is connected to a network. The network has a microphone/speaker or transducer connected to it.

Movement of the light switch would slide the actuator, and movement of the actuator would move the light switch. This would be a (wave controlled) linear actuator which is connected to the network. The linear actuator could move one direction with a saw tooth wave and the opposite with a pulse wave. The actuator would be designed to create and receive a rate dependent wave frequency. This would be similar to the sound wave from a simple, mechanical, two-way, ratchet-like system, and like that made by an electronic wave generator for example.

A user would teach this network by saying the word "lights" while moving the switch to the "on" position. The microphone would input the wave for the word "lights" into the network. Movement of the switch and actuator to the "on" position would input a saw tooth wave to the network at the same time. These two waves would interact with one another in the central association areas as described in the mechanism and figures. The network nodes or loci would record both waves at the areas of strongest constructive interference/cooperative waves as described previously in the fig.

The next time the user entered the room he would say the word "lights". The network would recognize the wave for the sound of the word "lights" at the previously recorded areas via neural network, resonance, or other mechanisms described in figures and text. This would trigger radiation of both the recorded wave for the word "lights" and the saw tooth wave recorded from the linear actuator. The saw tooth wave of the linear actuator would be created or focused by wave time reversal, time reversal reflections, triangulation, refraction (80) at the precise part of the network where it entered before, where the actuator is connected on the network embodiment. The saw tooth wave would cause the connected actuator to move the switch to the "on" position by the previously recorded amount, and at the previously recorded rate. Using the same mechanism, the transducer would output the word "lights". The active nodes or loci would then enter dormancy.

The same could be done with the word "off" and a different wave, a pulse wave for example, for the different direction. This mechanism could control far more complex embodiments as well, with many more input and output locations mapped to the network.

In another example a user could film a photograph of the letter A with a camera connected and mapped to the visual area of the network, while saying the "A" sound aloud which would be picked up by a transducer (speaker/microphone) connected to the auditory areas of the network.

The waves from the pixels making up the "A" are mapped image pixel to locus or node at the visual sensory area. The visual image of the letter "A" on the network would contain artifacts in and around it created by constructive interference/cooperating waves, destructive interference, lateral inhibition, and line recognition which would aid in its wave specificity and recognition. This wave situation as received at the association area would mean "A", and when sent back to the visual area from the association area would reform or recreate the "A" image in some embodiments.

These pixel waves would be recorded in the network central association areas FIG. 5,6 (88) where constructive interference/cooperative waves occurred between them, and the "A" sound waves.

Later the user could show the letter "A" to the camera. The waves for the spatial arrangement of the letter "A" on the visual sensory area would again be transmitted on the network. The association area loci that recorded the complex "A" image waves would recognize them as described in the mechanism, and radiate the "A" image wave recordings. These would re-create the "A" image by time reversal, wave time reversal, reflections, triangulation in some embodiments on the visual sensory area of the network.

The wave for the sound "A" would be sent at the same time to the auditory sensory area that originally input them into the network. The connected transducer (speaker/microphone) would then take the network auditory area wave and output it as sound in this simple example embodiment. Dormant period would begin at activated nodes.

The result would be that you show the letter "A" and the sound "A" has been created in the environment by the network embodiment. In this way any image could be combined with any word. If the user wanted, he could see the letter "A" image as it appeared when recalled on the network visual area if a monitor were connected as in FIG. 35 D.

In another example an individual's high-resolution facial image wave output from the visual area could be associated with the wave sequence of his name. Later, if the name were to be said, the image of his face would appear on a monitor of a node or locus to pixel projection from the visual sensory network area. When the camera would be shown the face, the name would sound from a transducer (speaker/microphone) that received the wave time reversal, time reversal, reflection, triangulation, refraction (80) created sound wave.

The described mechanism would allow for rapid learning of associations such as words with images with complex motor sequences or any other wave inputs and outputs without the need for extensive computer programming. Very complex motor actuator sequences would be learned very rapidly with one example in some embodiments. These would be re-created with extreme temporal precision, as the actuators would be controlled by high resolution recorded waves, each at their own specific location with an above threshold signal from the original wave recording.

Another example use might be a search engine. A user might type in or say a word, or show an image for example to the search engine. These waves would be transmitted to an experienced network, that is, a network that has been previously exposed to these inputs and made associations with them. The network could utilize a web crawler, human users (or both), to make associations between the items on a page, or the items input in a search, and what they ended up clicking, for example.

The strongest previously recorded associations would have the highest wave mid-levels, closest to their thresholds at any one time, and would fire first. This would be due to the previously described weakening or decay over time of associations, especially unused associations. Lateral inhibition would temporarily limit weaker or less frequently seen associations for a selected amount of time. These less common associations would be seen as soon as the first nodes or loci began to reduce firing intensity and lateral inhibition, due to their fatigue and dormant period. Also, a re-introduction of the initially input waves again into the network at this time would also continue the sequence of lesser strength or relevance results.

In this way an entire sequence of associations for an input would be shown to the user based on how often the associations are found in the learned material. For example the word apple could be typed into the network. Previous associations would be triggered by wave time reversal, time reversal, reflections, triangulation, refraction (80) such as the sound for the word apple and an image of an apple. These two associations would play or radiate. The content of both of these sensory areas would then be transmitted to the user as a visual image on his monitor and a sound from a transducer/speaker for example.

A new input of apple may occur if the user desires more associations as these most common associations go into their dormant periods. Now the initial lateral inhibition would not occur on the next less common associations, with their next to highest, or second highest wave mid-levels relative to their thresholds, and they would be shown. If the user or a computer entered the word apple again the third highest wave mid-level associations would be shown in their respective sensory areas. These sequences may be automatically triggered in specialized search embodiments of course.

Operation of One or More Embodiments

Description—Alternative Embodiment—

Any Wave Type

Any wave (75) type as in the glossary's wave definition may be used in alternative embodiments, along with their respective detectors and emitters. Also, other alternative embodiments may be found in the descriptions in the text.

In some embodiments the different wave types may be combined. These waves would undergo time reversal, wave time reversal, reflection and other mechanisms as described here.

Sub-atomic particles show wave-particle duality as seen in the macroscopic diffraction gradient experiments, and they could also be used as the basis for some embodiments. Some sub-atomic particles may be considered to be islands of oscillating waves and these islands could be used for ultra-small nano-networks.

Another embodiment would use the same mechanisms and function the same way as the figure descriptions but use optical waves FIG. 21-23 (75). This could use a photo-detector and emitter grid spread throughout the optical wave interaction area in some embodiments. Nodes (22) and loci (49) would be fitted with photodetectors and tuned nano-lasers. Each nano-laser would be tuned to its specific frequency of the spectrum in a node or locus as seen in FIG. 12 in one embodiment. Optical network wave interactions and mechanisms would function as described earlier, with for example constructive/cooperative waves, destructive interference, recording, recognition, playback, wave time reversal, time reversal, reflections, refraction and others.

Areas of interference/cooperative waves would be detected by the photo-detectors, and their waves recorded as in previously described embodiments. Similar following optical waves to those recorded would be photo-detected, and recognized. Play back of the association would then occur in a network's medium. The laser light waves for the network to utilize could be projected into or onto a medium as defined in the glossary. Embodiments could use nano-lasers, nano-tubes, LEDs, or very small fiber optic cables, and interact in a medium, or on it. Inputs such as sensory input and motor output would be converted to and from optical waves in the network spectrum if needed by the input conversion processor and motor processor, FIG. 7 (66,39).

Operation—Alternative Embodiment—

The operation of this embodiment is similar to the previously described embodiments but employing other wave (75) types such as the optical waves of the example embodiment just given, with light emitters and photo detectors. Wave time reversal, time reversal, reflections, triangulation, refraction (80) would be used in the manner described above with each wave type. Refraction may also be used to direct waves in a medium specific manner. Each wave type would employ wave detectors, recorders, recognition, and emitters that function with them, so that they may function as described in the example mechanism. Some embodiments could use multiple types of waves (75) to further widen the operating spectrum of the network or networks. Multiple networks could be used with different wave types as well.

Description—Alternative Embodiment—

Software Simulation

Another alternative embodiment could be a virtual or simulated software representation of the method, process or mechanism, having virtual or simulated wave (75) transmission, interactions, recording, playback, wave time reversal, time reversal, reflections, triangulation. The simulations would take place on currently available computers, such as mobile computers, cell phones, pads, fixed computers or PCs, utilizing currently available operating systems and programming languages for example.

Faster specialized computers, multiple computers, distributed computing FIG. 4 (136), or quantum computers could be used as well. Very complex simulations on large computers, or very simple simulations involving a small number of nodes or loci could take place on small electronic components such as electronic chips or microcontrollers.

The figures, flowcharts and block diagrams including FIG. 15-29, 36, and FIG. 30-35 D show the mechanism's steps that could be used by the computers, microcontrollers or other electronic components. Some embodiment's monitors would show real time waves on the network with images similar to FIGS. 15-29 and 36 for diagnosis, tuning and parameter adjustment.

Operation—Alternative Embodiment—

The operation of this embodiment is similar to those described but using virtual, simulated waves (75) with virtual or simulated nodes, loci, networks and media (58). These would be programmed and simulated on a computer or other electronic components. This could be virtual sound waves for example in a virtual gas, liquid, solid, or other medium in one embodiment.

This software embodiment could use any simulated wave (75) type and any simulated network or media type. It could be simulated light waves in a simulated vacuum for example. This would be simulated or virtual waves transmitted across a virtual network (20) similar to that in the figs., including FIGS. 17-29 and 36, utilizing the steps from the flowcharts of FIG. 30-35, and the previous mechanism descriptions in some embodiments. These software embodiments could include elements that would be similar to currently available, conventional wave simulation software programs, with the addition of the needed steps to complete the mechanism.

Qualities of One or More Aspects of Embodiments (a) Can be connected to an entire knowledgebase with packet-based data streams for creating associations. New unforeseen associations can be made.
(b) Is scalable, from very small to extremely large.
(c) Associates written words with sounds, images, and multi-sensory experiences.
(d) Allows words to be associated with specific learned actions and movements in a coordinated feedback regulated manner.
(e) Associations scale with network size, number of computers and computer processing power.
(f) Input and output can be of any form if transformed to wave data for the network.
(g) Can control limbs, natural, artificial or prosthetic, or any machinery in a rapidly coordinated fashion based on real time positional sensory input, as well as any other learned associations.
(h) Learned material can be downloaded into new networks.
(i) Activity can be monitored for proper function on a large scale or minute scale for oversight, tuning and modification of user adjustable parameters.
(j) Sensory input is reduced or terminated for lowered activity or sleep. Complete shut down by user is available via multiple methods.
(k) Associations can be very simple or extremely complex.
(l) New unforeseen associations of any type of data can be achieved, including scientific data.

CONCLUSION, RAMIFICATIONS, AND SCOPE

The specific structures and methods of some embodiments of the Wave Interaction Processor have been disclosed. It should be apparent, however, to those skilled in the art, that many more modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present or utilized, or combined with other elements, components, or steps that are not expressly referenced.

In at least one embodiment, the reader will see, I have provided a device which records, associates and outputs wave based data, information, and movement. Recorded associations, when triggered by a wave, a similar wave, or a fragment of it, can play back these recorded waves at their original source locations, recreating the original waves, thus associating them. These waves may be data, images, moving images, sounds, motion sequences in a limb, or others. Spontaneous output is also created based on these wave inputs interacting with each other, with internal waves in the network, or internal waves themselves interacting.

While the above description contains many specificities, these should not be construed as limitations on the scope of any embodiment, but as exemplifications of various embodiments thereof. Many other ramifications and variations are possible within the teachings of the various embodiments. For example, one could create a network utilizing changing atomic or molecular conformations, creating many of the same interactions described here. Also one could make a device which utilizes neuromorphic chips or quantum computers, creating the same interactions of waves using the same principles involved here. One could also use other wave interaction data for locating areas for recording, and radiating instead of constructive interference/cooperative waves. Thus, the scope should be determined by the appended claims and their legal equivalents, and not by the embodiments illustrated.

I claim:
1. A machine comprising:
 a. at least one NETWORK coupled to at least one processor for RECOGNIZING at least one FOLLOWING WAVE and radiating using WAVE TIME REVERSAL;
 b. at least one NODE or LOCUS coupled to said at least one NETWORK;
  wherein radiating waves and their information content are a ASSOCIATED and recalled by the RECOGNITION of a FOLLOWING WAVE.
2. The processor of claim 1 wherein said at least one a NETWORK is coupled to at least one OSCILLATOR.
3. The processor of claim 1 wherein said at a least one NETWORK is coupled to at least one camera.
4. The processor of claim 1 wherein said at a least one NETWORK is coupled to at least one speaker.
5. The processor of claim 1 wherein said at least one a NETWORK is coupled to at least one actuator.
6. The processor of claim 1 wherein said at least one a 7 NETWORK is paired.
7. The processor of claim 1 wherein said at least one a NETWORK is layered.
8. A method for processing comprising:
 (a) providing at least one processor;
 (b) recording at least one wave in a NETWORK,
 (c) RECOGNIZING at least one FOLLOWING WAVE in the NETWORK,
 (d) using WAVE TIME REVERSAL, radiating the recorded at least one wave in a NETWORK at one or more locations where it was recorded, due to the RECOGNIZED at least one FOLLOWING WAVE,
 (e) recreating said at least one wave in a NETWORK from (b);
  wherein the RECOGNIZED at least one FOLLOWING WAVE causes the recordings to radiate using WAVE TIME REVERSAL at the one or more locations where they were recorded, recalling at least one wave with it's wave information, in one or more dimensions.
9. The method for processing of claim 8 wherein said recording at least one wave in a NETWORK occurs at one or more a over-threshold locations.

10. The method for processing of claim 8 wherein said at a least one wave is affected by a GLOBAL RESET WAVE.

11. The method for processing of claim 8 wherein said at least one wave is made of pulses.

12. The method for processing of claim 8 wherein said at a least one wave controls actuators.

13. The method for processing of claim 8 wherein it is a simulated on a computer.

14. The method for processing of claim 8 wherein said at least one wave is used for LINE DETECTION.

15. The method for processing of claim 8 wherein said recording includes TIME WAVES.

16. The method for processing of claim 8 wherein said at a least one wave HARMONIZES.

17. The method for processing of claim 8 wherein said at least one wave is involved in CONSTRUCTIVE INTERFERENCE/COOPERATIVE WAVES.

18. The method for processing of claim 8 herein said processing uses LATERAL INHIBITION.

19. A method for processing comprising:
 (a) providing at least one processor;
 (b) radiating from ORIGINAL SOURCE locations at least two waves in said at least one processor;
 (c) recording at least two interfering waves at one or more locations of maximum CONSTRUCTIVE INTERFERENCE/COOPERATIVE WAVES in said at least one processor if they are over a predetermined threshold;
 (d) recognizing at least one FOLLOWING WAVE in said at least one processor as similar to, or the same as, one or more of the at least two recorded interfering waves from (c);
 (e) radiating the recorded at least two interfering waves from (c) in said at least one processor at the one or more locations where they were recorded in said at least one processor from (c), due to the recognized at least one FOLLOWING WAVE from (d);
 (f) focusing using WAVE TIME REVERSAL causing the recreation and radiating at said ORIGINAL SOURCE locations of the at least two waves from (b), in said at least one processor;
 (g) creating an ASSOCIATION;
  wherein the recognized at least one FOLLOWING WAVE, as following wave is described in the specification and drawings, causes the recordings to radiate using WAVE TIME REVERSAL, as wave time reversal is described in the specification and drawings, at the one or more locations where they were recorded, thus focusing at ORIGINAL SOURCE locations, and so re-creating a at least one association in one or more dimensions.

20. The method for processing of claim 19 wherein said at least a one processor is affected by a GLOBAL RESET WAVE.

21. The method for processing of claim 19 wherein the waves are a made of pulses.

22. The method for processing of claim 19 wherein the waves are output from said network.

23. The method for processing of claim 19 wherein the method for processing is simulated on a computer.

24. The method for processing of claim 19 wherein the waves HARMONIZE.

25. The method for processing of claim 19 wherein the processing uses LATERAL INHIBITION.

* * * * *